(12) United States Patent
Ohta

(10) Patent No.: US 7,716,008 B2
(45) Date of Patent: May 11, 2010

(54) ACCELERATION DATA PROCESSING PROGRAM, AND STORAGE MEDIUM, AND ACCELERATION DATA PROCESSING APPARATUS FOR USE WITH THE SAME

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/715,386

(22) Filed: Mar. 8, 2007

(65) Prior Publication Data

US 2008/0177497 A1 Jul. 24, 2008

(30) Foreign Application Priority Data

Jan. 19, 2007 (JP) ............................. 2007-010757

(51) Int. Cl.
*G01P 15/00* (2006.01)
(52) U.S. Cl. ..................... 702/152; 702/141; 702/150
(58) Field of Classification Search ......... 702/150–153; 708/141
See application file for complete search history.

(56) References Cited

U.S. PATENT DOCUMENTS

| | | | |
|---|---|---|---|
| 3,474,241 A | 10/1969 | Kuipers | |
| 3,660,648 A | 5/1972 | Kuipers | |
| 3,973,257 A | 8/1976 | Rowe | |
| 4,009,619 A | 3/1977 | Snyman | |
| 4,038,876 A | 8/1977 | Morris | |
| 4,166,406 A | 9/1979 | Maughmer | |
| 4,287,765 A | 9/1981 | Kreft | |
| 4,303,978 A | 12/1981 | Shaw et al. | |
| 4,318,245 A | 3/1982 | Stowell et al. | |
| 4,321,678 A | 3/1982 | Krogmann | |
| 4,337,948 A | 7/1982 | Breslow | |
| 4,342,985 A | 8/1982 | Desjardins | |
| 4,402,250 A | 9/1983 | Baasch | |
| 4,425,488 A | 1/1984 | Moskin | |
| 4,443,866 A | 4/1984 | Burgiss, Sr. | |
| 4,450,325 A | 5/1984 | Luque | |

(Continued)

FOREIGN PATENT DOCUMENTS

DE 03930581 3/1991

(Continued)

OTHER PUBLICATIONS

Electronic Entertainment Expo (E3) advertisement for G-Force Tilt "TILTPAK Rumble & Motion Sensing Pak for Nintendo 64".

(Continued)

*Primary Examiner*—Drew A Dunn
*Assistant Examiner*—Jonathan Teixeira Moffat
(74) *Attorney, Agent, or Firm*—Nixon & Vanderhye P.C.

(57) ABSTRACT

The data acquisition means acquires the acceleration data at predetermined time intervals. The change amount calculation means calculates a change amount vector representing a change amount of the acceleration by using the acceleration data having been acquired by the data acquisition means. The accumulation vector calculation means calculates an accumulation vector by sequentially and cumulatively adding the change amount vector having been calculated by the change amount calculation means. The direction determination means determines, as a waving direction representing a moving direction of the input device, a direction of the accumulation vector, when the accumulation vector having been calculated by the accumulation vector calculation means satisfies a predetermined condition.

21 Claims, 17 Drawing Sheets

U.S. PATENT DOCUMENTS

| | | |
|---|---|---|
| 4,503,299 A | 3/1985 | Henrard |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,761,540 A | 8/1988 | McGeorge |
| 4,787,051 A | 11/1988 | Olson |
| 4,839,838 A | 6/1989 | LaBiche et al. |
| 4,849,655 A | 7/1989 | Bennett |
| 4,851,685 A | 7/1989 | Dubgen |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 5,045,843 A | 9/1991 | Hansen |
| 5,059,958 A | 10/1991 | Jacobs et al. |
| 5,062,696 A | 11/1991 | Oshima et al. |
| 5,068,645 A | 11/1991 | Drumm |
| 5,124,938 A | 6/1992 | Algrain |
| 5,128,671 A | 7/1992 | Thomas, Jr. |
| 5,136,222 A | 8/1992 | Yamamoto |
| 5,138,154 A | 8/1992 | Hotelling |
| 5,175,481 A | 12/1992 | Kanno |
| 5,181,181 A | 1/1993 | Glynn |
| 5,202,844 A | 4/1993 | Kamio et al. |
| D342,256 S | 12/1993 | Payne |
| 5,280,744 A | 1/1994 | DeCarlo et al. |
| 5,307,325 A | 4/1994 | Scheiber |
| 5,317,394 A | 5/1994 | Hale et al. |
| 5,329,276 A | 7/1994 | Hirabayashi |
| 5,339,095 A | 8/1994 | Redford |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| 5,369,889 A | 12/1994 | Callaghan |
| 5,373,857 A | 12/1994 | Hirabayashi et al. |
| 5,396,265 A | 3/1995 | Ulrich et al. |
| 5,421,590 A | 6/1995 | Robbins |
| 5,430,435 A | 7/1995 | Hoch et al. |
| 5,440,326 A | 8/1995 | Quinn |
| 5,453,758 A | 9/1995 | Sato |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,517,183 A | 5/1996 | Bozeman, Jr. |
| 5,526,022 A | 6/1996 | Donahue et al. |
| 5,554,033 A | 9/1996 | Bizzi |
| 5,573,011 A | 11/1996 | Felsing |
| 5,574,479 A | 11/1996 | Odell |
| 5,579,025 A | 11/1996 | Itoh |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| 5,640,152 A | 6/1997 | Copper |
| 5,641,860 A | 6/1997 | Takei et al. |
| 5,645,077 A | 7/1997 | Foxlin et al. |
| 5,666,138 A | 9/1997 | Culver |
| 5,670,845 A | 9/1997 | Grant et al. |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,323 A | 12/1997 | Poulton |
| 5,703,623 A | 12/1997 | Hall et al. |
| 5,726,675 A | 3/1998 | Inoue |
| 5,734,371 A | 3/1998 | Kaplan |
| 5,734,373 A | 3/1998 | Rosenberg et al. |
| 5,736,970 A | 4/1998 | Bozeman, Jr. |
| 5,739,811 A | 4/1998 | Rosenberg et al. |
| 5,742,331 A | 4/1998 | Uomori et al. |
| 5,745,226 A | 4/1998 | Gigioli, Jr. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| 5,771,038 A | 6/1998 | Wang |
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| 5,850,624 A | 12/1998 | Gard et al. |
| 5,854,622 A | 12/1998 | Brannon |
| 5,867,146 A | 2/1999 | Kim et al. |
| 5,874,941 A | 2/1999 | Yamada |
| 5,875,257 A | 2/1999 | Marrin et al. |
| 5,897,437 A | 4/1999 | Nishiumi et al. |
| 5,898,421 A | 4/1999 | Quinn |
| 5,902,968 A | 5/1999 | Sato et al. |
| 5,912,612 A | 6/1999 | DeVolpi |
| 5,913,727 A | 6/1999 | Ahdoot |
| 5,923,317 A | 7/1999 | Sayler et al. |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Sciammarella et al. |
| 5,982,352 A | 11/1999 | Pryor |
| 5,986,644 A | 11/1999 | Herder et al. |
| 5,991,085 A | 11/1999 | Rallison et al. |
| 5,999,168 A | 12/1999 | Rosenberg et al. |
| 6,002,394 A | 12/1999 | Schein et al. |
| 6,011,526 A | 1/2000 | Toyoshima et al. |
| 6,013,007 A | 1/2000 | Root et al. |
| 6,016,144 A | 1/2000 | Blonstein et al. |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,058,342 A | 5/2000 | Orbach et al. |
| 6,059,576 A | 5/2000 | Brann |
| 6,066,075 A | 5/2000 | Poulton |
| 6,069,594 A | 5/2000 | Barnes et al. |
| 6,072,467 A | 6/2000 | Walker |
| 6,081,819 A | 6/2000 | Ogino |
| 6,084,315 A | 7/2000 | Schmitt |

| | | | |
|---|---|---|---|
| 6,084,577 A | 7/2000 | Sato et al. | |
| 6,087,950 A | 7/2000 | Capan | |
| 6,110,039 A | 8/2000 | Oh | |
| 6,115,028 A | 9/2000 | Balakrishnan | |
| 6,137,457 A | 10/2000 | Tokuhashi et al. | |
| 6,148,100 A | 11/2000 | Anderson et al. | |
| 6,155,926 A | 12/2000 | Miyamoto et al. | |
| 6,160,405 A | 12/2000 | Needle et al. | |
| 6,160,540 A | 12/2000 | Fishkin et al. | |
| 6,162,191 A | 12/2000 | Foxlin | |
| 6,164,808 A | 12/2000 | Shibata et al. | |
| 6,176,837 B1 | 1/2001 | Foxlin | |
| 6,181,329 B1 | 1/2001 | Stork et al. | |
| 6,183,365 B1 | 2/2001 | Tonomura et al. | |
| 6,184,863 B1 | 2/2001 | Sibert et al. | |
| 6,191,774 B1 | 2/2001 | Schena et al. | |
| 6,198,295 B1 | 3/2001 | Hill | |
| 6,198,470 B1 | 3/2001 | Agam et al. | |
| 6,198,471 B1 | 3/2001 | Cook | |
| 6,200,219 B1 | 3/2001 | Rudell et al. | |
| 6,200,253 B1 | 3/2001 | Nishiumi et al. | |
| 6,201,554 B1 | 3/2001 | Lands | |
| 6,217,478 B1 | 4/2001 | Vohmann et al. | |
| 6,225,987 B1 | 5/2001 | Matsuda | |
| 6,226,534 B1 | 5/2001 | Aizawa | |
| 6,239,806 B1 | 5/2001 | Nishiumi et al. | |
| 6,241,611 B1 | 6/2001 | Takeda et al. | |
| 6,243,658 B1 | 6/2001 | Raby | |
| 6,244,987 B1 | 6/2001 | Ohsuga et al. | |
| 6,264,558 B1 | 7/2001 | Nishiumi et al. | |
| 6,273,819 B1 | 8/2001 | Strauss et al. | |
| 6,301,534 B1 | 10/2001 | McDermott, Jr. et al. | |
| 6,304,250 B1 | 10/2001 | Yang et al. | |
| 6,315,673 B1 | 11/2001 | Kopera et al. | |
| 6,323,614 B1 | 11/2001 | Palazzolo et al. | |
| 6,323,654 B1 | 11/2001 | Needle et al. | |
| 6,331,841 B1 | 12/2001 | Tokuhashi et al. | |
| 6,331,856 B1 | 12/2001 | Van Hook et al. | |
| 6,337,954 B1 | 1/2002 | Soshi et al. | |
| 6,361,507 B1 | 3/2002 | Foxlin | |
| 6,369,794 B1 | 4/2002 | Sakurai et al. | |
| 6,375,572 B1 | 4/2002 | Masuyama et al. | |
| 6,377,793 B1 | 4/2002 | Jenkins | |
| 6,377,906 B1 | 4/2002 | Rowe | |
| 6,400,996 B1 | 6/2002 | Hoffberg et al. | |
| 6,409,687 B1 | 6/2002 | Foxlin | |
| 6,415,223 B1 | 7/2002 | Lin et al. | |
| 6,421,056 B1 | 7/2002 | Nishiumi et al. | |
| 6,424,333 B1 | 7/2002 | Tremblay | |
| 6,426,719 B1 | 7/2002 | Nagareda et al. | |
| 6,426,741 B1 | 7/2002 | Goldsmith et al. | |
| 6,452,494 B1 | 9/2002 | Harrison | |
| 6,456,276 B1 | 9/2002 | Park | |
| 6,466,198 B1 | 10/2002 | Feinstein | |
| 6,466,831 B1 | 10/2002 | Shibata et al. | |
| 6,473,713 B1 | 10/2002 | McCall et al. | |
| 6,474,159 B1 | 11/2002 | Foxlin et al. | |
| 6,484,080 B2 | 11/2002 | Breed | |
| 6,492,981 B1 | 12/2002 | Stork et al. | |
| 6,538,675 B2 | 3/2003 | Aratani et al. | |
| 6,544,124 B2 | 4/2003 | Ireland et al. | |
| 6,544,126 B2 | 4/2003 | Sawano et al. | |
| 6,545,661 B1 | 4/2003 | Goschy et al. | |
| 6,567,536 B2 | 5/2003 | McNitt et al. | |
| 6,572,108 B1 | 6/2003 | Bristow | |
| 6,577,350 B1 | 6/2003 | Proehl et al. | |
| 6,582,380 B2 | 6/2003 | Kazlausky et al. | |
| 6,590,536 B1 | 7/2003 | Walton | |
| 6,591,677 B2 | 7/2003 | Rothoff | |
| 6,597,443 B2 | 7/2003 | Boman | |
| 6,599,194 B1 | 7/2003 | Smith et al. | |
| 6,609,977 B1 | 8/2003 | Shimizu et al. | |
| 6,616,607 B2 | 9/2003 | Hashimoto et al. | |
| 6,628,257 B1 | 9/2003 | Oka et al. | |
| 6,636,826 B1 | 10/2003 | Abe et al. | |
| 6,650,029 B1 | 11/2003 | Johnston | |
| 6,650,313 B2 | 11/2003 | Levine et al. | |
| 6,650,345 B1 | 11/2003 | Saito et al. | |
| 6,654,001 B1 | 11/2003 | Su | |
| 6,672,962 B1 | 1/2004 | Ozaki et al. | |
| 6,676,520 B2 | 1/2004 | Nishiumi | |
| 6,677,990 B1 | 1/2004 | Kawahara | |
| 6,681,629 B2 | 1/2004 | Foxlin et al. | |
| 6,686,954 B1 | 2/2004 | Kitaguchi et al. | |
| 6,692,170 B2 | 2/2004 | Abir | |
| 6,693,622 B1 | 2/2004 | Shahoian et al. | |
| 6,712,692 B2 | 3/2004 | Basson et al. | |
| 6,717,673 B1 | 4/2004 | Shahoian et al. | |
| 6,718,280 B2 | 4/2004 | Hermann | |
| 6,725,173 B2 | 4/2004 | An et al. | |
| 6,736,009 B1 | 5/2004 | Schwabe | |
| 6,747,632 B2 | 6/2004 | Howard | |
| 6,747,690 B2 | 6/2004 | Mølgaard | |
| 6,753,849 B1 | 6/2004 | Curran et al. | |
| 6,753,888 B2 | 6/2004 | Kamiwada et al. | |
| 6,757,068 B2 | 6/2004 | Foxlin | |
| 6,757,446 B1 | 6/2004 | Li et al. | |
| 6,765,553 B1 | 7/2004 | Odamura | |
| 6,786,877 B2 | 9/2004 | Foxlin | |
| 6,796,177 B2 | 9/2004 | Mori | |
| 6,811,489 B1 | 11/2004 | Shimizu et al. | |
| 6,813,525 B2 | 11/2004 | Reid et al. | |
| 6,813,584 B2 | 11/2004 | Zhou et al. | |
| 6,836,705 B2 | 12/2004 | Hellmann et al. | |
| 6,836,751 B2 | 12/2004 | Paxton et al. | |
| 6,836,971 B1 | 1/2005 | Wan | |
| 6,842,991 B2 | 1/2005 | Levi et al. | |
| 6,850,844 B1 | 2/2005 | Walters et al. | |
| 6,856,327 B2 | 2/2005 | Choi | |
| 6,868,738 B2 | 3/2005 | Moscrip et al. | |
| 6,872,139 B2 | 3/2005 | Sato et al. | |
| 6,873,406 B1 | 3/2005 | Hines et al. | |
| 6,897,845 B2 | 5/2005 | Ozawa | |
| 6,897,854 B2 | 5/2005 | Cho et al. | |
| 6,908,386 B2 | 6/2005 | Suzuki et al. | |
| 6,908,388 B2 | 6/2005 | Shimizu et al. | |
| 6,922,632 B2 | 7/2005 | Foxlin | |
| 6,925,410 B2 | 8/2005 | Narayanan | |
| 6,929,548 B2 | 8/2005 | Wang | |
| 6,933,923 B2 | 8/2005 | Feinstein | |
| 6,954,980 B2 | 10/2005 | Song | |
| 6,956,564 B1 | 10/2005 | Williams | |
| 6,982,697 B2 | 1/2006 | Wilson et al. | |
| 6,983,219 B2 * | 1/2006 | Mantyjarvi et al. | 702/153 |
| 6,984,208 B2 | 1/2006 | Zheng | |
| 6,990,639 B2 | 1/2006 | Wilson | |
| 6,998,966 B2 | 2/2006 | Pedersen et al. | |
| 7,000,469 B2 | 2/2006 | Foxlin et al. | |
| 7,002,591 B1 | 2/2006 | Leather et al. | |
| 7,031,875 B2 | 4/2006 | Ellenby et al. | |
| 7,094,147 B2 | 8/2006 | Nakata et al. | |
| 7,098,891 B1 | 8/2006 | Pryor | |
| 7,098,894 B2 | 8/2006 | Yang et al. | |
| 7,102,616 B1 | 9/2006 | Sleator | |
| 7,107,168 B2 | 9/2006 | Oystol et al. | |
| 7,126,584 B1 | 10/2006 | Nishiumi et al. | |
| 7,127,370 B2 | 10/2006 | Kelly et al. | |
| 7,149,627 B2 | 12/2006 | Ockerse et al. | |
| 7,154,475 B2 | 12/2006 | Crew | |
| 7,173,604 B2 | 2/2007 | Marvit et al. | |
| 7,176,919 B2 | 2/2007 | Drebin et al. | |
| 7,182,691 B1 | 2/2007 | Schena | |
| 7,183,480 B2 | 2/2007 | Nishitani et al. | |
| 7,184,059 B1 | 2/2007 | Fouladi et al. | |
| 7,220,220 B2 | 5/2007 | Stubbs et al. | |
| 7,231,063 B2 | 6/2007 | Naimark et al. | |

| Patent/Publication | Date | Name |
|---|---|---|
| 7,236,156 B2 | 6/2007 | Liberty et al. |
| 7,239,301 B2 | 7/2007 | Liberty et al. |
| 7,301,527 B2 | 11/2007 | Marvit |
| 7,301,648 B2 | 11/2007 | Foxlin |
| 7,335,134 B1 | 2/2008 | LaVelle |
| 7,395,181 B2 | 7/2008 | Foxlin |
| 7,445,550 B2 | 11/2008 | Barney et al. |
| 7,596,466 B2 * | 9/2009 | Ohta ............................ 702/152 |
| 2002/0024500 A1 | 2/2002 | Howard |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0140745 A1 | 10/2002 | Ellenby et al. |
| 2002/0158843 A1 | 10/2002 | Levine et al. |
| 2003/0038778 A1 | 2/2003 | Noguera et al. |
| 2003/0063068 A1 | 4/2003 | Anton et al. |
| 2003/0107551 A1 | 6/2003 | Dunker |
| 2003/0193572 A1 | 10/2003 | Wilson et al. |
| 2003/0204361 A1 | 10/2003 | Townsend et al. |
| 2003/0216176 A1 | 11/2003 | Masuyama et al. |
| 2003/0222851 A1 | 12/2003 | Lai et al. |
| 2004/0028258 A1 | 2/2004 | Naimark et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0236453 A1 * | 11/2004 | Szoboszlay ................ 700/121 |
| 2004/0239626 A1 | 12/2004 | Noguera |
| 2004/0259651 A1 | 12/2004 | Storek |
| 2004/0268393 A1 | 12/2004 | Hunleth et al. |
| 2005/0020369 A1 | 1/2005 | Davis et al. |
| 2005/0047621 A1 | 3/2005 | Cranfill |
| 2005/0054457 A1 | 3/2005 | Eyestone et al. |
| 2005/0076161 A1 | 4/2005 | Albanna et al. |
| 2005/0125826 A1 | 6/2005 | Hunleth et al. |
| 2005/0172734 A1 | 8/2005 | Alsio |
| 2005/0174324 A1 | 8/2005 | Liberty et al. |
| 2005/0179644 A1 | 8/2005 | Alsio |
| 2005/0210418 A1 * | 9/2005 | Marvit et al. ............... 715/863 |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0217525 A1 | 10/2005 | McClure |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0092133 A1 | 5/2006 | Touma et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0178212 A1 | 8/2006 | Penzias |
| 2006/0252475 A1 | 11/2006 | Zalewski et al. |
| 2006/0256081 A1 | 11/2006 | Zalewski et al. |
| 2006/0264260 A1 | 11/2006 | Zalewski et al. |
| 2006/0282873 A1 | 12/2006 | Zalewski et al. |
| 2006/0287085 A1 * | 12/2006 | Mao et al. ...................... 463/37 |
| 2006/0287086 A1 | 12/2006 | Zalewski et al. |
| 2006/0287087 A1 | 12/2006 | Zalewski et al. |
| 2007/0252815 A1 | 11/2007 | Kuo et al. |
| 2007/0257884 A1 * | 11/2007 | Taira et al. .................. 345/158 |
| 2007/0265076 A1 | 11/2007 | Lin et al. |
| 2008/0119270 A1 * | 5/2008 | Ohta ............................ 463/37 |
| 2008/0273011 A1 | 11/2008 | Lin |
| 2008/0278445 A1 | 11/2008 | Sweetser et al. |
| 2009/0326851 A1 * | 12/2009 | Tanenhaus ................... 702/96 |

FOREIGN PATENT DOCUMENTS

| | | |
|---|---|---|
| DE | 19701344 | 7/1997 |
| DE | 19701374 | 7/1997 |
| DE | 19048487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 0 835 676 | 4/1998 |
| EP | 1 206 950 | 5/2002 |
| EP | 1 411 461 | 4/2004 |
| GB | 1524334 | 9/1978 |
| GB | 2284478 | 6/1995 |
| GB | 2307133 | 5/1997 |
| GB | 2316482 | 2/1998 |
| GB | 2319374 | 5/1998 |
| JP | 62-143124 | 6/1987 |
| JP | 3-059619 | 11/1991 |
| JP | 2901476 | 12/1993 |
| JP | 3262677 | 5/1994 |
| JP | 3194841 | 10/1994 |
| JP | 6-308879 | 11/1994 |
| JP | 3273531 | 11/1994 |
| JP | 7-028591 | 1/1995 |
| JP | 3228845 | 1/1995 |
| JP | 7-146123 | 6/1995 |
| JP | 3517482 | 6/1995 |
| JP | 7-200142 | 8/1995 |
| JP | 7-302148 | 11/1995 |
| JP | 7-318332 | 12/1995 |
| JP | 8-095704 | 4/1996 |
| JP | 8-106352 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 8-335136 | 12/1996 |
| JP | 9-230997 | 9/1997 |
| JP | 9-274534 | 10/1997 |
| JP | 9-319510 | 12/1997 |
| JP | 10-154038 | 6/1998 |
| JP | 2000-270237 | 9/2000 |
| JP | 2000-308756 | 11/2000 |
| JP | 2001-175412 | 6/2001 |
| JP | 2002-062981 | 2/2002 |
| JP | 2002-091692 | 3/2002 |
| JP | 2002-153673 | 5/2002 |
| JP | 2004-062774 | 2/2004 |
| JP | 2006-113019 | 4/2006 |
| NL | 9300171 | 8/1994 |
| RU | 2125853 C1 | 2/1999 |
| RU | 2126161 C1 | 2/1999 |

| | | |
|---|---|---|
| RU | 2141738 C1 | 11/1999 |
| WO | WO 9712337 | 4/1997 |
| WO | WO 9811528 | 3/1998 |
| WO | WO 01/86920 | 11/2001 |
| WO | WO 00187426 | 11/2001 |
| WO | WO 01091042 A2 | 11/2001 |
| WO | WO 03107260 A2 | 6/2003 |
| WO | WO 03088147 A1 | 10/2003 |
| WO | WO 2004039055 | 5/2004 |
| WO | 2004/051391 | 6/2004 |

OTHER PUBLICATIONS

Electronic Entertainment Expo (E3) advertisement for G-Force Tilt "TILTFORCE² Motion-Sensing & Vibration Controller for Playstation Game Console".

News Article "New Game Controllers Using Analog Devices' G-Force Tilt to be Featured at E3", Norwood, MA (May 10, 1999).

Youtube video: "Nintendo Wii Controller Invented By Americans" http://www.youtube.com/watch?v=wjLhSrSxFNw, Jun. 28, 2000.

Youtube Fox News Video: "Interview with Pat Goschy, the "Real" Nintendo Wii Inventor" http://www.youtube.com/watch?v=oKtZysYGDLE.

Odell, "An Optical Pointer for Infrared Remote Controllers," Proceedings of International Conference on Consumer Electronics (1995).

Odell, Transcript of Testimony, Investigation No, 337-TA-658, Before the United States International Trade Commission, vol. IV, redacted (May 14, 2009).

Selectech, Selectech AirMouse Devices (image) (1991).

Selectech, "Selectech AirMouse Remote Controls, Model # AM-R1," photographs (1991).

Selectech, "Airmouse Remote Control System Model AM-1 User's Guide," Colchester, VT (Sep. 24, 1991).

Selectech, Facsimile Transmission from Rossner to Monastiero, Airmouse Remote Controls, Colchester, VT (Mar. 25, 1992).

Selectech, "Changing Driver Versions on CDTV/AMIGA" (Oct. 17, 1991).

Selectech, "AirMouse Remote Controls, AirMouse Remote Control Warranty" (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).

Wilson, "Wireless User Interface Devices for Connected Intelligent Environments," Ubicomp 2003 Workshop (2003).

Wilson, "WorldCursor: Pointing in Intelligent Environments with a Tele-operated Laser Pointer," UIST '03 Companion (Nov. 2003).

Wilson, Research page, biography available at http://researeh.microsoft.com/en-us/um/people/awilson/?0sr=a, Microsoft Corp. (2009).

Wilson, XWand video, http://research.microsoft.com/~awilson/wand/wand%20video%20768k.WMV (Mar. 2002).

Wilson, Transcript of Testimony, Investigation No. 337-TA-658, Before the United States International Trade Commission, vol. V (May 15, 2009).

Acar, "Robust Micromachined Vibratory Gyroscopes" Dissertation (Dec. 2004).

Acar, et al., "Experimental evaluation and comparative analysis of commercial variable-capacitance MEMS accelerometers," *Journal of Micromechanics and Microengineering*, vol. 13 (1), pp. 634-645 (May 2003).

Agard, Agard, "Advances in Strapdown Inertial Systems," Lecture Series Advisory Group for Aerospace Research and Development Neuilly-Sur-Seine (France) (1984).

Albrecht, "An Adaptive Digital Filter to Predict Pilot Head Look Direction for Helmet-mounted Displays," MS Thesis University of Dayton (copy unavailable) (1989).

Algrain, "Estimation of 3-D Angular Motion Using Gyroscopes and Linear Accelerometers," IEEE ransactions on Aerospace and Electronic Systems, vol. 27, No. 6, pp. 910-920 (Nov. 1991).

Algrain, et al., "Accelerometer Based Line-of-Sight Stabilization Approach for Pointing and Tracking System," Second IEEE Conference on Control Applications, vol. 1 , Issue 13-16 pp. 159-163 (Sep. 1993).

Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).

Allen, et al., "A General Method for Comparing the Expected Performance of Tracking and Motion Capture Systems," {VRST}'05: Proceedings of the ACM symposium on Virtual reality software and technology, pp. 201-210 (Nov. 2005).

Allen, et al., "Tracking: Beyond 15 Minutes of Thought," SIGGRAPH 2001 Course 11 (Course Pack) from Computer Graphics (2001).

Alves, "Extended Kalman filtering applied to a full accelerometer strapdown inertial measurement unit," M.S. Thesis Massachusetts Institute of Technology. Dept. Of Aeronautics and Astronautics, Santiago (1992).

Analog Devices "ADXL50 Single Axis Accelerometer" (Data Sheet), http://www.analog.com/en/obsolete/adxl50/products/product.html (Mar. 1996).

Analog Devices "ADXL202E Low-Cost ±2 g Dual-Axis Accelerometer with Duty Cycle Output" (Data Sheet), Rev. A (2000).

Analog Devices "ADXL330 Small, Low Power, 3-Axis ±2 g iMEMS Accelerometer" (Data Sheet), Rev. PrA (2005).

Analog Devices "ADXRS150 ±150°/s Single Chip Yaw Rate Gyro with Signal Conditioning" (Data Sheet), Rev. B (2004).

Analog Devices "ADXRS401 ±75°/s Single Chip Yaw Rate Gyro with Signal Conditioning" (Data Sheet), Rev. O (2004).

Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).

Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).

Apostolyuk, Vladislav, "Theory and design of micromechanical vibratory gyroscopes," MEMS/NEMS Handbook, Springer, 2006, vol. 1, pp. 173-195 (2006).

Arcanatech, IMP (Photos) (1994).

Arcanatech, "IMP User's Guide" (1994).

Ascension Technology, The Bird 6D Input Devices (specification) (1998).

Ator, "Image-Velocity with Parallel-Slit Reticles," Journal of the Optical Society of America (Dec. 1963).

Azarbayejani, et al, "Real-Time 3-D Tracking of the Human Body," Proceedings of Image'Com 96 (1996).

Azarbayejani, et al., "Visually Controlled Graphics," IEEE Transactions on Pattern Analysis and Machine Intelligence, vol. 15, No. 6, pp. 602-605 (Jun. 1993).

Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197 - 204 (1994).

Azuma et al., "Making Augmented Reality Work Outdoors Requires Hybrid Tracking, "Proceedings of the International Workshop on Augmented Reality, San Francisco, CA, Nov. 1, 1998, Bellevue, Washington, pp. 219 - 224 (1999).

Azuma, "Predictive Tracking for Augmented Reality," Ph.D. Dissertation, University of North Carolina at Chapel Hill (1995).

Azuma, Et Al., "A Frequency-Domain Analysis of Head-Motion Prediction," Proceedings of SIGGRAPH '94, pp. 401-408 (1995).

Azuma, et al., "A motion-stabilized outdoor augmented reality system," Proceedings of IEEE Virtual Reality '99, Houston, TX (Mar. 1999).

Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).

Bachmann et al., "Orientation Tracking for Humans and Robots Using Inertial Sensors" (CIRA '99), Naval Postgraduate School, Monterey, CA (1999).

Bachmann, "Inertial and Magnetic Angle Tracking of Limb Segments for Inserting Humans into Synthetic Environments," Dissertation, Naval Postgraduate School, Monterey, CA (Dec. 2000).

Baker et al., "Active Multimodal Control of a Floppy Telescope Structure," Proc. SPIE, vol. 4825, 74 (Mar. 2003).

Balakrishnan, "The Rockin' Mouse: Integral 3D Manipulation on a Plane," (CHI '97), Univ. Toronto, (1997).

Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).

Baraff, "An Introduction to Physically Based Modeling," SIGGRAPH 97 Course Notes (1997).

Baudisch, et al., "Soap: a pointing device that works in mid-air" Proc. UIST (2006).

BBN Report, "Virtual Environment Technology for Training (VETT)," The Virtual Environment and Teleoperator Research Consortium (VETREC) (Mar. 1992).

Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).

Behringer, "Registration for Outdoor Augmented Reality Applications Using Computer Vision Techniques and Hybrid Sensors," Virtual Reality, 1999 Proceedings., IEEE Computer Society, pp. 244-261 (1999).

BEI, "BEI GyrochipTM Model QRS11 Data Sheet," BEI Systron Donner Inertial Division, BEI Technologies, Inc., (Sep. 1998).

BEI Systron Donner Inertial Division, Gyrochip Theory of Operation (copy unavailable) (2001).

Benbasat, "An Inertial Measurement Unit for User Interfaces," Massachusetts Institute of Technology Dissertation, (Sep. 2000).

Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).

Beuter, A., Publications, University of Quebec at Montreal, http://wvvw.er.uqam.ca/nobel/r11040/publicat.htm (Aug. 2007).

BGM-109 Tomahawk, http://en.wikipedia.org/wiki/BGM-109_Tomahawk, Wikipedia, Jan. 2009.

Bhatnagar, "Position trackers for Head Mounted Display systems: A survey" (Technical Report), University of North Carolina at Chapel Hill (Mar. 1993).

Bianchi, "A Tailless Mouse, New cordless Computer Mouse Invented by ArcanaTech." Inc, Article (Jun. 1992).

Bishop, "The Self-Tracker: A Smart Optical Sensor on Silicon," Ph.D. Dissertation, Univ. Of North Carolina at Chapel Hill (1984).

Bishop, et al., "Grids Progress Meeting" (Slides), University of North Carolina at Chapel Hill, NC (1998).

Bishop, et al., Self-Tracker: Tracking for Hybrid Environments without Infrastructure (1996).

Bona, et al., "Optimum Reset of Ship's Inertial Navigation System," IEEE Transactions on Aerospace and Electronic Systems (1965).

Borenstein, et al., "Where am I? Sensors and Methods for Mobile Robot Positioning" (1996).

Boser, "3-Axis Accelerometer with Differential Sense Electronics," http://www.eecs.berkeley.edu/~boser/pdf/3axis.pdf (1997).

Boser, "Accelerometer Design Example: Analog Devices XL-05/5," http://wvvw.eecs.berkeley.edu/~boser/pdf/xI05.pdf (1996).

Bowman et al., 3D User Interfaces: Theory and Practice, Addison-Wesley, Inc., (2005).

Bowman,. et al, "An Introduction to 3-D User Interface Design," MIT Presence, vol. 10, No. 1, pp. 96-108 (2001).

Britton et al., "Making Nested rotations Convenient for the User," ACM SIGGRAPH Computer Graphics, vol. 12, Issue 3, pp. 222-227 (Aug. 1978).

Britton, "A Methodology for the Ergonomic Design of Interactive Computer Graphic Systems, and its Application to Crystallography" (UNC Thesis) (1977).

Business Wire, "Feature/Virtual reality glasses that interface to Sega channel," Time Warner, TCI: project announced concourrent with COMDEX (Nov. 1994).

Business Wire, "Free-space 'Tilt' Game Controller for Sony Playstation Uses Scenix Chip; SX Series IC Processes Spatial Data in Real Time for On-Screen" (Dec. 1999).

Business Wire, "InterSense Inc. Launches InertiaCube2 - The World's Smallest Precision Orientation Sensor With Serial Interface" (Aug. 14, 2001).

Business Wire, "Logitech MAGELLAN 3D Controller," Logitech (Apr. 1997).

Business Wire, "Mind Path Introduces GYROPOINT RF Wireless Remote" (Jan. 2000).

Business Wire, "Pegasus' Wireless PenCell Writes On Thin Air with ART's Handwriting Recognition Solutions," Business Editors/High Tech Writers Telecom Israel 2000 Hall 29, Booth 19-20 (Nov. 2000).

Business Wire, "RPI ships low-cost pro HMD Plus 3D Mouse and VR PC graphics card system for CES" (Jan. 1995).

Buxton, Bill, "Human input/output devices," In M. Katz (ed.), Technology Forecast: 1995, Menlo Park, C.A.: Price Waterhouse World Firm Technology Center, 49-65 (1994).

Buxton, Bill, A Directory of Sources for Input Technologies, http://www.billbuxton.com/InputSources.html, Apr. 2001 (last update 2008).

Byte, "Imp Coexists With Your Mouse," What's New, ArcaneTec (Jan. 1994).

Canaday, R67-26 "The Lincoln Wand," IEEE Transactions on Electronic Computers, vol. EC-16, No, 2, p. 240 (Apr. 1967).

Caruso et al., "New Perspective on Magnetic Field Sensing," Sensors Magazine (Dec. 1998).

Caruso et al., "Vehicle Detection and Compass Applications using AMR Magnetic Sensors", Honeywell (May 1999).

Caruso, "Application of Magnetoresistive Sensors in Navigation Systems," Sensors and Actuators, SAE SP-1220, pp. 15-21 (Feb. 1997).

Caruso, "Applications of Magnetic Sensors for Low Cost Compass Systems," Honeywell, SSEC, http://www.ssec.honeywell.com/magnetic/datasheets/lowcost.pdf (May 1999).

Chatfield, "Fundamentals of High Accuracy Inertial Navigation," vol. 174 Progress in Astronautics and Aeronautics, American Institute of Aeronautics and Astronautics, Inc. (1997).

Cheng, "Direct interaction with large-scale display systems using infrared laser tracking devices," ACM International Conference Proceeding Series; vol. 142 (2003).

Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (2004).

Computergram, "RPI Entertainment Pods Improve Virtual Experience" (1995).

Cookbook, Numerical Recipes Electronic Edition, http://wvvw.library.cornell.edu/nr/cbookcpdf.html.

Cooke, et al., "NPSNET: flight simulation dynamic modeling using quaternions," Presence, vol. 1, No. 4,pp. 404-420, MIT Press (1992/1994).

CSIDC Winners - Tablet-PC Classroom System Wins Design Competition, IEEE Computer Society Press, vol. 36 , Issue 8, pp. 15 - 18, IEEE Computer Society (Aug. 2003).

Cutrone, "Hot products: Gyration GyroPoint Desk, GyroPoint Pro gyroscope-controlled wired and wireless mice" (Computer Reseller News) (Dec. 1995).

Cutts, "A Hybrid Image/Inertial System for Wide-Area Tracking" (Internal to UNC-CH Computer Science) (Jun. 1999).

Deruyck, et al., "An Electromagnetic Position Sensor," Polhemus Navigation Sciences, Inc., Burlington, VT (Nov. 1973).

Donelson, et al., "Spatial Management of Information" (1978).

Elβ&ele, "Orientation as an additional User Interface in Mixed-Reality Environments," 1. workshop Ervwiterte and Virtuelle Realität, pp. 79-90. GI-Fachgruppe AR/VR (2007).
Enura, et al., "Sensor Fusion Based Measurement of Human Head Motion," 3rd IEEE International Workshop on Robot and Human Communication (Jul. 1994).
Ferrin, "Survey of Helmet Tracking Technologies," Proc. SPIE vol. 1456, p. 86-94 (Apr. 1991).
Foxlin et al., "An Inertial Head-Orientation Tracker with Automatic Drift Compensation for Use with HMD's," Proceedings of the conference on Virtual reality software and technology, Singapore, Singapore, pp. 159-173 (1994).
Foxlin et al., "Miniature 6-DOF Inertial System for Tracking HMDs," SPIE vol. 3362 (Apr. 1998).
Foxlin et al., "Miniaturization, Calibration & Accuracy Evaluation of a Hybrid Self-Tracker," The Second IEEE and ACM International Symposium on Mixed and Augmented Reality, pp. 151-160 (2003).
Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).
Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp, 212-221 (Nov. 2004).
Foxlin, "Generalized architecture for simultaneous localization, auto-calibration, and map-building," IEEE/RSJ Conf. on Intelligent Robots and Systems, Lausanne, Switzerland (Oct. 2002).
Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000 (2000).
Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).
Foxlin, "Inertial Head-Tracking," MS Thesis, Massachusetts Institute of Technology, Dept. of Electrical Engineering and Computer Science (Sep. 1993).
Foxlin, "Motion Tracking Requirements and Technologies," Chapter 7, from Handbook of Virtual Environment Technology, Stanney Kay, Ed. (2002).
Foxlin, "Pedestrian Tracking with Shoe-Mounted Inertial Sensors," IEEE Computer Graphics and Applications, vol. 25, No. 6, pp. 38-46 (Nov. 2005).
Foxlin, et al., "Constellation: A Wide-Range Wireless Motion-Tracking System for Augmented Reality and Virtual Set Applications," ACM SIGGRAPH, pp. 372-378 (1998).
Foxlin, et al, "VIS-Tracker: A Wearable Vision-Inertial Self-Tracker," IEEE Computer Society (2003).
Freiburg Center for Data Analysis and Modeling--Publications, http://www.fdm.uni-freiburg.de/cms/puplications/publications/ (Aug. 2007).
Friedmann, et al., "Device Synchronization Using an Optimal Linear Filter," SI3D '92: Proceedings of the 1992 symposium on Interactive 3D graphics, pp. 57-62 (1992).
Friedmann, et al., "Synchronization in virtual realities," MIT Presence, vol. 1, No. 1, pp. 139-144 (1992).
Fröhlich, "The Yo Yo; An interaction device combining elastic and isotonic control," at http://wvvw.uni-weimar.de/cms/medien/vr/research/hci/3d-handheld-interaction/the-yoyo-a-handheld-device-combining-elastic-and-isotonic-input,html (2003).
Green, et al., "ADI's iMEMS Angular Rate Sensing Gyroscope," Analog Dialogue (Jan. 2003).
Grimm et al., "Real-Time Hybrid Pose Estimation from Vision and Inertial Data," Proceedings, First Canadian Conference on Computer and Robot Vision, pp. 480-486 (2004).
Gyration Inc., "The Magic Inside GyroPoint"(copy unavailable).
Gyration, "Gyration GP110 Ultra Cordless Optical Mouse Data Sheet," http://www.gyration.com/descriptions/document/GP110-SPEC-EN.pdf (2002).
Gyration, "Gyration GP110 Ultra Cordless Optical Mouse User Manual," http://www.gyration.com/descriptions/document/GP110-MANUAL-EN.pdf (2002).
Gyration, "Gyration Ultra Cordless Optical Mouse," photos (2002).
Gyration, "Gyration MicroGyro 100 Developer Kit Data Sheet," http://web.archive.org/web/19980708122611/www.gyration.com/html/devkit.html (Jul. 1998).
Hamilton Institute, http://www.dcs.gla.ac.uk/.about.rod/, R. Murray-Smith (Aug. 2007).
Harada, et al., "Portable Absolute Orientation Estimation Device with Wireless Network under Accelerated Situation" Proceedings, 2004 IEEE International Conference on Robotics and Automation, vol. 2, Issue , Apr. 26-May 1, 2004 pp. 1412-1417 vol. 2 (Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).
Haykin, et al., "Adaptive Tracking of Linear Time-Variant Systems by Extended RLS Algorithms, IEEE Transactions on Signal Processing," vol. 45, No. 5 (May 1997).
Heath, "Virtual Reality Resource Guide AI Expert," v9 n5 p32(14) (May 1994).
Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112. (Jan. 1999).
Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).
Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).
Hinckley. et al. , "A Survey of Design Issues in Spatial Input," Proceedings of the ACM Symposium on User Interface Software and Technology (1994).
Hogue, "Marvin: A Mobile Automatic Realtime Visual and INertial tracking system," Master's Thesis, York University (2003).
Hogue, et al., "An optical-inertial tracking system for fully-enclosed VR displays," Proceedings of the 1st Canadian Conference on Computer and Robot Vision, pp. 22 - 29 (May 2004 ).
Hollands, Robin, "Sourceless Trackers," VR News (copy unavailable) (Apr. 1995).
Holloway, Richard Lee, "Registration Errors in Augmented Reality Systems," Ph.D. Dissertation, University of North Carolina at Chapel Hill (1995).
Hudson Soft, "Brochure of Toukon Road Brave Warrior, Brave Spirits" (1998).
Inman, "Cheap sensors could capture your every move," http://technology.newscientist.com/article/dn12963-cheap-sensors-could-capture-your-every-move.html (Nov. 2007).
Intersense, "InterSense InertiaCube2 Devices," (Specification) (image) (2001).
Intersense, "InterSense InertiaCube2 Manual for Serial Port Model" (2001).
Intersense, "InterSense IS-1200 FlightTracker Prototype Demonstration" (Video) (Nov. 2004).
Intersense, "InterSense IS-1200 InertiaHawk Datasheet" (2009).
Intersense, "InterSense IS-1200 VisTracker Datasheet" (2007).
Intersense, "InterSense IS-1200 VisTracker Devices," (image) (2007).
Intersense, "InterSense IS-900 MicroTraxTM Datasheet" (2007).
Intersense, "InterSense IS-900 Systems Datasheet" (2007).
Intersense, "InterSense MicroTrax Demo Reel," http://www.youtube,com/watch?v=O2F4fu_CISo (2007).
Intersense, "InterSense Mobile Mixed Reality Demonstration" (Video), http://www.youtube.com/watch?v=daVdzGK0nUE &feature=channel_page (Oct. 2006).
Intersense, "InterSense Motion Gaming Tech Demo," http://www.youtube.com/watch?v=7-3y5tdju4E, InterSense (Mar. 2008).
Intersense, "IS-1200 VisTracker Augmented Maintenance Demonstration" (Video), http://www.intersense.com/IS-1200_Systems.

aspx, http://www.youtube.com/watch?v=IMI78s91WQo &feature=channel_page (Jan. 2009).
Intersense, "IS-1200 VisTracker Industrial Cart Demonstration" (Video), http://www.intersense.com/IS-1200_Systems.aspx, http://www.youtube.com/watch?v=7xKLCvDGMgY &feature=channel_page (Jan. 2008).
Intersense, "IS-900 Product Technology Brief," http://www.intersense.com/uploadedFiles/Products/White_Papers/IS900_Tech_Overview_Enhanced.pdf (1999).
Intersense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).
Izumori et al, High School Algebra: Geometry (1986) 高等学校の代数 幾何改訂版.
Jacob, "Human-Computer Interaction - Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).
Jakubowsk, et al., "Increasing Effectiveness of Human Hand Tremor Separation Process by Using Higher-Order Statistics," Measurement Science Review, vol. 1 (2001).
Jakubowski, et al., "Higher Order Statistics and Neural Network for Tremor Recognition," IEEE Transactions on Biomedical Engineering, vol. 49, No. 2 (Feb. 2002).
Jian, et al., "Adaptive Noise Cancellation," Rice University, http://www.ece.rice.edu/.about.klwang/elec434/elec434.htm, (Aug. 2007).
Jiang, "Capacitive position-sensing interface for micromachined inertial sensors," Dissertation at Univ. of Cal. Berkley (2003).
Ju, et al., "The Challenges of Designing a User Interface for Consumer Interactive Television Consumer Electronics Digest of Technical Papers.," IEEE 1994 International Conference on Volume , Issue , Jun. 21-23, 1994 pp. 114-115 (Jun. 1994).
Keir, et al., "Gesture-recognition with Non-referenced Tracking," IEEE Symposium on 3D User Interfaces, pp. 151-158 (Mar. 25-26, 2006).
Kessler, et al., "The Simple Virtual Environment Library" (MIT Presence) (2000).
Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).
Klein et al.,"Tightly Integrated Sensor Fusion for Robust Visual Tracking," British Machine Vision Computing, vol. 22, No. 10, pp. 769-776 (2004).
Kohlhase, "NASA Report, The Voyager Neptune travel guide," Jet Propulsion Laboratory Publication 89-24, excerpt (Jun. 1989).
Krumm, et al.," How a Smart Environment Can Use Perception," Ubicomp 2001 (Sep. 2001).
Kuipers, Jack B., "SPASYN---An Electromagnetic Relative Position and Orientation Tracking System," IEEE Transactions on Instrumentation and Measurement, vol. 29, No. 4, pp. 462-466 (Dec. 1980).
La Scala, et al., "Design of an Extended Kalman Filter Frequency Tracker," IEEE Transactions on Signal Processing, vol. 44, No. 3 (Mar. 1996).
Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).
Laughlin, et al., "Inertial Angular Rate Sensors: Theory and Applications," Sensors Magazine (Oct. 1992).
Lee et al., "Tilta-Pointer: the Free-Space Pointing Device," Princeton COS 436 Project, http://www.milyehuang.com/cos436/project/specs.html (2004).
Lee, et al., "Innovative Estimation Method with Measurement Likelihood for all-Accelerometer Type Inertial Navigation System," IEEE Transactions on Aerospace and Electronic Systems, vol. 38, No. 1 (Jan. 2002).
Lee, et al., "Two-Dimensional Position Detection System with MEMS Accelerometer for Mouse Applications" Design Automation Conference, 2001. Proceedings, 2001 Page(s): 852-857 (Jun. 2001).

Leonard, "Computer Pointer Controls 3D Images in Free Space," Electronic Design, pp. 160, 162, 165 , (Nov. 1991).
Liang, et al., "On Temporal-Spatial Realism in the Virtual Reality Environment," ACM 1991 Symposium on User Interface Software and Technology (Nov. 1991).
Link, "Field-Qualified Silicon Accelerometers From 1 Milli g to 200,000 g," Sensors (Mar. 1993).
Liu, et al., "Enhanced Fisher Linear Discriminant Models for Face Recognition," Proc, 14.sup.th International Conference on Pattern Recognition, Queensland, Australia (Aug. 1998).
Lobo et al., "Vision and Inertial Sensor Cooperation Using Gravity as a Vertical Reference," IEEE Trans. On Pattern Analysis and Machine Intelligence, vol. 25, No. 12, pp. 1597-1608 (Dec. 2003).
Logitech, "Logitech 2D/6D Mouse Devices Specification" (1991).
Logitech, "Logitech 2D/6D Mouse Technical Reference Manual" (1991).
Logitech, "Logitech Tracker - Virtual Reality Motion Tracker." http://www.vrealities.com/logitech.html.
Logitech, Inc., "3D Mouse & Head Tracker Technical Reference Manual" (1992).
Luinge, Inertial sensing of human movement, Thesis, University of Twente (2002).
Luinge, et al., "Estimation of orientation with gyroscopes and accelerometers," Proceedings of the First Joint BMES/EMBS Conference, 1999., vol. 2, p. 844 (Oct. 1999).
Luthi, P. et al., "Low Cost Inertial Navigation System," and translation (2000).
Mackenzie et al., "A two-ball mouse affords three degrees of freedom," Extended Abstracts of the CHI '97 Conference on Human Factors in Computing Systems, pp. 303-304. New York: ACM (1997).
Mackinlay, "Rapid Controlled Movement Through a Virtual 3D Workspace," ACM SIGGRAPH Computer Graphics archive, vol. 24, No. 4, pp. 171 - 176 (Aug. 1990).
Maclean, "Designing with Haptic Feedback", Proceedings of IEEE Robotics and Automation (ICRA '2000), at 783-88 (Apr. 22-28, 2000).
Masliah, "Measuring the Allocation of Control in 6 Degree of Freedom Human-Computer Interaction asks," Proceedings of the SIGCHI conference on Human factors in computing systems, pp. 25-32 (2001).
Maybeck, "Stochastic Models, Estimation and Control," vol. 1, Mathematics in Science and Engineering, vol. 141 (1979).
Merrill, "FlexiGesture: A sensor-rich real-time adaptive gesture and affordance learning platform for electronic music control," Thesis, Massachusetts Institute of Technology (Jun. 2004).
Meyer et al., "A Survey of Position Tracker," vol. 1, Issue 2, pp. 173 - 200, MIT Presence, (1992).
Microsoft Research Corp., "XWand Devices" (image).
Miles, "New pads lack control," The Times, Dec. 6, 1999 (Dec. 1999).
Mizell, "Using Gravity to Estimate Accelerometer Orientation," IEEE Computer Society (2003).
Morris, "Accelerometry--a technique for the measurement of human body movements," J Biomechanics 6: 729-736 (1973).
Mulder, "How to Build an Instrumental Glove Based on the Powerglove Flex Sensors," PCVR 16, pp. 10-14 (1994).
Mulder, "Human movement tracking technology," School of Kinesiology, Simon Fraser University (Jul. 1994).
Myers, et al., "Interacting at a Distance: Measuring the Performance of Laser Pointers and Other Devices," CHI 2002, (Apr. 2002).
N.I.C.E., "The N.I.C.E. Project" (video), http://www.niceproject.com/about/ (1997).
Naimark, et al., "Circular Data Matrix Fiducial System and Robust Image Processing for a Wearable Vision-Inertial Self-Tracker," Proceedings. International Symposium on Mixed and Augmented Reality, ISMAR (2002).
Naimark, et al., "Encoded LED System for Optical Trackers," Fourth IEEE and ACM International Symposium on Mixed and Augmented Reality, pp. 150-153 (2005).
Navarrete, et al., "Eigenspace-based Recognition of Faces: Comparisons and a new Approach," Image Analysis and Processing (2001).

Newswire PR, "Five New Retailers to Carry Gyration's Gyropoint Point and Gyropoint Pro" (1996).
Newswire PR, "Three-Axis MEMS-based Accelerometer From StMicroelectronics Targets Handheld Terminals," STMicro (Feb. 2003).
Nichols, "Geospatial Registration of Information for Dismounted Soldiers (GRIDS)," Contractor's Progress, Status, and Management Report (Milestone 3 Report to DARPA ETO) (Oct. 1998).
Nintendo, Nintendo Entertainment System (NES) (1984).
Nintendo, NES System and Controllers (1984).
Nintendo, NES Controller (1984).
Nintendo, NES Zapper Guns (1984).
Nintendo, NES Duck Hunt Game (1984).
Nintendo, Nintendo GameBoy System (1989).
Nintendo, Nintendo Super NES (SNES) (1991).
Nintendo, SNES System & Controllers (1991).
Nintendo, SNES Superscope (1991).
Nintendo, Nintendo 64 System (N64) (1996).
Nintendo, Nintendo 64 System and Controllers (1996).
Nintendo, Nintendo 64 Controller (1996).
Nintendo, Nintendo N64 Controller with Rumble Pack (1996-1997).
Nintendo, Nintendo N64 Rumble Packs (1996-1997).
Nintendo, Nintendo GameBoy Color System (1998).
Nintendo, GameBoy Color (1998).
Nintendo, Nintendo: Kirby Tilt & Tumble game, packaging and user manual (Aug. 2000-2001).
Nintendo, Pokemon Pinball (1998).
Nintendo, Nintendo Game Boy Advance System (2001).
Nintendo, Nintendo Game Boy Advance (2001).
Nintendo, Nintendo: WarioWare: Twisted game, packaging and user manual (2004-2005).
Nintendo, Nintendo Game Boy Advance Wireless Adapter (Sep. 26, 2003).
Nintendo, Nintendo GameCube System (2001).
Nintendo, GameCube System and Controller (2001).
Nintendo, GameCube Controller (2001).
Nintendo, Wavebird Wireless Controllers (May 2002).
Nintendo, G3 Wireless Controller (Pelican) (2001).
Nintendo, Game Boy Advance SP System (2003).
Nintendo, Nintendo Game Boy Color Game Cartridge with Built-In Rumble (Jun. 28, 2009).
Nishiyama, "A Nonlinear Filter for Estimating a Sinusoidal Signal and its Parameters in White Noise: On the Case of a Single Sinusoid," IEEE Transactions on Signal Processing, vol. 45, No, 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paradiso, et al., "Interactive Therapy with Instrumented Footwear," CHI 2004, Apr. 24-29, 2004, Vienna, Austria (2004).
Park, Adaptive control strategies for MEMS gyroscopes (Dissertation), Univ. Cal. Berkley (2000).
PCTracker, Product Technology Brief, at http://www.intersense.com/uploadedFiles/Products/White_Papers/PCTracker_Tech_Overview.pdf.
Pelican Accessories G3 Wireless Controller (Sep. 6, 2002).
Perforce, Perforce Controller (image).
Pham, Hubert, "Pointing in Intelligent Environments with the WorldCursor," Proceedings of Interact 2003, Andrew Wilson & (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Polhemus, "Polhemus 3Space Fastrak devices" (image) (2000).
Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," Sensors, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, C., Robotics Institute, http://www.ri.cmu.edu/people/riviere.sub.--cameron.html http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Robbinett et al., "Implementation of Flying, Scaling, and Grabbing in Virtual Worlds," ACM Symposium (1992).
Roberts, "The Lincoln Wand," AFIPS Conference Proceedings, MIT Lincoln Laboratory (1966).
Robinett et al., "The Visual Display Transformation for Virtual Reality," University of North Carolina at Chapel Hill (1994).
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001 ).
Sakai, et al., "Optical Spatial Filter Sensor for Ground Speed," Optical Review, vol. 2, No. 1 pp. 65-67 (1994).
Saxena et al., "In Use Parameter Estimation of Inertial Sensors by Detecting Multilevel Quasi-Static States," Lecture Notes in Computer Science, 2005 - Berlin: Springer-Verlag, (Apr. 2004).
Sayed, "A Framework for State-Space Estimation with Uncertain Models," IEEE Transactions on Automatic Control, vol. 46, No. 7 (Jul. 2001).

Sayed, UCLA Adaptive Systems Laboratory-Home Page, UCLA, http://asl.ee.ucla.edu/index.php?option=com.sub.--frontpage &Itemid=1 (Aug. 2007).

Schofield, Jack et al., Coming up for airpad, The Guardian (Feb. 2000).

Screen Shot of Brave Spirits (1998).

Seoul National Univ., "EMMU System" - Seoul National Univ Power Point Presentation, www.computer.org/portal/cms_docs_ieeecs/ieeecs/education/csidc/CSIDC03Presentations/SNU.ppt (2003).

Shoemake, Ken, Quaternions, UPenn, Online.

Simon, et al. "The YoYo: A Handheld Combining Elastic and Isotonic Input," http://www.uni- weimar.de/cms/fileadmin/medien/vr/documents/publications/TheYoYo-Interact2003-Talk.pdf (2003).

Simon, et al., "The YoYo: A Handheld Device Combining Elastic and Isotonic Input," Human-Computer Interaction —Interact'03, pp. 303-310 (2003).

Smith, "Gyrevolution: Orienting the Digital Era," http://www.gyration,com/images/pdfs/Gyration_White_Paper.pdf (2007).

Sorenson, et al., "The Minnesota Scanner: A Prototype Sensor for Three-Dimensional Tracking of Moving Body Segments," IEEE Transactions on Robotics and Animation (Aug. 1989).

Sourceforge.Com, "ARToolkit API Documentation" (SourceForge web pages) (2004-2006).

Stovall, "Basic Inertial Navigation," NAWCWPNS TM 8128, Navigation and Data Link Section, Systems Integration Branch (Sep. 1997).

Sutherland, "A Head-Mounted Three Dimensional Display," AFIPS '68 (Fall, part 1): Proceedings of the Dec. 9-11, 1968, fall joint computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Sweetster, "A Quaternion Algebra Tool Set," http://world.std.com/%7Esweetster/quaternions/intro/tools/tools.html (Jun. 2005).

Thinkoptics, Thinkoptics Wavit devices (image) (2007).

Timmer, "Data Analysis and Modeling Dynamic Processes in the Life Sciences," Freiburg Center for Data Analysis and Modeling, http://webber.physik.uni-freiburg.de/about.jeti/ (Aug. 2007).

Timmer, "Modeling Noisy Time Series: Physiological Tremor," International Journal of Bifurcation and Chaos, vol. 8, No. 7 (1998).

Timmer, et al, "Pathological Tremors: Deterministic Chaos or Nonlinear Stochastic Oscillators?" Chaos, vol. 10, No. 1 (Mar. 2000).

Timmer, et al., "Characteristics of Hand Tremor Time Series," Biological Cybernetics, vol. 70 (1993).

Timmer, et al., Cross-Spectral Analysis of Physiological Tremor and Muscle Activity: II Application to Synchronized Electromyogram, Biological Cybernetics, vol. 78 (1998).

Timmer, et al., "Cross-Spectral Analysis of Tremor Time Series," International Journal of Bifurcation and Chaos, vol. 10, No. 11 (2000).

Titterton et al., "Strapdown Inertial Navigation Technology," pp. 1-56 and pp. 292-321 (May 1997).

Titterton et al., "Strapdown Inertial Navigation Technology," 2nd ed., Institution of Electrical Engineers (2004).

Tokimec, et al., "A Wearable Attitude-Measurement System Using a Fiberoptic Gyroscope," MIT Presence (Apr. 2002).

UNC Computer Science Department, "News & Notes from Sitterson Hall," UNC Computer Science, Department Newsletter, Issue 24, Spring 1999 (Apr. 1999).

Univ. Illinois at Chicago, "CAVE_A Virtual Reality Theater," http://www.youtube.com/watch?v=-Sf6bJjwSCE 1993.

Univ. Wash., "ARToolkit" (U. Wash. web pages) (1999).

Urban, "BAA 96-37 Proposer Information," DARPA/ETO (1996).

US Dynamics Corp, "Spinning Mass Mechanical Gyroscopes" (Aug. 2006).

US Dynamics Corp, "The Concept of 'Rate' (more particularly, angular rate pertaining to rate gyroscopes) (rate gyro explaination)," (Aug. 2006).

US Dynamics Corp, "US Dynamics Model 475 Series Rate Gyroscope Technical Brief_brief discussion on rate gyroscope basics, operation, and uses, and a dissection of the model by major component" (Dec. 2005).

US Dynamics Corp, "US Dynamics Rate Gyroscope Interface Brief (rate gyro IO)" (Aug. 2006).

Van Den Bogaard, "Using linear filters for real-time smoothing of rotational data in virtual reality application, " http://www.science.uva.rd/research/ias/alumni/m.sc.theses/theses/RobvandenBogaard.pdf (Aug. 2004).

Van Laerhoven, et al., "Using an Autonomous Cube for Basic Navigation and Input," Proceedings of the 5th International Conference on Multimodal interfaces, Vancouver, British Columbia, Canada, pp. 203-210 (2003).

Van Rheeden, et al., "Noise Effects on Centroid Tracker Aim Point Estimation," IEEE Trans. On Aerospace and Electronic Systems, vol. 24, No. 2, pp. 177-185 (Mar. 1988).

Vaz, et al., "An Adaptive Estimation of Periodic Signals Using a Fourier Linear Combiner," IEEE Transactions on Signal Processing, vol. 42, Issue 1, pp. 1-10 (Jan. 1994).

Verplaetse, "Inertial Proprioceptive Devices: Self-Motion Sensing Toys and Tools," IBM Systems Journal (Sep. 1996).

Verplaetse, "Inertial-Optical Motion-Estimating Camera for Electronic Cinematography," Masters of Science Thesis, MIT, (1997).

Vorozcovs, et al.,"The Hedgehog: A Novel Optical Tracking Method for Spatially Immersive Displays," MIT Presence, vol. 15, No. 1, pp. 108-121 (2006).

Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).

Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).

Watt *3D Computer Graphics*, "Three-Dimensional Geometry in Computer Graphics,", pp. 1-22 Addison-Wesley (1999).

Welch et al., "HiBall-3100™ Wide-Area, High-Precision Tracker and 3D Digitizer," http://www.3rdtech.com/HiBall.htm (2002-2006).

Welch et al., HiBall Devices (image) (2002-2006).

Welch et al., Motion Tracking: No Silver Bullet, but a Respectable Arsenal IEEE Computer Graphics and Applications, vol. 22, No. 6, pp. 24-38 (Nov-02).

Welch, "Hybrid Self-Tracker: An Inertial/Optical Hybrid Three-Dimensional Tracking System," Tech. Report TR95-048, Dissertation Proposal, Univ. Of North Carolina at Chapel Hill, Dept. Computer Science, Chapel Hill, N.C. (1995).

Welch, "A Self-Contained Wide-Area Tracker Using Sensor Fusion" (copy unavailable) (2001).

Welch, "Hawkeye Zooms in on Mac Screens with Wireless Infrared Penlight Pointer," MacWeek (May 1993).

Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).

Welch, et al., "High-Performance Wide-Area Optical Tracking: The HiBall Tracking System," MIT Presence: Teleoperators & Virtual Environments (2001).

Welch, et al., "SCAAT: Incremental Tracking with Incomplete Information," Computer Graphics, SIGGRAPH 97 Conference Proceedings, pp. 333-344 (Aug 1997).

Welch, et al., "Source Code for HiBall+lnerital device," UNC-CH Computer Science (copy unavailable) (Jun. 1998).

Welch, et al., "The HiBall Tracker: High-Performance Wide-Area Tracking for Virtual and Augmented Environments," ACM SIGGRAPH, Addison-Wesley (1999).

Welch, et al, "The High-Performance Wide-Area Optical Tracking : The HiBall Tracking System," MIT Presence, Presence, vol. 10 , No. 1 (Feb. 2001).

Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap. 1, pp. 23:47-9 (2008).

Widrow, et al., "Fundamental Relations Between the LMS Algorithm and the DFT," IEEE Transactions on Circuits and Systems, vol. 34, No. CAS-7, (Jul. 1987).

Williams, et al., "Physical Presence: Palettes in Virtual Spaces," Society of Photo-Optical Instrumentation Engineers (SPIE) Conference Series, vol. 3639, No. 374-384 (May 1999).

Wilson, "XWand: UI for Intelligent Environments," http://research.microsoft.com/en-us/um/people/awilson/wand/default.htm (Apr. 2004).

Wilson, et al., "Demonstration of the XWand Interface for Intelligent Spaces," UIST '02 Companion, pp. 37-38 (Oct. 2002).

Wilson, et al., "Gesture Recognition Using the Xwand," ri.cmu.edu (2004).

Wilson, et al., "Xwand: UI for Intelligent Spaces," CHI 2003, Proceedings of the SIGCHI conference on Human factors in computing systems, pp. 545-552 (Apr. 03).

Wilson, Research page, biography available at http://research.microsoft.com/en-us/um/people/awilson/?0sr=a, Microsoft Corp. (2009).

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000 (2000).

Wormell, et al., "Advancements in 3D Interactive Devices for Virtual Environments," ACM International Conference Proceeding Series; Vol. 39 (2003).

Worringham, et al., "Directional Stimulus-Response Compatibility: A Test of Three Alternative Principles," Ergonomics, vol. 41, Issue 6, pp. 864-880 (Jun. 1998).

Worringham, et al., "Tablet-PC Classroom System Wins Design Competition," Computer, vol. 36, No. 8, pp. 15-18 (Aug. 2003).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).

You, et al., "Hybrid Inertial and Vision Tracking for Augmented Reality Registration," http://graphics.usc.edu/cgit/pdf/papers/Vr1999.PDF (1999).

You, et al., "Orientation Tracking for Outdoor Augmented Reality Registration," IEE Computer Graphics and Applications, IEEE, vol. 19, No. 6, pp. 36-42 (Nov. 1999).

Youngblut, et al., "Review of Virtual Environment Interface Technology," Institute for Defense Analyses (Jul. 1996).

Yun, et al., "Recent Developments in Silicon Microaccelerometers," Sensors, University of California at Berkeley (Oct. 1992).

Zhai, "Human Performance in Six Degree of Freedom Input Control," Thesis, University of Toronto (1995).

Zhou, et al., "A survey —Human Movement Tracking and Stroke Rehabilitation," Technical Report: CSM-420, ISSN 1744-8050, Dept. of Computer Sciences, University of Essex, UK (Dec. 8, 2004).

Zhu, et al., "A Real-Time Articulated Human Motion Tracking Using Tri-Axis Inertial/Magnetic Sensors Package," IEEE Transactions On Neural Systems And Rehabilitation Engineering, vol. 12, No. 2 (Jun. 2004).

* cited by examiner

F I G. 4
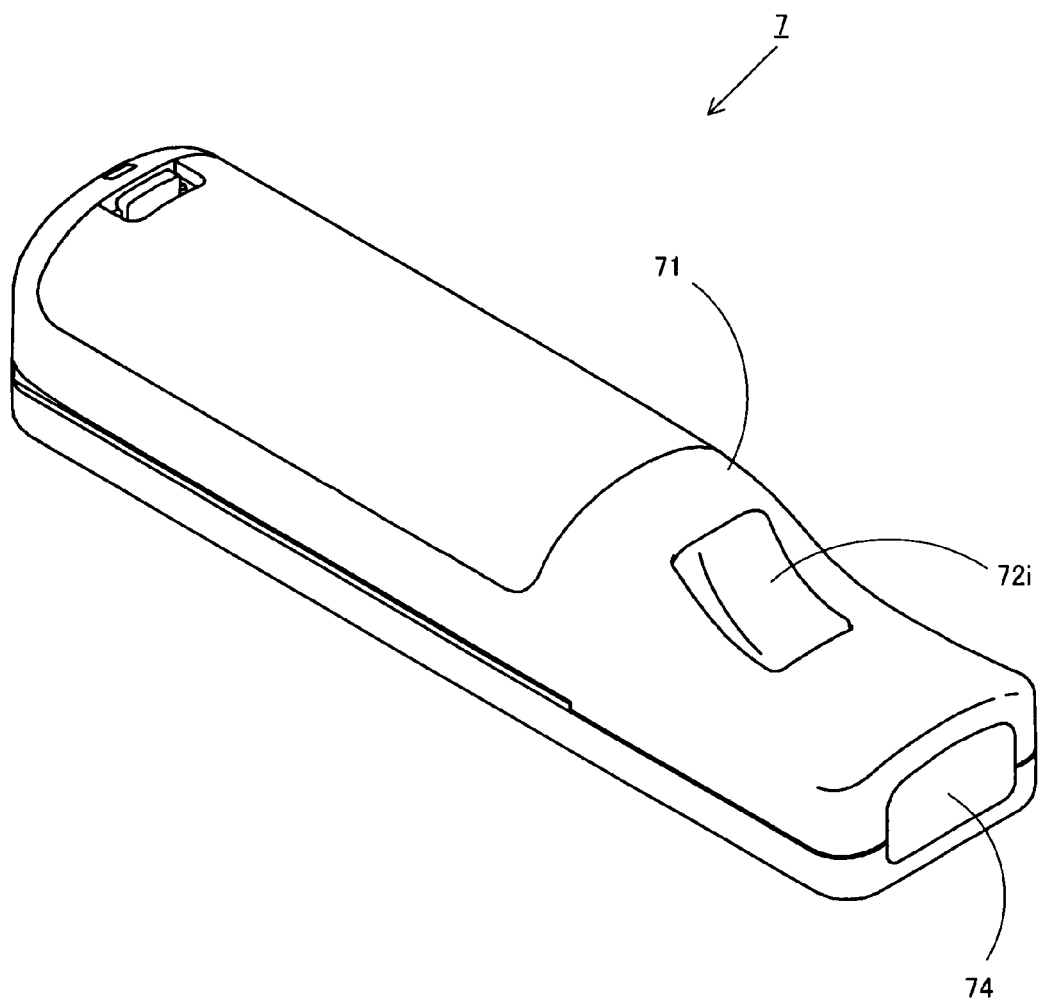

F I G. 5
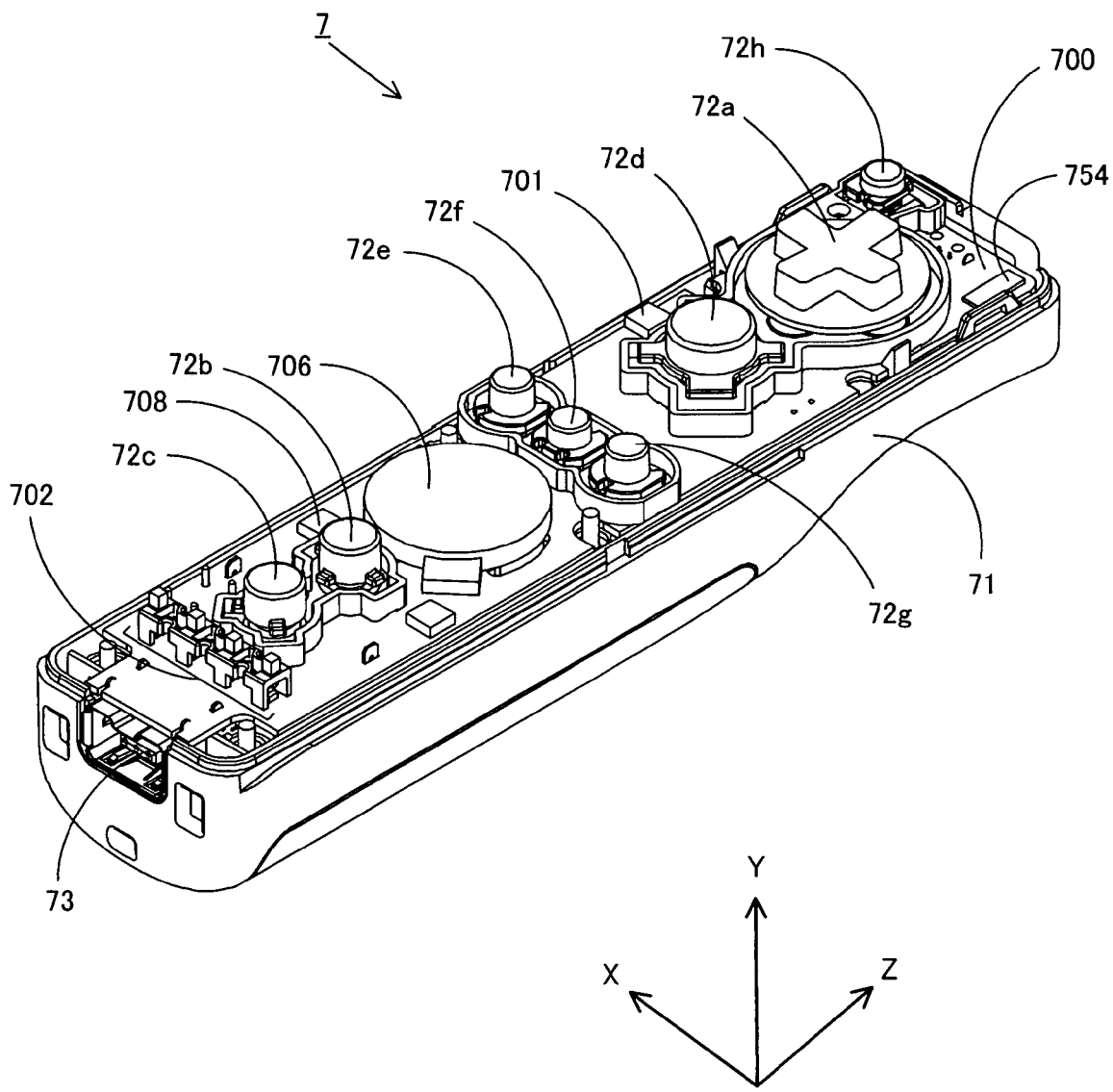

F I G. 7
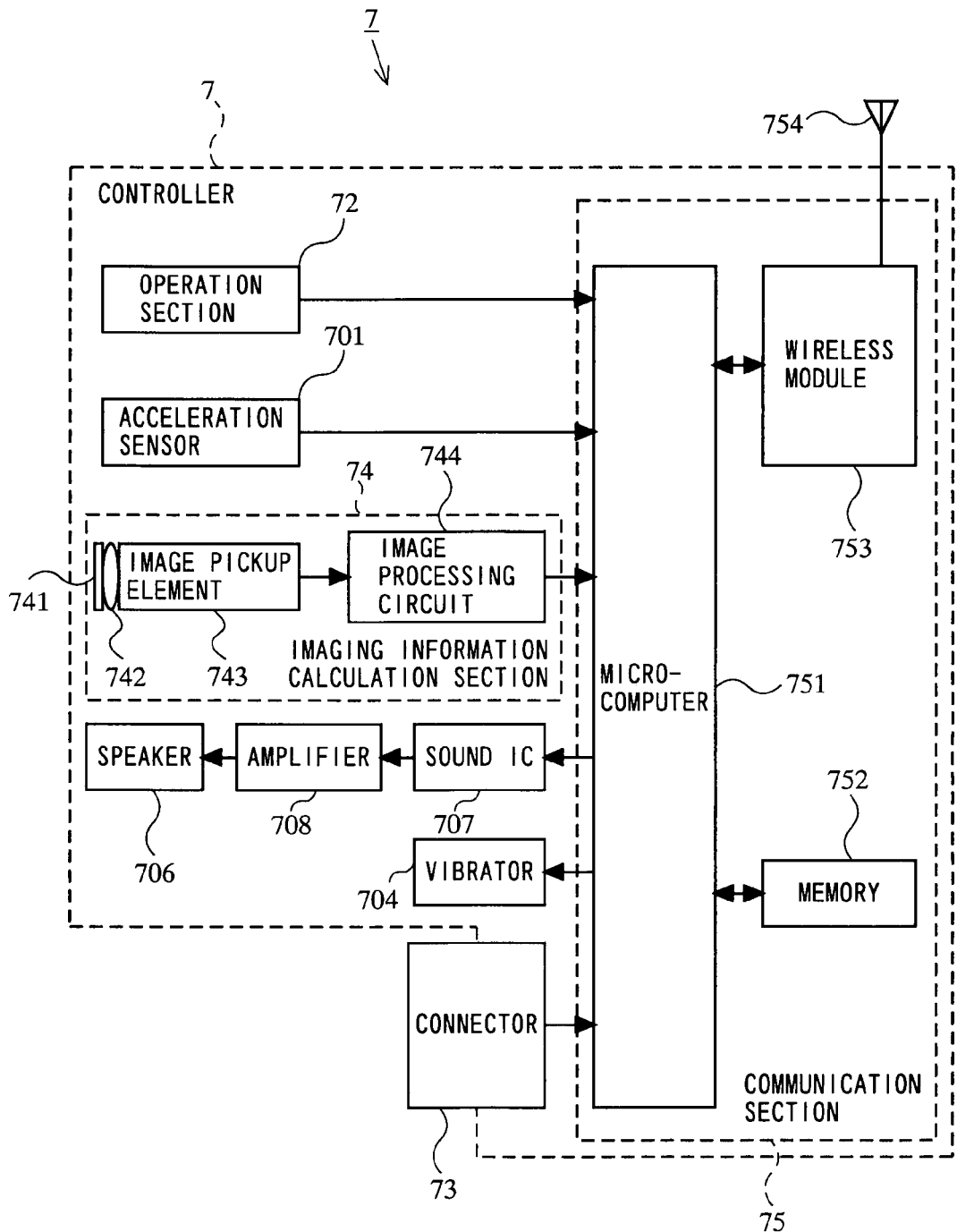

FIG. 8
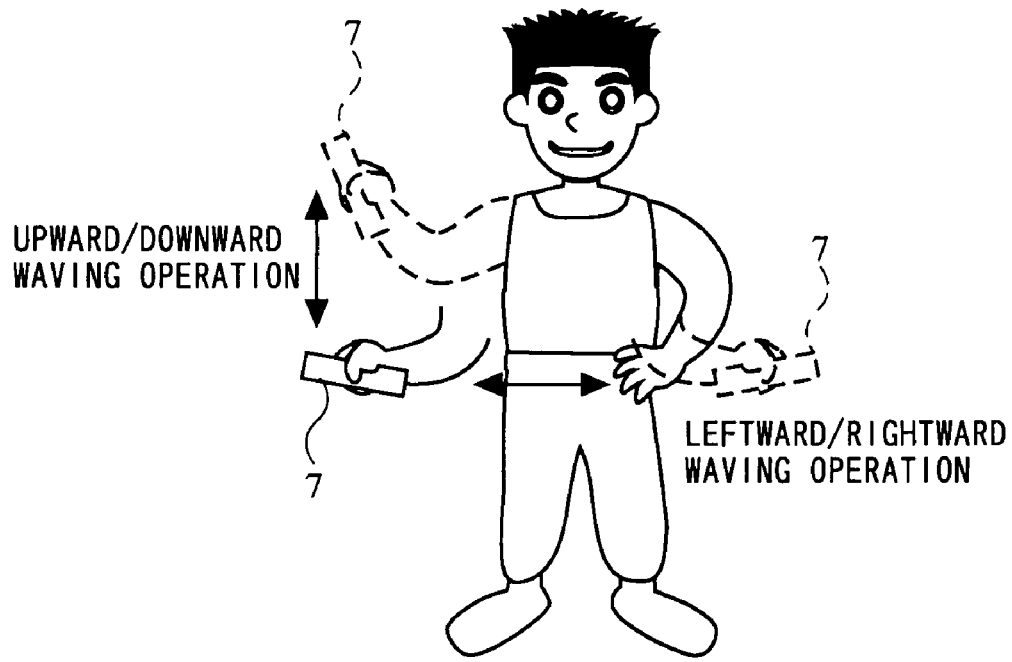
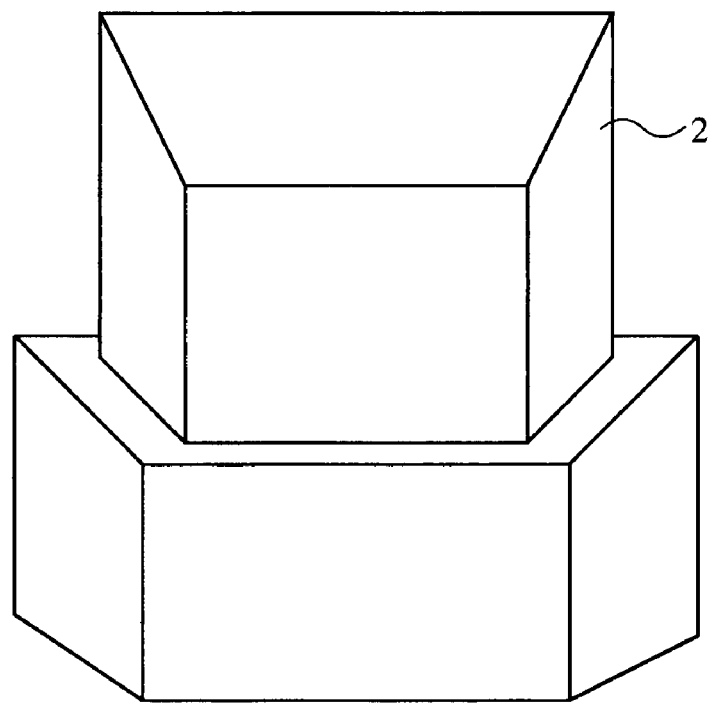

FIG. 9
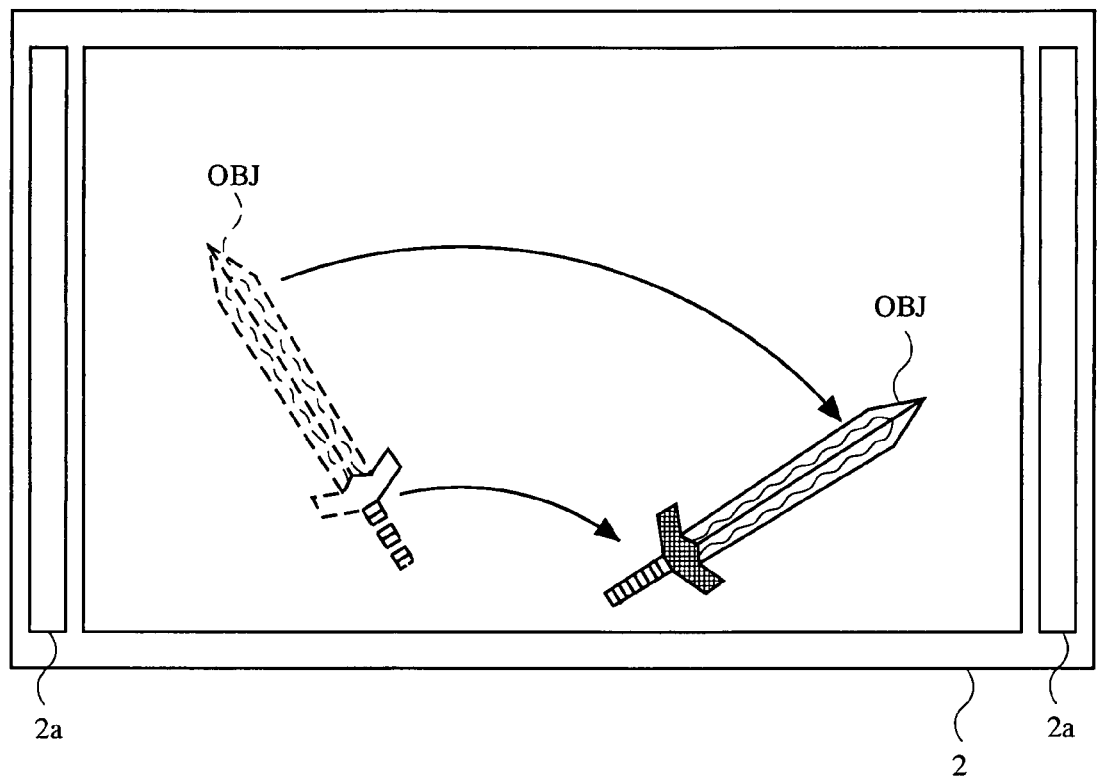
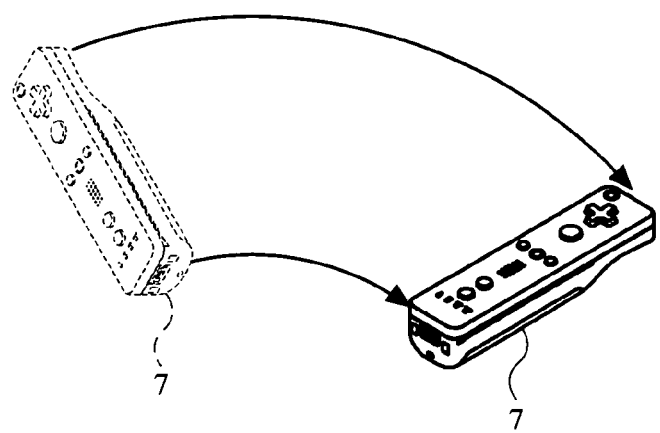

FIG. 10A
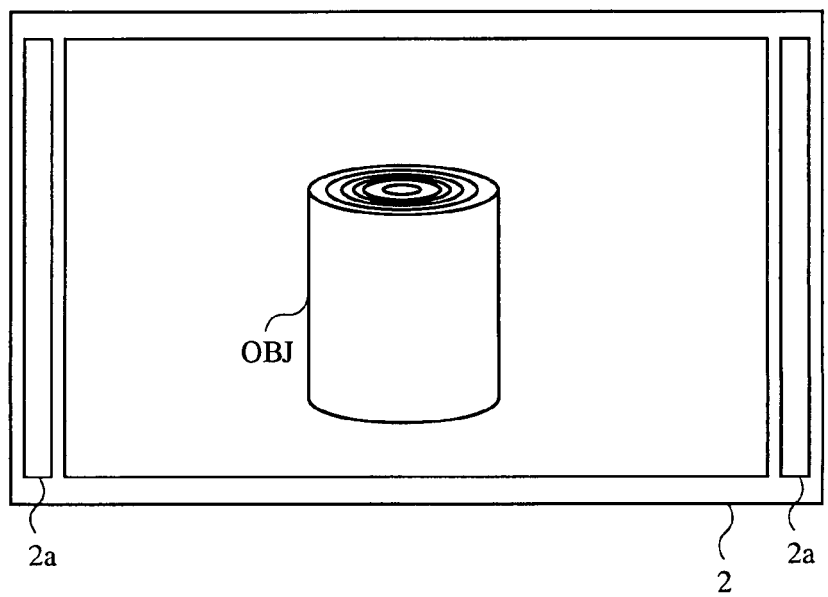
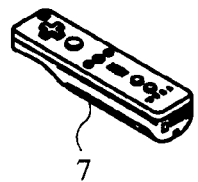
FIG. 10B
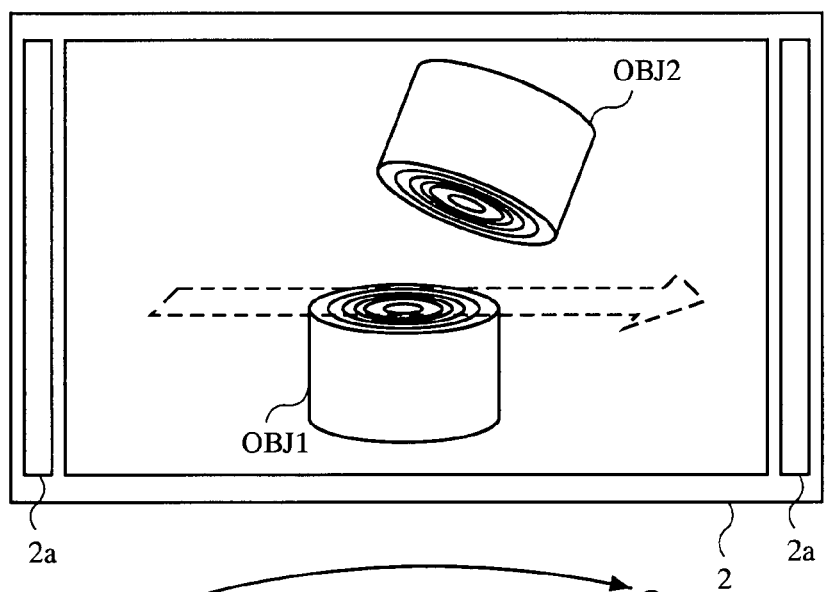
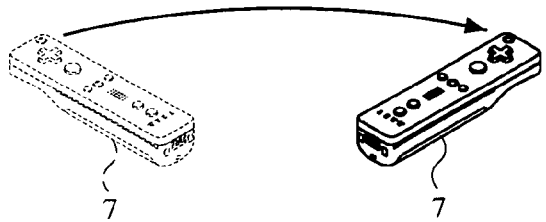

FIG. 11
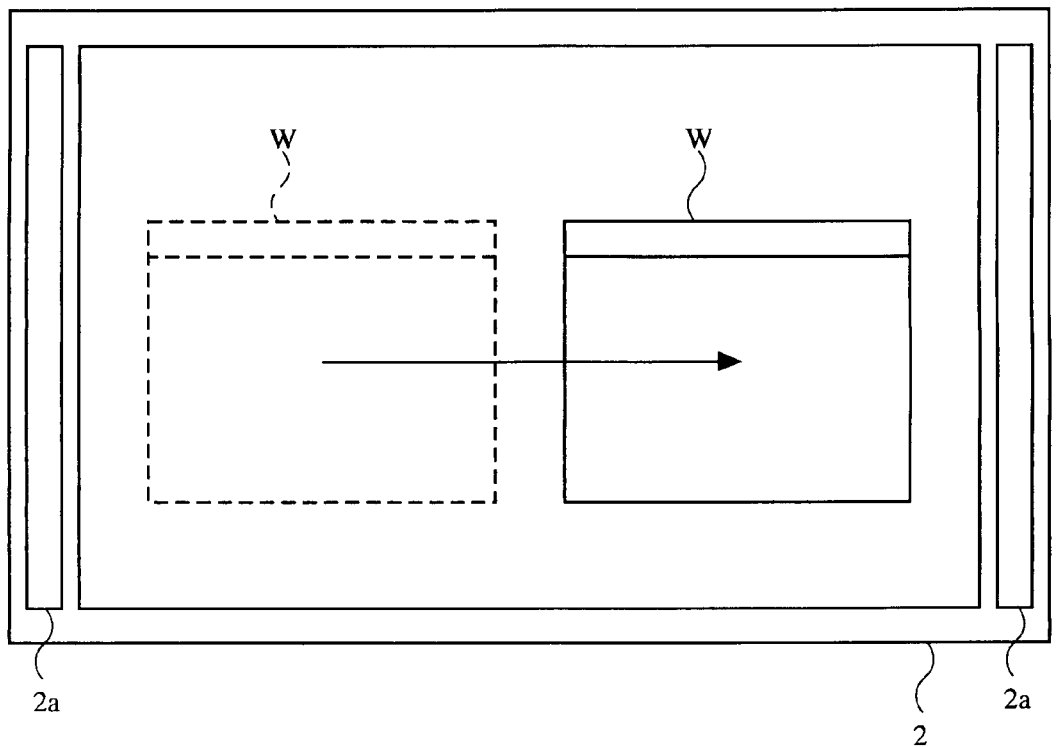
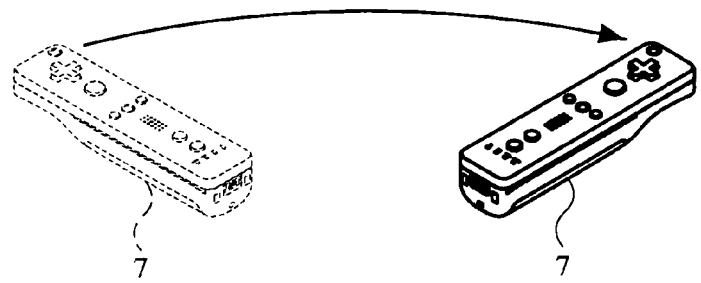

FIG. 12
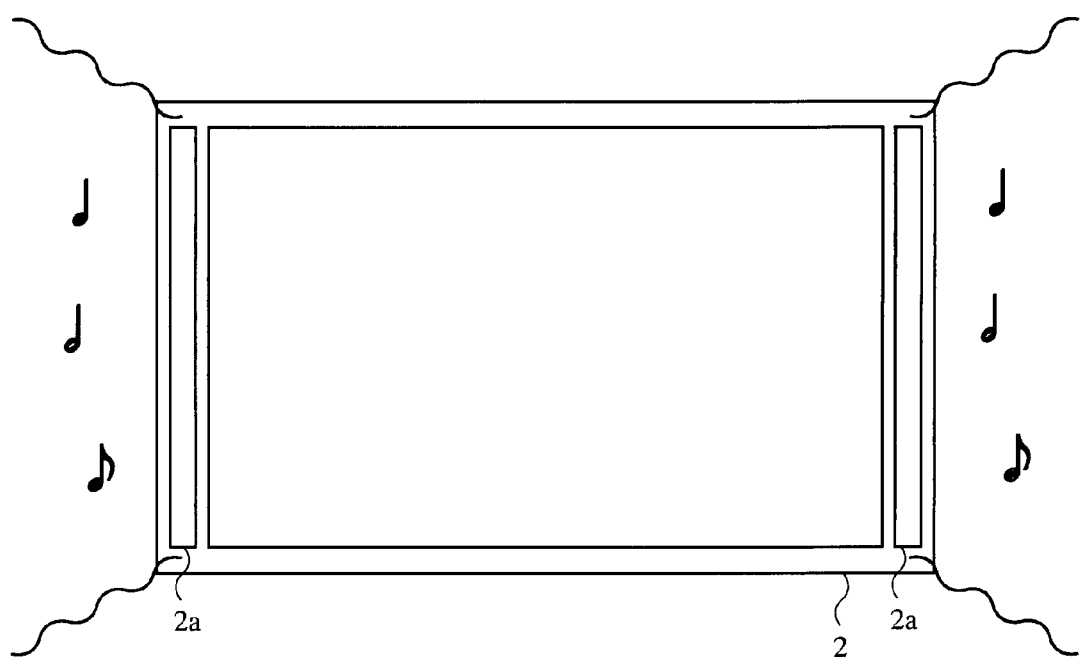
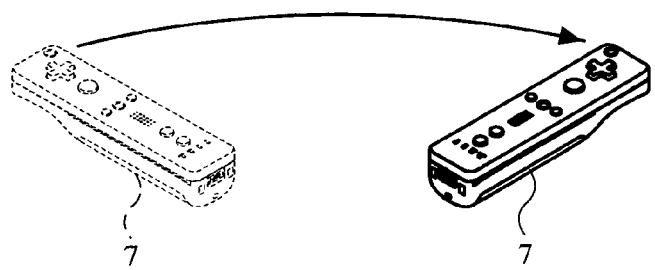

F I G. 1 5
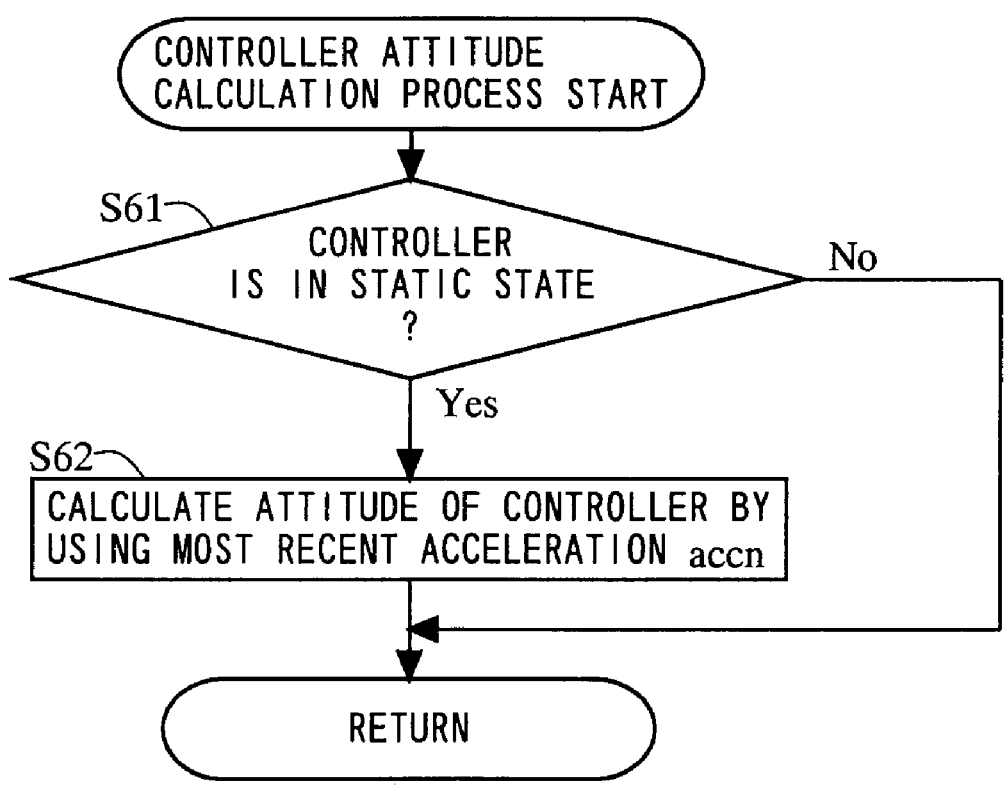

ACCELERATION DATA PROCESSING PROGRAM, AND STORAGE MEDIUM, AND ACCELERATION DATA PROCESSING APPARATUS FOR USE WITH THE SAME

CROSS REFERENCE TO RELATED APPLICATION

The disclosure of Japanese Patent Application No. 2007-010757, filed on Jan. 19, 2007, is incorporated herein by reference.

TECHNICAL FIELD

The illustrative embodiments relate to a storage medium having an acceleration data processing program stored thereon, a storage medium having a game program stored thereon, and an acceleration data processing apparatus. More particularly, the illustrative embodiments relate to a storage medium having an acceleration data processing program stored thereon, a storage medium having a game program stored thereon, and an acceleration data processing apparatus, which are used for executing a process in accordance with data output by an acceleration sensor.

BACKGROUND AND SUMMARY

Conventionally, as disclosed in, for example, Japanese Laid-Open Patent Publication No. 2002-153673 (hereinafter, referred to as Patent Document 1), a game apparatus calculates an action of a player throwing a punch, based on data output by an acceleration sensor, so as to allow a player to play a boxing game. The game apparatus disclosed in Patent Document 1 is structured such that a glove unit functioning as a controller of the game apparatus includes an acceleration sensor which detects an acceleration in three axial directions, (e.g., the forward/backward direction (Y-axis direction), the left/right direction (X-axis direction), and the up/down direction (Z-axis direction)). The game apparatus analyzes an output waveform output by the acceleration sensor so as to identify a type of the punch having been thrown by the player. Specifically, the game apparatus calculates, based on an output waveform represented by acceleration data detected in the Y-axis direction, a time period from a start of a punch thrown by the player to an end of the same punch. Next, the game apparatus uses an output waveform represented by acceleration data in the X-axis direction and an output waveform represented by the acceleration data in the Z-axis direction. This data is also obtained in the time period from the start of the punch thrown by the player to the end of the same punch. The output waveform is used to extract data representing, for example, a maximum value, a minimum value, an amplitude, the number of times a peak appears, and an integration value. The game apparatus identifies the type of the punch (straight punch, hook punch and upper punch) based on the extracted data and a waveform pattern obtained for each of the types of punches. After the identification of the type of the punch, the game apparatus performs a game process based on the type of the punch having been identified.

In the game apparatus disclosed in Patent Document 1, when the player finishes the punch action, the type of the punch is identified, and thereafter the game process based on the identified type of the punch is performed. Therefore, when a displayed opponent character is affected based on the punch action, a slight delay may occur after the player performs the punch action. In a game such as an action game or a fighting game requiring a quick response to an input made by a player, a slow response may make the game less enjoyable.

Further, when the aforementioned game apparatus represents and displays a punch thrown by a character controlled by the player, it is necessary to render an image representing the punch action based on the type of the punch after the player finishes the punch action. Thus, the representation and display of the user's action may be increasingly delayed.

Therefore, one aspect of the illustrative embodiments provides a storage medium having an acceleration data processing program stored thereon, a storage medium having a game program stored thereon, and an acceleration data processing apparatus used to quickly represent an action of a player in a game.

The illustrative embodiments may include the following features. The reference numerals, step numbers and the like in the parentheses indicate the correspondence with the illustrative embodiments described below in order to aid in understanding the illustrative embodiments and are not intended to limit, in any way, the scope of the present invention.

A first illustrative embodiment is directed to a storage medium having stored thereon an acceleration data processing program which is executed by a computer (30) of an apparatus (5) for performing a predetermined process by using acceleration data (Da) output by an acceleration sensor (701) capable of detecting, in at least one axial direction thereof, an acceleration (accn) applied to an input device (7). The acceleration data processing program causes the computer to function as: data acquisition means (the CPU 30 for executing step 44; hereinafter step numbers are simply represented by numbers; change amount calculation means (S46); accumulation vector calculation means (S49); and direction determination means (S54). The data acquisition means acquires the acceleration data at predetermined time intervals. The change amount calculation means calculates a change amount vector (accv) representing a change amount of the acceleration by using the acceleration data having been acquired by the data acquisition means. The accumulation vector calculation means calculates an accumulation vector (vecs) by sequentially and cumulatively adding the change amount vector having been calculated by the change amount calculation means. The direction determination means determines, as a waving direction (nrm) representing a moving direction of the input device, a direction of the accumulation vector, when the accumulation vector calculated by the accumulation vector calculation means satisfies a predetermined condition (S52).

In a second illustrative embodiment, the accumulation vector calculation means includes an attenuation process means (S48). The attenuation process means sequentially attenuates the accumulation vector before or after the change amount vector is added to the accumulation vector.

In a illustrative embodiment, the acceleration sensor is capable of detecting, in at least two axial directions, the acceleration applied to the input device. The data acquisition means acquires the acceleration data outputted by the acceleration sensor in units of axial components of the at least two axial directions. The change amount calculation means calculates, as the change amount vector, the change amount of the acceleration in units of the axial components by using the acceleration represented by the acceleration data in units of the axis components. The direction determination means determines, as the waving direction representing the moving direction of the input device, a direction of a combined vector of the accumulation vectors obtained in units of the axial components.

In a fourth illustrative embodiment, the accumulation vector calculation means includes an attenuation process means. The attenuation process means sequentially attenuates the accumulation vector before or after the change amount vector is added to the accumulation vector.

In a fifth illustrative embodiment, the computer is caused to further function as gravity direction calculation means (S45). The graviton direction calculation means calculates, by using the acceleration data having been acquired by the data acquisition means, a direction of a gravitational acceleration applied to the input device. The direction determination means determines the waving direction, representing the moving direction of the input device, relative to the gravitational acceleration by using the direction of the accumulation vector, and the direction of the gravitational acceleration having been calculated by the gravity direction calculation means.

In a sixth illustrative embodiment, the direction determination means determines, as the waving direction representing the moving direction of the input device, the direction of the accumulation vector when a magnitude (sp) of the accumulation vector having been calculated by the accumulation vector calculation means is greater than a threshold value (spmax).

In a seventh illustrative embodiment, the computer is caused to further function as threshold value updating means (S51, S53). The threshold value updating means updates the threshold value so as to represent the magnitude of the accumulation vector when the magnitude of the accumulation vector having been calculated by the accumulation vector calculation means is greater than the threshold value.

In an eighth illustrative embodiment, the threshold value updating means (S51) reduces the threshold value by a predetermined amount each time the accumulation vector is calculated.

In a ninth illustrative embodiment, the threshold value updating means previously has set a fixed value (1.9) other than the threshold value. The direction determination means determines, as the waving direction representing the moving direction of the input device, the direction of the accumulation vector when the magnitude of the accumulation vector having been calculated by the accumulation vector calculation means is greater than both the threshold value and the fixed value.

In a tenth illustrative embodiment, the computer is caused to further function as: elapsed time measurement means (S43, S55) and information processing means (S56). The elapsed time measurement means measures an elapsed time (c) from when the direction determination means has determined the waving direction representing the moving direction of the input device. When the elapsed time increases to a predetermined amount, the information processing means performs predetermined information processing by using the waving direction representing the moving direction of the input device having been determined by the direction determination means.

In an eleventh illustrative embodiment, the acceleration sensor is capable of detecting the acceleration having a magnitude which is within a predetermined measurable range. The change amount calculation means updates, when the acceleration represented by the acceleration data having been acquired by the data acquisition means has a value outside the predetermined measurable range (S81, S85, S89), the change amount vector so as to represent the change amount vector obtained by attenuating, by a predetermined amount, the change amount vector immediately preceding the change amount vector being currently calculated (S83, S87, S91).

In a twelfth illustrative embodiment, the accumulation vector calculation means calculates the accumulation vector by sequentially and cumulatively adding the change amount vector which has been calculated by the change amount calculation means and has been multiplied by a coefficient (k) (S103).

In a thirteenth illustrative embodiment, the acceleration sensor is capable of detecting, in three axial (XYZ) directions, the acceleration applied to the input device. The direction determination means determines, based on a two-dimensional plane including two axes (XY) selected from among three axes of the three axial directions, the waving direction representing the moving direction of the input device. The accumulation vector calculation means sets a value of the coefficient in accordance with a magnitude of the acceleration. The acceleration is represented by the acceleration data having been acquired by the data acquisition means and is applied in one axial (Z) direction other than directions represented by the two axes selected from among the three axes (S101).

In a fourteenth illustrative embodiment, when the magnitude of the acceleration applied in the one axial direction is zero, the accumulation vector calculation means sets the value of the coefficient to one. Further, when the magnitude of the acceleration applied in the one axial direction is greater than zero, the accumulation vector calculation means sets the value of the coefficient to a value smaller than one. In this manner, the greater the magnitude of the acceleration applied in the one axial direction is, the smaller the value of the coefficient is.

A fifteenth illustrative embodiment is directed to a storage medium having stored thereon a game program, including the acceleration data processing program based on the first aspect, for causing the computer to perform a predetermined game process by using the acceleration data. The game program causes the computer to further function as a game process means (S56). The game process means performs the predetermined game process by using the waving direction representing the moving direction of the input device having been determined by the direction determination means.

In a sixteenth illustrative embodiment, the game process means includes: object setting means; object moving means; and display control means. The object setting means sets a game object (OBJ, W) in a virtual game world. The object moving means moves the game object in the virtual game world in accordance with the waving direction representing the moving direction of the input device having been determined by the direction determination means. The display control means displays the game object in the virtual game world on a display device (2) (FIG. 10A, FIG. 10B, FIG. 11)

In a seventeenth illustrative embodiment, the game process means includes: object setting means; object operating means; and display control means. The object setting means sets a game object in a virtual game world. The object operating means operates the game object in the virtual game world so as to be waved in accordance with the waving direction representing the moving direction of the input device having been determined by the direction determination means. The display control means displays the game object in the virtual game world on a display device (FIG. 9).

In an eighteenth illustrative embodiment, the game process means includes sound generation setting means and sound control means. The sound generation setting means sets, in accordance with the waving direction representing the moving direction of the input device having been determined by the direction determination means, a sound to be generated.

The sound control means generates, from a speaker (2a, 706), the sound having been set by the sound generation setting means.

A nineteenth illustrative embodiment is directed to an acceleration data processing apparatus for performing a predetermined process by using acceleration data output by an acceleration sensor capable of detecting, in at least one axial direction thereof, an acceleration applied to an input device. The acceleration data processing apparatus comprises: data acquisition means; change amount calculation means; accumulation vector calculation means; and direction determination means. The data acquisition means acquires the acceleration data at predetermined time intervals. The change amount calculation means calculates a change amount vector representing a change amount of the acceleration by using the acceleration data having been acquired by the data acquisition means. The accumulation vector calculation means calculates an accumulation vector by sequentially and cumulatively adding the change amount vector having been calculated by the change amount calculation means. The direction determination means determines, as a waving direction representing a moving direction of the input device, a direction of the accumulation vector, when the accumulation vector having been calculated by the accumulation vector calculation means satisfies a predetermined condition.

In a twentieth illustrative embodiment, the accumulation vector calculation means includes an attenuation process means. The attenuation process means sequentially attenuates the accumulation vector before or after the change amount vector is added to the accumulation vector.

In a twenty-first illustrative embodiment, the acceleration sensor is capable of detecting, in at least two axial directions, an acceleration applied to the input device. The data acquisition means acquires the acceleration data output by the acceleration sensor in units of axial components of the at least two axial directions. The change amount calculation means calculates, as the change amount vector, the change amount of the acceleration in units of the axial components by using the acceleration represented by the acceleration data in units of the axial components. The direction determination means determines, as the waving direction representing the moving direction of the input device, a direction of a combined vector of the accumulation vectors obtained in units of the axial components.

According to the first illustrative embodiment, the input device including the acceleration sensor uses the accumulation vector obtained by cumulatively adding the change amount of the acceleration having been detected, and therefore it is possible to determine the waving direction representing the moving direction of the input device with enhanced responsiveness.

According to the third illustrative embodiment, the input device including the acceleration sensor capable of detecting the acceleration in at least two axial directions uses the accumulation vector obtained by cumulatively adding the change amount of the acceleration having been detected. Thus, the waving direction representing the moving direction of the input device can be determined in the two-dimensional direction or the three-dimensional direction.

According to the second and fourth illustrative embodiment, the waving direction is able to be determined when each of the change amounts of the accelerations detected by the acceleration sensor indicates a similar tendency. For example, when a linear movement is applied to the input device, the acceleration sensor detects an acceleration varying in the linear direction, and therefore each of the change amounts (change direction) of the accelerations indicates a similar tendency. That is, when an operation of waving the input device in the linear manner is performed, the change amount of the acceleration acquired by the acceleration sensor is cumulatively added. Thus, the linear direction representing the moving direction of the input device is able to be determined in accordance with a value obtained by the cumulative addition.

According to the fifth illustrative embodiment, it is possible to determine the waving direction representing the moving direction of the input device relative to gravity applied to the input device.

According to the sixth illustrative embodiment, when the magnitude of the accumulation vector is greater than a predetermined threshold value, the waving direction representing the moving direction of the input device is determined, thereby preventing erroneous determination of the waving direction.

According to the seventh illustrative embodiment, a maximum value of the magnitude of the accumulation vector is set as the threshold value, and therefore over-frequent determination of the waving direction(s) is prevented.

According to the eighth illustrative embodiment, the threshold value is attenuated, and therefore it is possible to sequentially make subsequent necessary determinations of the waving direction.

According to the ninth aspect, an influence on acceleration, such as gravitational acceleration, generated when an operation other than the waving operation is performed, is able to be eliminated, thereby preventing erroneous determination of the waving direction.

According to the tenth illustrative embodiment, an elapsed time from the determination of the waving direction is used as a degree of reliability of the waving direction. When it is necessary to acquire the waving direction with enhanced reliability, the waving direction calculated when the elapsed time increases to a predetermined amount is able to be used to perform information processing.

According to the eleventh illustrative embodiment, even when an acceleration having a value outside the measurable range of the acceleration sensor is generated, the acceleration is estimated such that the waving direction is able to be determined.

According to the twelfth illustrative embodiment, the waving direction based on a desired direction is able to be preferentially determined.

According to the thirteenth illustrative embodiment, it is possible to limit, to a direction based on a two-dimensional plane, the waving direction representing the moving direction of the input device to be determined.

According to the fourteenth illustrative embodiment, the smaller the acceleration applied in the direction perpendicular to the two-dimensional plane used for determining the waving direction representing the moving direction of the input device, the more the acceleration in the direction based the two-dimensional plane can be used to determine the waving direction.

According to the fifteenth illustrative embodiment, the waving direction representing the moving direction of the input device is able to be used for a game process.

According to the sixteenth illustrative embodiment, an item is able to be moved in the virtual game world in accordance with the waving direction representing the moving direction of the input device.

According to the seventeenth illustrative embodiment, an operation of, for example, waving a sword in the virtual game world is able to be performed in accordance with the waving direction representing the moving direction of the input device.

According to the eighteenth illustrative embodiment, it is possible to realize a game for allowing a sound to be output from a speaker in accordance with the waving direction representing the moving direction of the input device.

Further, the acceleration data processing apparatus according to the illustrative embodiments is capable of obtaining the same effect as the storage medium having the aforementioned acceleration data processing program stored thereon.

These and other aspects and advantages of the illustrative embodiments will become more apparent from the following detailed description of the illustrative embodiments when taken in conjunction with the accompanying drawings.

BRIEF DESCRIPTION OF THE DRAWINGS

FIG. 4 is a perspective view illustrating the controller 7 shown in FIG. 3 as viewed from the bottom front side thereof;

FIG. 5 is a perspective view illustrating a state where an upper casing of the controller 7 shown in FIG. 3 is removed;

FIG. 7 is a block diagram illustrating a structure of the controller 7 shown in FIG. 3;

FIG. 8 is a diagram illustrating in general a state where a game is played using the controller 7 shown in FIG. 3;

FIG. 9 is a diagram illustrating a first example of a game process or an information processing performed in accordance with a waving direction of the controller 7;

FIG. 10A is a diagram illustrating an object which is not cut in a second example of the game process or the information processing performed in accordance with the waving direction of the controller 7;

FIG. 10B is a diagram illustrating the object having been cut in the second example of the game process or the information processing performed in accordance with the waving direction of the controller 7;

FIG. 11 is a diagram illustrating a third example of the game process or the information processing performed in accordance with the waving direction of the controller 7;

FIG. 12 is a diagram illustrating a fourth example of the game process or the information processing performed in accordance with the waving direction of the controller 7;

FIG. 15 shows a sub-routine illustrating in detail a process of calculating an attitude of the controller in step 45 shown in FIG. 14;

DETAILED DESCRIPTION

Figure 1:
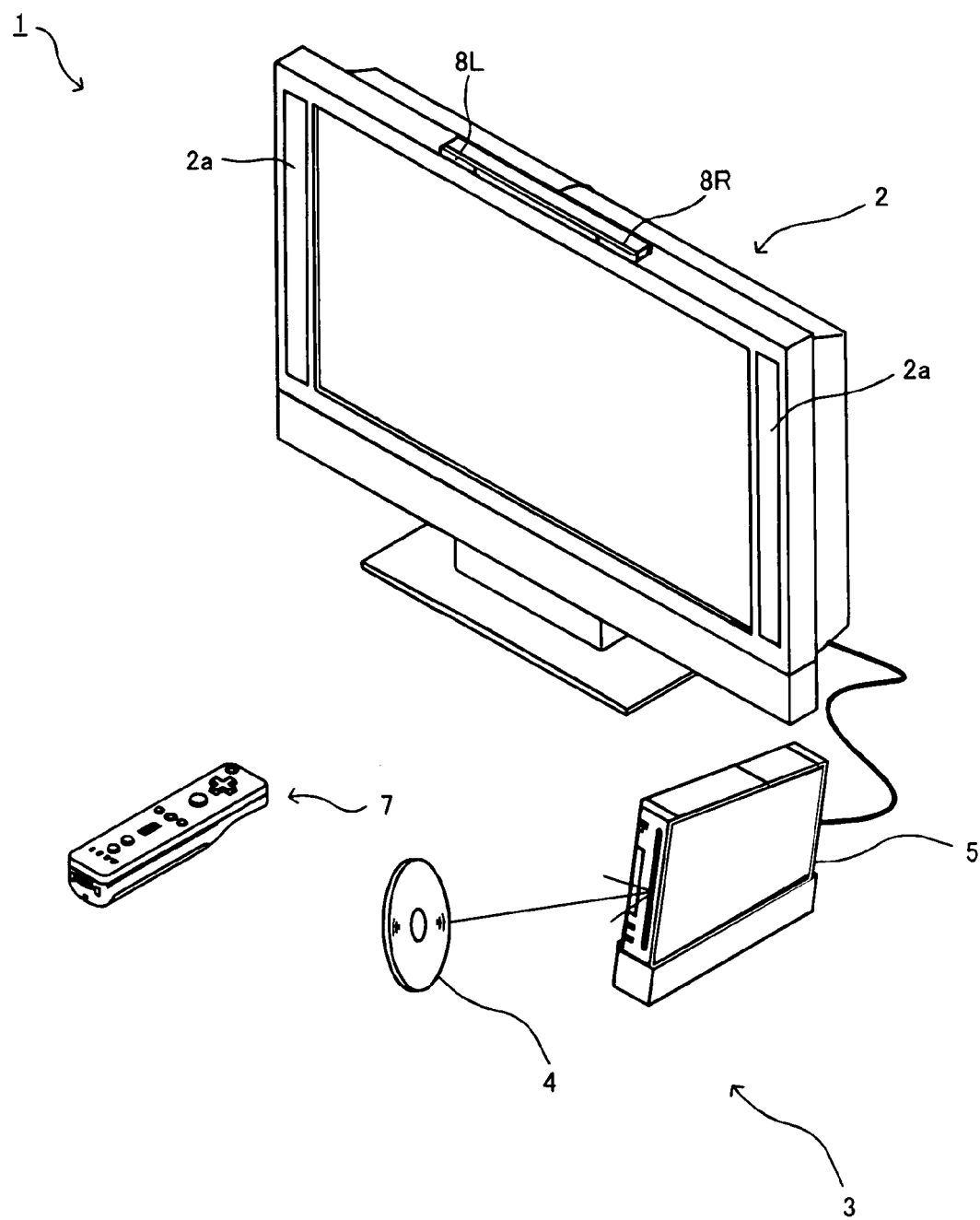
FIG. 1 is an external view illustrating a game system 1 according to an illustrative embodiment.
Figure 2:
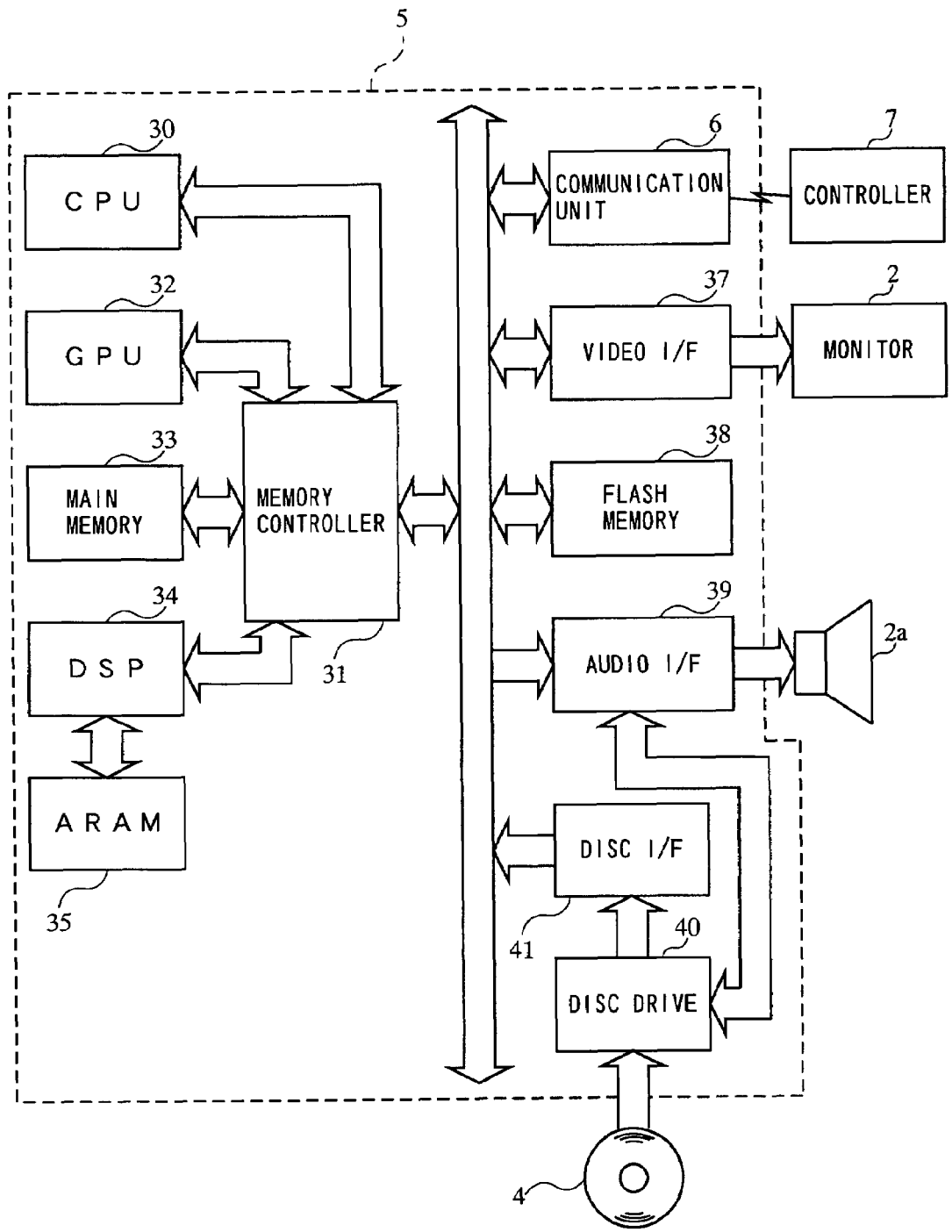
FIG. 2 is a functional block diagram illustrating a game apparatus body 5 shown in FIG. 1.

With reference to FIG. 1, an apparatus for executing an acceleration data processing program according to an illustrative embodiment will be described. Hereinafter, for specific description, a game system including a stationary game apparatus body 5 will be described as an example of the aforementioned apparatus. FIG. 1 is an external view illustrating the game system 1 including a stationary game apparatus 3. FIG. 2 is a block diagram illustrating the game apparatus body 5. Hereinafter, the game system 1 will be described.

As shown in FIG. 1, the game system 1 includes a home-use television receiver (hereinafter, referred to as a monitor) 2 display means, and a stationary game apparatus 3 connected to the monitor 2 via a connection cord. The monitor 2 includes a speaker 2a for outputting, as a sound, a sound signal output by the game apparatus body 5. Further, the game apparatus 3 includes the game apparatus body 5 and a controller 7. The game apparatus body 5 incorporates a computer for executing a game program stored in an optical disc 4, and displaying a game screen image on the monitor 2. The controller 7 provides the game apparatus body 5 with operation information required for a game in which characters and the like displayed on the game screen are operated.

Further, the game apparatus body 5 incorporates a communication unit 6. The communication unit 6 receives data which is wirelessly transmitted from the controller 7, and transmits the data from the game apparatus body 5 to the controller 7 so as to connect between the controller 7 and the game apparatus body 5 by radio communication. Further, the optical disc 4 storage medium is detachably mounted on the game apparatus body 5. The game apparatus body 5 includes, on the front main surface thereof, a power ON/OFF switch of the game apparatus body 5, a game process reset switch, an opening through which the optical disc 4 is mounted thereon, and an eject switch used for dismounting the optical disc 4 through the opening of the game apparatus body 5.

Further, the game apparatus body 5 has mounted thereon a flash memory 38 which functions as a backup memory for fixedly storing saved data or the like. The game apparatus body 5 executes a game program or the like stored on the optical disc 4 and displays the result on the monitor 2 as a game image. The game apparatus body 5 can also reproduce a state of a game played in the past using saved data stored in the flash memory 38 and display the game image on the monitor 2. A player playing with the game apparatus body 5 can enjoy the game by operating the controller 7 while watching the game image displayed on the monitor 2.

The controller 7 wirelessly transmits transmission data, such as operation information, to the game apparatus body 5 incorporating the communication unit 6, using, for example, Bluetooth®. The controller 7 is operation means for mainly operating a player character or the like appearing in a game space displayed on a display screen of the monitor 2. The controller 7 has a housing which is small enough to be held by one hand, and a plurality of operation buttons (such as a cross key, a stick and the like) exposed on a surface of the housing. As described later in detail, the controller 7 includes an imaging information calculation section 74 for taking an image viewed from the controller 7. As an example of an imaging subject of the imaging information calculation section 74, two LED modules (hereinafter, referred to as makers) 8L and 8R are provided in the vicinity of a display screen of the monitor 2. The markers 8L and 8R each outputs infrared light or the like forward from the monitor 2. Further, the controller 7 can cause the communication section 75 to receive the transmission data which is wirelessly transmitted by the communication unit 6 of the game apparatus body 5, and generate a sound and a vibration based on the transmission data.

As shown in FIG. 2, the game apparatus body 5 includes, for example, a CPU (central processing unit) 30 for executing various types of programs. The CPU 30 executes a boot program stored in a boot ROM (not shown) to, for example, initialize memories including a main memory 33, and then executes a game program stored on the optical disc 4 to perform game process or the like in accordance with the game program. The CPU 30 is connected to a GPU (Graphics Processing Unit) 32, the main memory 33, a DSP (Digital Signal Processor) 34, an ARAM (audio RAM) 35 and the like via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 interface with the monitor 2, the speaker 2a, and a disc drive 40, respectively.

The GPU 32, which includes, for example, a semiconductor chip for performing calculation process necessary for displaying 3D graphics, performs image processing based on an instruction from the CPU 30. The GPU 32 performs the image processing using a memory (not shown) dedicated for image processing and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data and the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs a predetermined process (for example, storage of the game program or sound data already read). The DSP 34 reads the sound data stored in the ARAM 35, and outputs the sound data to the speaker 2a included in the monitor 2 via the memory controller 31 and the audio I/F 39.

The memory controller 31 comprehensively controls data transmission, and is connected to the various I/Fs described above. As described above, the communication unit 6 receives the transmission data from the controller 7 and outputs the transmission data to the CPU 30. Further, the communication unit 6 transmits, to the communication section 75 of the controller 7, the transmission data outputted by the CPU 30. The video I/F 37 is connected to the monitor 2. The audio I/F 39 is connected to the speaker 2a built in the monitor 2 such that the sound data read by the DSP 34 from the ARAM 35 or sound data directly outputted from the disc drive 40 can be outputted from the speaker 2a. The disc I/F 41 is connected to the disc drive 40. The disc drive 40 reads data stored at a predetermined reading position of the optical disc 4 and outputs the data to a bus of the game apparatus body 5 or the audio I/F 39.

Figure 3:
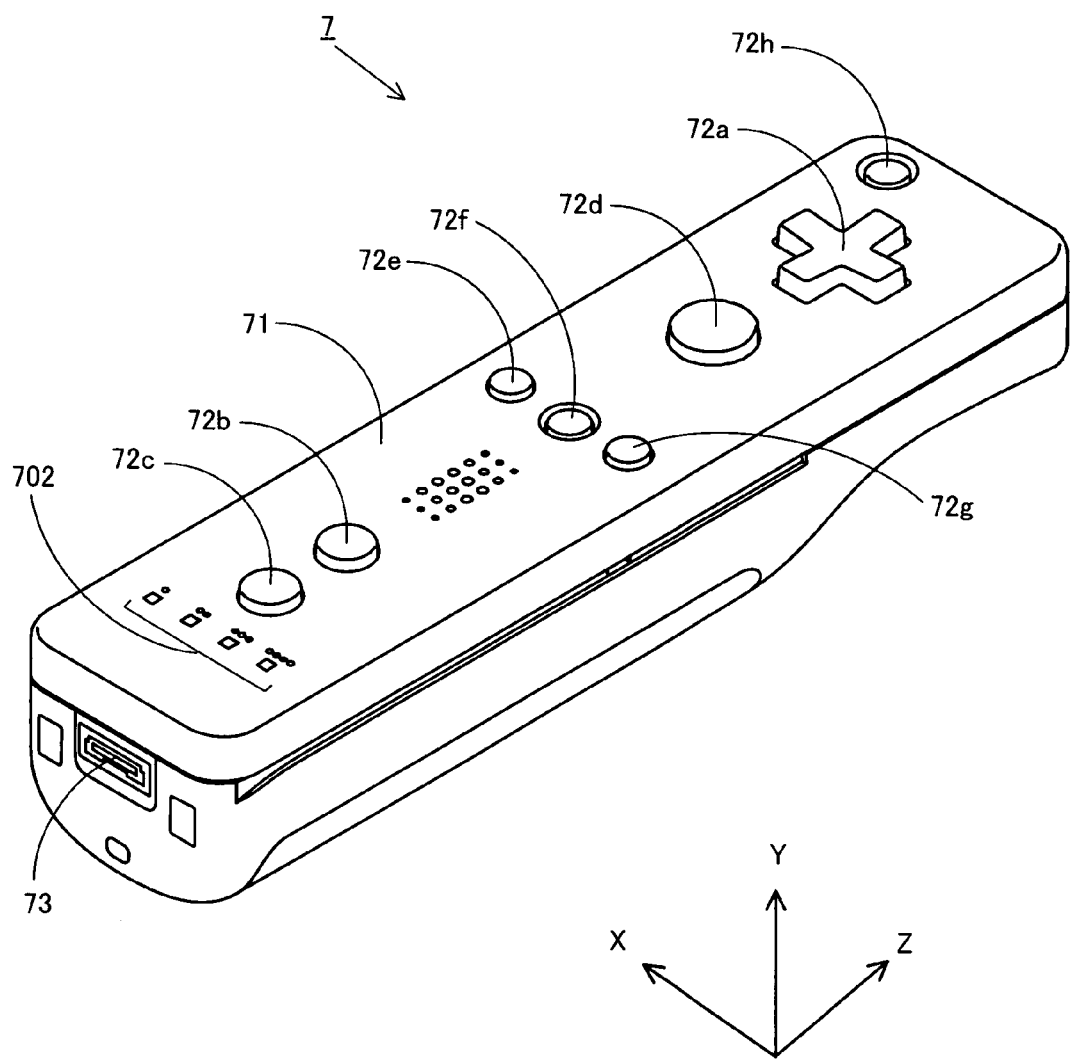
FIG. 3 is a perspective view illustrating a controller 7 shown in FIG. 1 as viewed from the top rear side thereof.

Next, with reference to FIGS. 3 and 4, the controller 7 will be described. FIG. 3 is a perspective view illustrating the controller 7 as viewed from the top rear side thereof. FIG. 4 is a perspective view illustrating the controller 7 as viewed from the bottom front side thereof.

As shown in FIGS. 3 and 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions (front, rear, right and left), which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of options.

Although the cross key 72a is an operation section for outputting an operation signal in accordance with the aforementioned direction input operation performed by the player, such an operation section may be provided in another form. For example, the cross key 72a may be replaced with an operation section which has four push switches which extend in four directions, respectively, so as to form a cross, and outputs an operation signal in accordance with the player pressing one of the push switches. Further, the cross key 72a may be replaced with an operation section having the four push switches and a center switch positioned at the center of the cross of the four push switches. Alternatively, the cross key 72a may be replaced with an operation section which includes an inclinable stick (so-called a joy stick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses a head thereof. For example, the operation buttons 72b, 72c, and 72d are assigned with functions of a first button, a second button, and an A button, for example. Further, the operation buttons 72e, 72f and 72g are assigned with functions of a minus button, a home button, a plus button, for example. The operation buttons 72a, 72b, 72c, 72d, 72e, 72f and 72g are assigned with various operation functions in accordance with the game program executed by the game apparatus body 5. In an exemplary arrangement shown in FIG. 3, the operation buttons 72b, 72c and 72d are arranged in a line at the center on the top surface of the housing 71 in the front-rear direction. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus body 5 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned with a controller type (number) so as to be distinguishable from the other controllers 7. For example, the LEDs 702 are used for informing the player of the controller type which is currently set to controller 7 that he or she is using. Specifically, when the controller 7 transmits the transmission data to the communication unit 6, one of the plurality of LEDs 702 is lit up depending on the controller type.

On the top surface of the housing 71, a sound hole for outputting, to the outside, a sound from a speaker (speaker 706 shown in FIG. 5) described below is provided between the operation button 72b and the operation buttons 72e, 72f, and 72g.

On a bottom surface of the housing 71, a recessed portion is formed. The recessed portion is formed at a position at which an index finger or middle finger of the player is located when the player holds the controller 7 by one hand so as to orient the front surface of the controller 7 toward the markers 8L and 8R. On a slope surface of the recessed portion, an operation button 72i is provided. The operation button 72i is an operation section acting as, for example, a B button.

On a front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described later in detail. On a rear surface of the housing 71, the connector 73 is provided. The connector 73 is, for example, an edge connector, and is used for engaging and connecting with a connecting cable, for example.

Here, for making the below description specific, a coordinate system is defined for the controller 7. As shown in FIGS. 3 and 4, an X-axis, a Y-axis and a Z-axis, which are orthogonal to each other, are defined for the controller 7. Specifically, the longitudinal direction of the housing 71 corresponding to the front/rear direction of the controller 7 is defined as the Z-axis direction, and a direction toward the front surface (a surface on which the imaging information calculation section 74 is mounted) of the controller 7 is a Z-axis positive direction. The up/down direction of the controller 7 is defined as the Y-axis direction, and a direction toward the top surface (a surface on which the operation button 72a is provided) of the housing 71 is defined as a Y-axis positive direction. The left/right direction of the controller 7 is defined as the X-axis direction, and a direction toward the left side surface (a side surface which is not shown in FIG. 3) of the housing 71 is defined as an X-axis positive direction.

Figure 6:
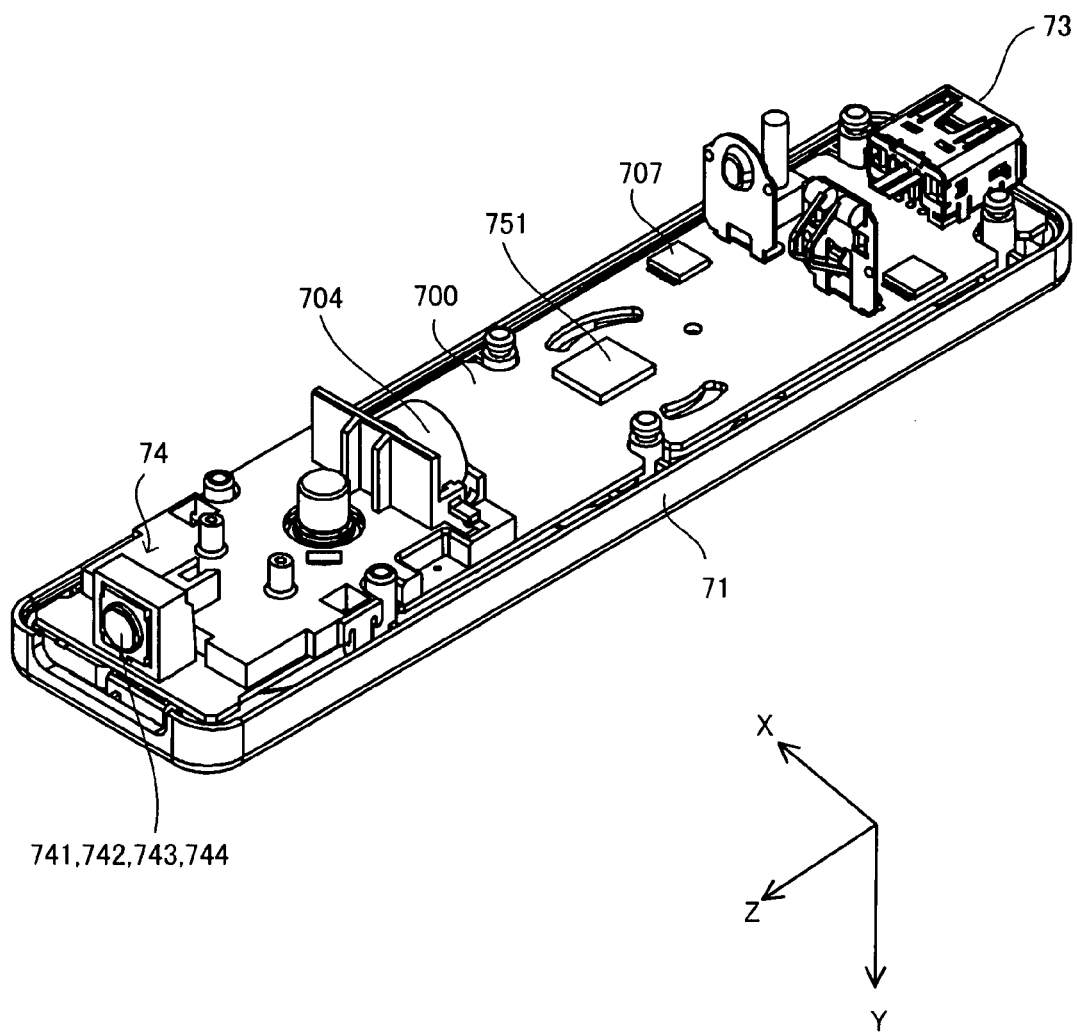
FIG. 6 is a perspective view illustrating a state where a lower casing of the controller 7 shown in FIG. 4 is removed.

Next, with reference to FIGS. 5 and 6, an internal structure of the controller 7 will be described. FIG. 5 is a perspective view illustrating, as viewed from the top rear surface of the controller 7, a state where an upper casing (a part of the housing 71) of the controller 7 is removed. FIG. 6 is a perspective view illustrating, as viewed from the bottom front surface of the controller 7, a state where a lower casing (a part of the housing 71) of the controller 7 is removed. FIG. 6 is a perspective view illustrating a reverse side of a substrate 700 shown in FIG. 5.

As shown in FIG. 5, the substrate 700 is fixed inside the housing 71. On a top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. The quartz oscillator (not shown), which is provided inside the housing 71, generates a reference clock of the microcomputer 751 described later. On a top main surface of the substrate 700, the speaker 706 and an amplifier 708 are provided. Further, the acceleration sensor 701 is provided on the substrate 700 to the left of the operation button 72d. That is, the acceleration sensor 701 is provided not at the center portion of the substrate 700 but near the periphery of the substrate 700. Accordingly, the acceleration sensor 701 is capable of detecting for a direction change of the gravitational acceleration and an acceleration containing a component generated due to the centrifugal force, in accordance with the controller 7 rotating about the longitudinal direction thereof. Therefore, the game apparatus body 5 and the like can perform a predetermined calculation so as to determine a rotation of the controller 7 with sufficient accuracy based on the acceleration data having been detected.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At a rear edge of the bottom main surface of the substrate 700, the connector 73 is attached. Further, on a bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus body 5.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-feedback game is realized. The vibrator 704 is provided near the front part of the housing 71, and therefore a large vibration of the housing 71 allows the player holding the controller 7 to easily feel the vibration.

Next, with reference to FIG. 7, an internal structure of the controller 7 will be described. FIG. 7 is a block diagram illustrating a structure of the controller 7.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pickup device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, detects an area thereof having a high brightness, and outputs process result data representing the detected position coordinates and size of the area to the communication section 75. The imaging information calculation section 74 is fixed to the housing 71 of the controller 7. The imaging direction of the imaging information calculation section 74 can be changed by changing the direction of the housing 71.

The controller 7 preferably includes a three-axis (X-axis, Y-axis, and Z-axis) acceleration sensor 701. The three axis acceleration sensor 701 detects a linear acceleration in three directions, that is, the up/down direction (Y-axis shown in FIG. 3), the left/right direction (X-axis shown in FIG. 3), and the forward/backward direction (Z-axis shown in FIG. 3). Further, in another embodiment, an acceleration detection means for detecting a linear acceleration along at least one axial direction may be used depending on a type of a control signal used for a game process. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of acceleration detection means (for example, piezoelectric type or piezoresistance type) now existing or later developed may be used to provide the acceleration sensor 701.

In one embodiment, an acceleration detection means, as used in the acceleration sensor 701, is only capable of detecting an acceleration (linear acceleration) along a straight line corresponding to each axis of the acceleration sensor 701. In other words, the direct output of the acceleration sensor 701 is limited to signals indicative of the linear acceleration (static or dynamic) along each of the three axes thereof. As a result, the acceleration sensor 701 cannot directly detect movement along a non-linear (e.g. arcuate) path, rotation, rotational movement, angular displacement, tilt, position, attitude, or any other physical characteristic.

However, when a computer such as a processor (for example, the CPU 30) of the game apparatus or a processor (for example, the microcomputer 751) of the controller processes acceleration signals outputted from the acceleration sensor 701, additional information relating to the controller 7 can be inferred or calculated (determined), as one skilled in the art will readily understand from the description herein.

For example, a case where it is anticipated that the computer will process the acceleration signals outputted from the acceleration sensor 701 of the controller 7 which is in a static state (that is, a case where it is anticipated that an acceleration detected by the acceleration sensor 701 will include only a gravitational acceleration) will be described. When the controller 7 is actually in the static state, it is possible to determine whether or not the controller 7 tilts relative to the gravity direction and to also determine a degree of the tilt, based on the acceleration having been detected. Specifically, when a state where 1 G (gravitational acceleration) is applied to a detection axis of the acceleration sensor 701 in the vertically downward direction represents a reference, it is possible to determine whether or not the controller 7 tilts relative to the vertically downward direction, based on only whether or not 1 G is applied in the direction of the detection axis of the acceleration sensor 701. Further, it is possible to determine a degree to which the controller 7 tilts relative to the vertically downward direction, based on a magnitude of the acceleration applied in the direction of the detection axis. Further, the acceleration sensor 701 capable of detecting an acceleration in multiaxial directions subjects, to a processing, the acceleration signals having been detected in the respective axes so as to more specifically determine the degree to which the controller 7 tilts relative to the gravity direction. In this case, although the processor may calculate, based on the output from the acceleration sensor 701, data representing an angle at which the controller 7 tilts, an approximate degree to which the controller 7 tilts may be inferred based on the output from the acceleration sensor 701 without calculating the data representing the angle of the tilt. Thus, when the acceleration sensor 701 is used in combination with the processor, the tilt, attitude, or position of the controller 7 can be determined.

On the other hand, in a case where it is anticipated that the acceleration sensor 701 will be in a dynamic state, the acceleration sensor 701 detects an acceleration based on a movement of the acceleration sensor 701, in addition to the gravitational acceleration component. Therefore, when the gravitational acceleration component is eliminated through a predetermined process, it is possible to determine, for example, a direction in which the controller 7 moves. Specifically, when the controller 7 including the acceleration sensor 701 is dynamically accelerated and moved with a hand of a player, it is possible to calculate various movements and/or positions of the controller 7 by processing the acceleration signals generated by the acceleration sensor 701. Even when it is anticipated that the acceleration sensor 701 will be in the dynamic state, the acceleration based on the movement of the acceleration sensor 701 is eliminated through a predetermined process, whereby it is possible to determine the tilt of the controller 7 relative to the gravity direction.

In another illustrative embodiment, the acceleration sensor 701 may include an embedded signal processor or another type of dedicated processor for performing any desired processing of the acceleration signals outputted by an embedded acceleration detection means prior to outputting signals to the microcomputer 751. For example, when the acceleration sensor 701 is intended to detect static acceleration (for example, gravitational acceleration), the embedded or dedicated processor could convert the detected acceleration signal to a corresponding tilt angle (or another preferable parameter). Data representing the respective accelerations detected by the acceleration sensor 701 are outputted to the communication section 75.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the process. The microcomputer 751 controls operations of the sound IC 707 and the vibrator 704 based on the data received from the game apparatus body 5 by the wireless module 753 via the antenna 754. The sound IC 707 processes the sound data and the like transmitted from the game apparatus body 5 via the communication section 75. Further, the microcomputer 751 actuates the vibrator 704 based on, for example, the vibration data (for example, a signal for powering the vibrator 704 ON/OFF) transmitted by the game apparatus body 5 via the communication section 75.

Data from the controller 7 including an operation signal (key data) from the operation section 72, three-axial direction acceleration signals (X, Y, and Z axis direction acceleration data) from the acceleration sensor 701, and the process result data from the imaging information calculation section 74 are outputted to the microcomputer 751. The microcomputer 751 temporarily stores, in the memory 752, the respective data (key data, X, Y, and Z axis direction acceleration data, and process result data) having been received, as the transmission data which is to be transmitted to the communication unit 6. The wireless transmission from the communication section 75 to the communication unit 6 is performed periodically at a predetermined time interval. Since game process is generally performed at a cycle of 1/60 sec., the wireless transmission needs to be performed at a cycle of a shorter time period. Specifically, the game process unit is 16.7 ms (1/60 sec.), and the transmission interval of the communication section 75 structured using the Bluetooth (registered trademark) technology is 5 ms. At the transmission timing to the communication unit 6, the microcomputer 751 outputs the transmission data stored in the memory 752 as a series of operation information to the wireless module 753. The wireless module 753 uses, for example, the Bluetooth (registered trademark) technology to transmit the operation information from the antenna 754 as a carrier wave signal of a predetermined frequency. Thus, the key data from the operation section 72 included in the controller 7, the X, Y, and Z axis direction acceleration data from the acceleration sensor 701, and process result data from the imaging information calculation section 74 are transmitted from the controller 7. The communication unit 6 of the game apparatus body 5 receives the carrier wave signal, and the game apparatus body 5 demodulates or decodes the carrier wave signal to obtain the series of operation information (the key data, the X, Y, and Z axis direction acceleration data, and the process result data). Based on the obtained operation information and the game program, the CPU 30 of the game apparatus body 5 performs the game process. In the case where the communication section 75 is structured using the Bluetooth (registered trademark) technology, the communication section 75 can also have a function of receiving transmission data which is wirelessly transmitted from other devices.

Next, an outline of a game played using the game apparatus body 5 of the illustrative embodiments will be described and then a process performed by the game apparatus body 5 will be described in detail. As shown in FIG. 8, the overall size of the controller 7 is small enough to be held by one hand of an adult or even a child. In order to play the game using the controller 7 in the game system 1, a player holds the controller 7 by one hand and waves the controller 7. For example, FIG. 8 shows that the player is waving the controller 7 held by the player up and down or left and right. During such an operation of the player waving the controller 7, the game apparatus body 5 determines a waving direction of the controller 7, an elapsed time from the determination of the waving direction thereof and the like, and the waving direction and the elapsed time are used to perform a game process.

For example, when the player tilts the controller 7 in a static manner, operation information (specifically, the X, Y, and Z axis direction acceleration data) representing an attitude of the controller 7 in a static state is provided to the game apparatus body 5. On the other hand, when the player waves the controller 7 up and down or left and right, operation information representing a dynamic state based on an acceleration applied in the waving direction of the controller 7, the centrifugal force and the like is provided from the controller 7 to the game apparatus body 5. The change in acceleration applied to the controller 7 can be detected by the acceleration sensor 701, and therefore when the X, Y, and Z axis direction acceleration data outputted by the acceleration sensor 701 is subjected to an additional process, the attitude of the controller 7 in the static state and the waving direction of the controller 7 in the dynamic state can be calculated. In general, when an acceleration to be detected is based on an action, an acceleration vector output by the acceleration sensor 701 has a direction precisely opposite to a direction in which the controller 7 is accelerated, or an acceleration vector outputted by the acceleration sensor 701 has a sign (plus or minus) opposite to a sign represented by a direction in which the controller 7 is accelerated. Therefore, it may be desirable to calculate a tilt and a movement of the controller 7 in consideration of a detected acceleration direction.

FIGS. 9 to 12 are diagrams illustrating examples of game processes or information processing performed in accordance with the waving direction. As examples of the game process, an object displayed on the monitor 2 is moved in accordance with the waving direction (for example, a sword displayed on the monitor 2 is waved in a virtual game space, an object in the virtual game space is cut, an item in the virtual game space is moved) or a sound is generated in accordance with the waving direction and output from the speaker 2a included in the monitor 2 or the speaker 706 included in the controller 7. Further, as an example of an information processing other than the game process, gesture for a browser displayed on a display is made in accordance with the waving direction (for example, move a window, close a window, or turn a page).

For example, in FIG. 9, a sword object OBJ in the virtual game space is displayed on the monitor 2. The sword object OBJ is waved in the virtual game space in a direction corresponding to the waving direction of the controller 7 in accordance with the controller 7 being waved.

Further, in FIG. 10A, a log object OBJ in the virtual game space is displayed on the monitor 2. As shown in FIG. 10B, the log object OBJ is cut in the virtual game space in a direction corresponding to the waving direction of the controller 7 in accordance with the controller 7 being waved, and is separated into log objects OBJ1 and OBJ2 which are moving. At this time, the log objects OBJ1 and OBJ2 as objects having been cut in the waving direction are displayed on the monitor 2, but an object (for example, a cutting tool object such as a sword, a Japanese sword, and an ax) for cutting the log object OBJ representing a subject to be cut in the waving direction may not be displayed on the monitor 2. For example, only a path of the object used for cutting the subject to be cut may be displayed as indicated by an arrowed dotted line in FIG. 10B or only movements of the objects having been cut may be displayed.

Further, in FIG. 11, a window W used for, for example, a browser is displayed on the monitor 2. The window W is moved on the display screen in a direction corresponding to the waving direction of the controller 7 in accordance with the controller 7 being waved.

Further, in FIG. 12, a sound is outputted from the speaker 2a of the monitor 2 in accordance with the controller 7 being waved. Depending on the waving directions of the controller 7, various sounds are outputted from the speaker 2a.

As apparent from the below description, the elapsed time from the determination of the waving direction can be used as a degree of reliability of the determined waving direction. For example, in an application in which quick responsiveness is important, immediately after the elapsed time is updated to zero (for example, at the moment the elapsed time is increased from zero), the game process, the information processing, or the like can be performed using the determined waving direction. On the other hand, in an application requiring that the waving direction be more accurately determined, after the elapsed time is increased to a certain amount, the game process, the information processing or the like can be performed using the determined waving direction.

Figure 13:
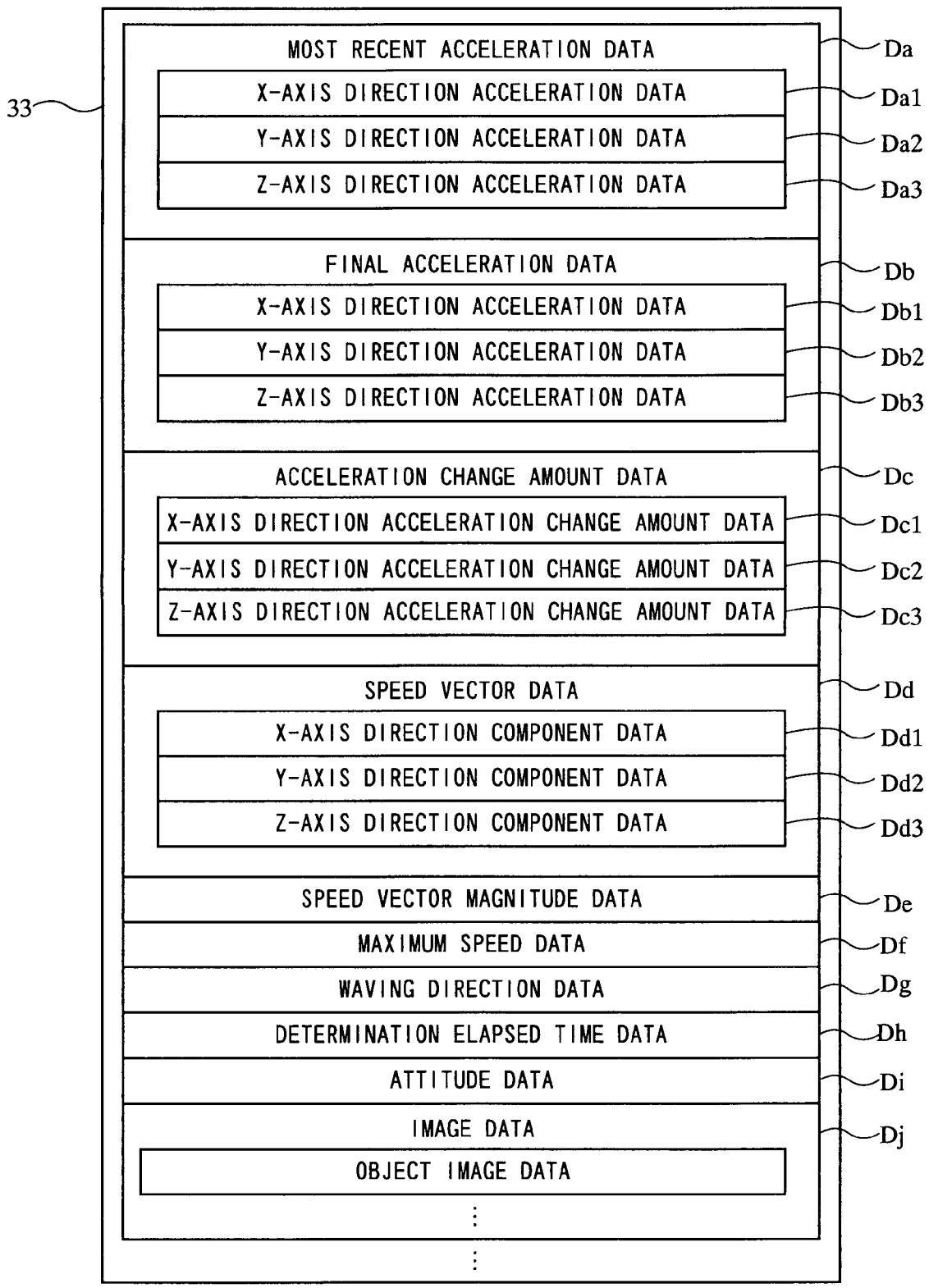
FIG. 13 is a diagram illustrating main data to be stored in the main memory 33 of the game apparatus body 5.

Next, the game process performed by the game system 1 will be described in detail. Initially, with reference to FIG. 13, main data to be used for the game process will be described. FIG. 13 is a diagram illustrating main data to be stored in the main memory 33 of the game apparatus body 5.

As shown in FIG. 13, the main memory 33 stores most recent acceleration data Da, final acceleration data Db, acceleration change amount data Dc, speed vector data Dd, speed vector magnitude data De, maximum speed data Df, waving direction data Dg, determination elapsed time data Dh, attitude data Di, image data Dj, and the like. The main memory 33 also stores data necessary for the game process, such as data (e.g., position data) relating to, for example, an object OBJ and other objects appearing in the game, and data (e.g., background data) relating to the virtual game space, in addition to the data contained in the information shown in FIG. 13.

The most recent acceleration data Da represents a most recent acceleration accn generated in the controller 7, and has its data updated to most recent acceleration data contained in a series of operation information transmitted as the transmission data from the controller 7. The most recent acceleration data Da includes: X-axis direction acceleration data Da1 representing an acceleration accnX detected in an X-axis component by the acceleration sensor 701; Y-axis direction acceleration data Da2 representing an acceleration accnY detected in a Y-axis component by the acceleration sensor 701; and Z-axis direction acceleration data Da3 representing an acceleration accnz detected in a Z-axis component by the acceleration sensor 701. The communication unit 6 included in the game apparatus body 5 receives acceleration data contained in the operation information transmitted from the controller 7 at predetermined time intervals (for example, every 1/200 seconds), and stores the acceleration data in a buffer (not shown) of the communication unit 6. Thereafter, the most recent acceleration data in the buffer is read for each frame (for example, every 1/60 seconds) corresponding to a game process cycle, so as to update the most recent acceleration data Da stored in the main memory 33.

In a process flow described below, the most recent acceleration data Da has its data updated for each frame corresponding to the game process cycle. However, the most recent acceleration data Da has its data updated in another process cycle. For example, the most recent acceleration data Da has its data updated for every transmission cycle of the controller 7, and the updated acceleration data may be used for every game process cycle. In this case, a cycle in which the most recent acceleration data Da representing the acceleration data Da1, Da2 and Da3 has its data updated is different from the game process cycle.

The final acceleration data Db represents final acceleration accl which corresponds to the most recent acceleration accn used for calculating an acceleration change amount accv. Specifically, the final acceleration data Db includes: X-axis direction acceleration data Db1 representing the final acceleration acclX relating to the X-axis component; Y-axis direction acceleration data Db2 representing the final acceleration acclY relating to the Y-axis component; and Z-axis direction acceleration data Db3 representing the final acceleration acclZ relating to the Z-axis component, as with the most recent acceleration data Da.

The acceleration change amount data Dc represents an acceleration change amount accv which corresponds to an amount of change between the most recent acceleration accn and the final acceleration accl. The acceleration change amount data Dc includes: X-axis direction acceleration change amount data Dc1 representing the acceleration change amount accvX relating to the X-axis component; Y-axis direction acceleration change amount data Dc2 representing the acceleration change amount accvY relating to the Y-axis component; and Z-axis direction acceleration change amount data Dc3 representing the acceleration change amount accvZ relating to the Z-axis component. That is, the acceleration change amount accv contains the acceleration change amount for each axis, that is, the acceleration change amount accvX, the acceleration change amount accvY, and the acceleration change amount accvZ, and also represents a change amount vector representing an amount of change between the most recent acceleration accn and the final acceleration accl.

The speed vector data Dd represents a vector (speed vector vecs) representing, as a magnitude and a direction, a hypothetical speed of the controller 7 calculated by, for example, cumulatively adding the acceleration change amount accv. The speed vector data Dd includes: X-axis direction component data Dd1 representing the X-axis component vecsX of the speed vector vecs; Y-axis direction component data Dd2 representing the Y-axis component vecsY of the speed vector vecs; and Z-axis direction component data Dd3 representing the Z-axis component vecsZ of the speed vector vecs.

The speed vector magnitude data De represents a magnitude sp of the speed vector vecs. The maximum speed data Df represents a maximum value (maximum speed spmax) of the magnitude sp obtained in a series of process.

The waving direction data Dg represents, as a three-dimensional vector or the like, a waving direction nrm in which the controller 7 is being waved. The determination elapsed time data Dh represents a determination elapsed time c from the determination of the waving direction nrm. The attitude data Di represents an attitude of the controller 7 in a static state as, for example, a three-dimensional vector representing a direction of the gravitational acceleration applied to the controller 7.

The image data Dj includes object image data and the like. The object image data is used for generating a game image in which objects are positioned in the virtual game space.

Figure 14:
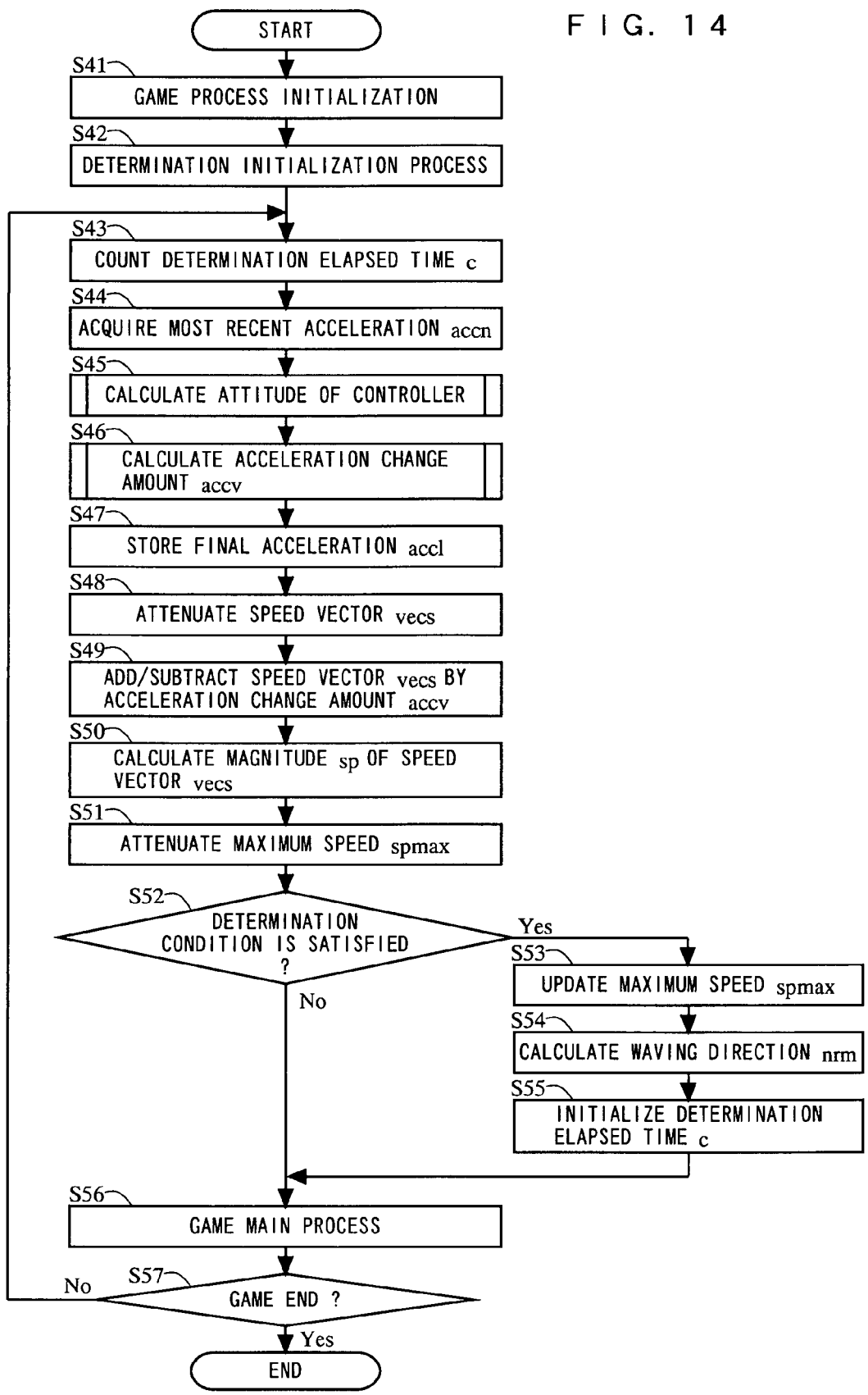
FIG. 14 is a flow chart illustrating a flow of the game process executed by the game apparatus body 5.
Figure 16:
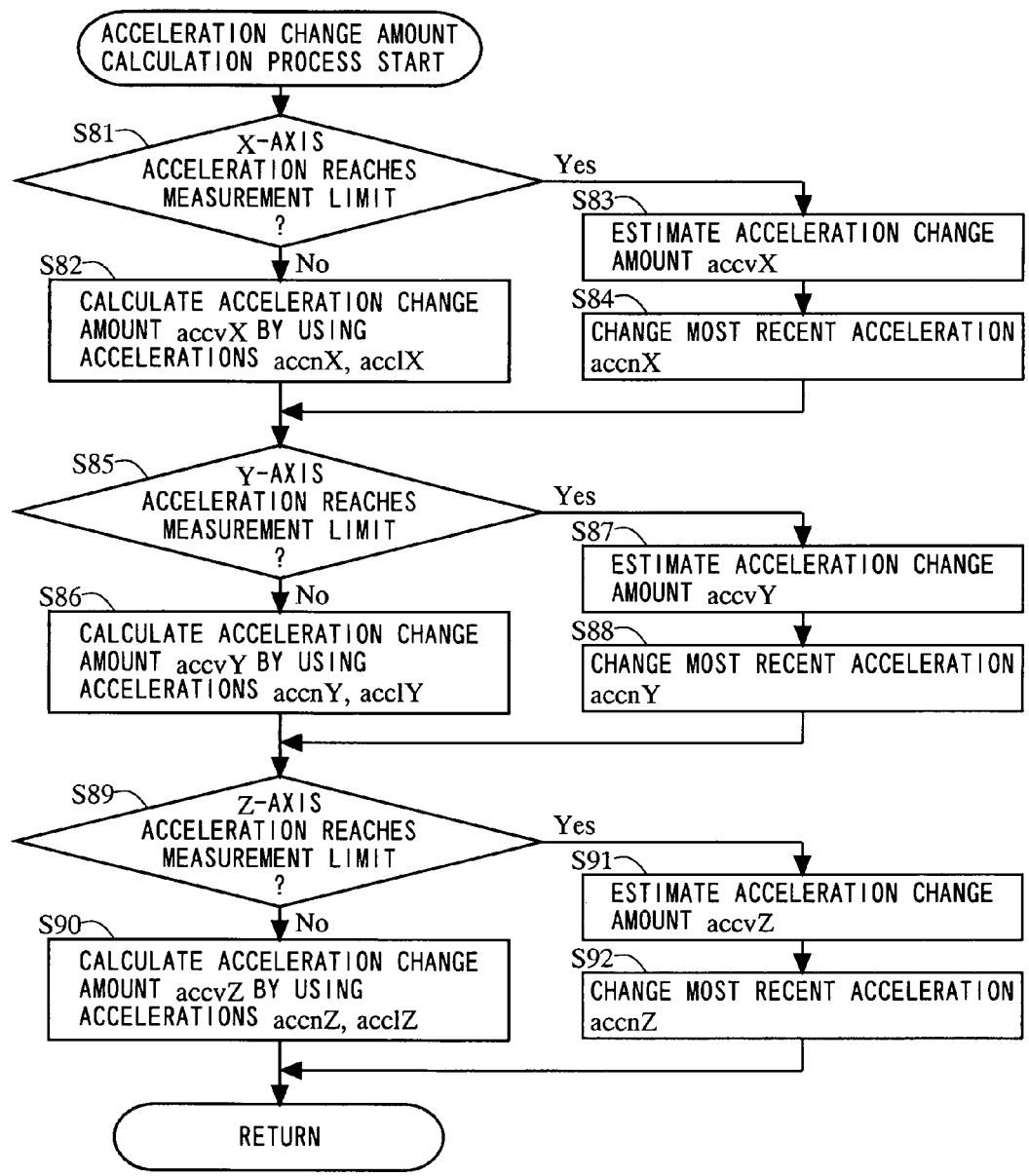
FIG. 16 shows a sub-routine illustrating in detail a process of calculating an acceleration change amount in step 46 shown in FIG. 14.

Next, with reference to FIGS. 14 to 16, the game process performed by the game apparatus body 5 will be described in detail. FIG. 14 is a flow chart illustrating a flow of the game process executed by the game apparatus body 5. FIG. 15 shows a sub-routine illustrating in detail a process of calculating an attitude of the controller in step 45 shown in FIG. 14. FIG. 16 shows a sub-routine illustrating in detail a process of calculating the acceleration change amount in step 46 shown in FIG. 14. With reference to the flow charts shown in FIGS. 14 to 16, process steps of determining the waving direction of the controller 7 in accordance with the player waving the controller 7 will be described among the entire game process, and a detailed description of process steps, among the entire game process, having no direct relation with the illustrative embodiments is not given. Further, in FIGS. 14 to 16, each of the steps executed by the CPU 30 is abbreviated as "S".

When the game apparatus body 5 is powered on, the CPU 30 of the game apparatus body 5 executes a boot program stored in a boot ROM not shown so as to initialize each unit such as the main memory 33. The game program stored in the optical disc 4 is loaded to the main memory 33 and the CPU 30 starts to execute the game program. The flow charts of FIGS. 14 to 16 show a game process performed after these process steps are completed.

As shown in FIG. 14, the CPU 30 performs a game process initialization in step 41, and advances the process to the next step. For example, the game process initialization of step 41 includes initializations, such as setting of the virtual game space and positioning of game objects, in the case of the game process in which a sword is waved and an item is moved in the virtual game space.

Next, the CPU 30 performs determination process initialization in step 42, and advances the process to the next step. In the determination process initialization of step 42, parameters each of which is used for calculating the waving direction of the controller 7 are initialized. For example, the CPU 30 sets, to zero, each of the final accelerations acclX, acclY, and acclZ which are represented by the final acceleration data Db. The CPU 30 sets, to zero, each of the acceleration change amounts accvX, accvY, and accvZ which are represented by the acceleration change amount data Dc. The CPU 30 sets, to zero, each of the components vecsX, vecsY, and vecsZ which are represented by the speed vector data Dd. The CPU 30 sets, to zero, the maximum speed spmax represented by the maximum speed data Df. The CPU 30 sets, as a three-dimensional vector having a length of 1 and a predetermined direction, each of the waving direction nrm represented by the waving direction data Dg and the attitude of the controller 7 in the static state represented by the attitude data Di. The CPU 30 sets, to zero, the determination elapsed time c represented by the determination elapsed time data Dh.

Next, the CPU 30 counts the determination elapsed time c in step 43, and advances the process to the next step. For example, the CPU 30 increments, by one, the determination elapsed time c represented by the determination elapsed time data Dh so as to update the determination elapsed time c.

Next, the CPU 30 acquires the most recent acceleration accn in step 44, and advances the process to the next step. For example, the CPU 30 updates the most recent acceleration data Da so as to represent, as the most recent acceleration accn, an acceleration represented by the acceleration data contained in the operation information having been most recently received from the controller 7. Specifically, the X-axis direction acceleration data Da1 is updated so as to represent, as the most recent acceleration accnX, an acceleration represented by X-axis direction acceleration data contained in the operation information having been most recently received from the controller 7. The Y-axis direction acceleration data Da2 is updated so as to represent, the most recent acceleration accnY, an acceleration represented by Y-axis direction acceleration data contained in the operation information having been most recently received from the controller 7. The Z-axis direction acceleration data Da3 is updated so as to represent, as the most recent acceleration accnZ, an acceleration represented by Z-axis direction acceleration data contained in the operation information having been most recently received from the controller 7.

Next, the CPU 30 calculates an attitude of the controller 7 in step 45, and advances the process to the next step. Hereinafter, with reference to FIG. 15, the process of calculating the attitude of the controller 7 in step 45 will be described.

As shown in FIG. 15, the CPU 30 determines in step 61 whether or not the controller 7 is in a static state, based on the most recent acceleration accn represented by the most recent acceleration data Da. For example, the CPU 30 determines that the controller 7 is not in the static state when a value represented by at least one of the most recent accelerations accnX, accnY or accnZ is greater than or equal to a value corresponding to the gravitational acceleration. As another example, the CPU 30 determines that the controller 7 is in the static state when each of the change amounts relating to the most recent accelerations accnX, accnY, and accnZ has a value smaller than a predetermined value. Other methods for determining, based on the most recent acceleration accn, whether or not the controller 7 is in the static state may be suggested, and therefore the state of the controller 7 may be determined in step 61 in the other methods. When the controller 7 is in the static state, the CPU 30 advances the process to step 62. On the other hand, when the controller 7 is not in the static state, the CPU 30 ends the process according to the sub-routine.

In step 62, the CPU 30 calculates the attitude of the controller 7 using the most recent acceleration accn so as to update the attitude data Di, and ends the process according to the sub-routine. When the controller 7 is in the static state, the gravitational acceleration is applied to the controller 7. The direction in which the gravitational acceleration is applied to the controller 7 can be calculated based on the most recent accelerations accnX, accnY, and accnZ. The direction in which the gravitational acceleration is applied to the controller 7 is a vertical direction in a real space, and it is possible to acquire the vertical direction which is represented by using the XYZ axes defined for the controller 7. For example, the CPU 30 updates the attitude data Di so as to represent the attitude of the controller 7 in the static state as three-dimensional vector data representing the direction of the gravitational acceleration relative to the controller 7.

Returning to FIG. 14, after the process of calculating the attitude of the controller 7 in step 45, the CPU 30 calculates the acceleration change amount accv in step 46, and advances the process to the next step. Hereinafter, with reference to FIG. 16, an acceleration change amount calculation process in step 46 will be described.

As shown in FIG. 16, in step 81, the CPU 30 determines whether or not the most recent acceleration accnX represented by the X-axis direction acceleration data Da1 contained in the most recent acceleration data Da reaches a measurement limit of the acceleration sensor 701. In general, the acceleration sensor 701 is allowed to measure an acceleration within its measurable range. When the acceleration has a value outside the measurable range, the acceleration sensor 701 may output an upper limit value (lower limit value) of the measurable range. For example, when the acceleration sensor 701 is allowed to measure an acceleration within the measurable range from −4 G to +4 G, and an acceleration of more than 4 G is applied to the controller 7, the acceleration sensor 701 outputs the acceleration data representing −4 G or +4 G In step 81, whether or not the acceleration applied to the controller 7 has a value within the acceleration measurable range is determined. For example, values close to the upper and lower limit values of the acceleration measurable range are used as threshold values (for example, −3.39 G and +3.39 G). In this case, when the most recent acceleration accnX≦−3.39 or the most recent acceleration accnX≧+3.39 is satisfied, the CPU 30 determines that the most recent acceleration accnX reaches the measurement limit of the acceleration sensor 701. When the most recent acceleration accnX does not reach the measurement limit, the CPU 30 advances the process to step 82. On the other hand, when the most recent acceleration accnX reaches the measurement limit, the CPU 30 advances the process to step 83.

In step 82, the CPU 30 calculates the acceleration change amount accvX in the X-axis direction so as to update the X-axis direction acceleration change amount data Dc1, and advances the process to step 85. For example, in step 82, the CPU 30 calculates the acceleration change amount accvX by subtracting, from the most recent acceleration accnX which is currently stored, the final acceleration acclX which is currently stored.

On the other hand, in step 83, the CPU 30 performs a calculation for estimating the acceleration change amount accvX so as to update the X-axis direction acceleration change amount data Dc1, and advances the process to the next step. For example, in step 83, the CPU 30 multiplies, by a predetermined attenuation rate, the acceleration change amount accvX which is currently stored (that is, the acceleration change amount accvX immediately preceding the acceleration change amount accvX which is being currently calculated), so as to update the acceleration change amount accvX, so that the X-axis direction acceleration change amount data Dc1 has its data updated. The value by which the acceleration change amount accvX is multiplied represents an attenuation rate of the acceleration change amount, which allows the estimation of a value of an acceleration outside the measurable range of the acceleration sensor 701, and the value, i.e., the attenuation rate is a positive value (for example, 0.6) smaller than one.

Next, the CPU 30 changes the most recent acceleration accnX using the acceleration change amount accvX having been calculated in step 83 so as to update the X-axis direction acceleration data Da1 in step 84, and advances the process to step 85. For example, the CPU 30 adds the acceleration change amount accvX having been calculated in step 83 to the most recent acceleration accnX which is currently stored so as to update the most recent acceleration accnX, thereby updating the X-axis direction acceleration data Da1.

In step 85, the CPU 30 determines whether or not the most recent acceleration accnY represented by the Y-axis direction acceleration data Da2 contained in the most recent acceleration data Da reaches a measurement limit of the acceleration sensor 701. For example, values close to the upper and lower limit values of the acceleration measurable range are used as threshold values (for example, −3.39 G and +3.39 G), as within in step 81. In this case, when the most recent acceleration accnY≦−3.39 or the most recent acceleration accnY≧+3.39 is satisfied, the CPU 30 determines that the most recent acceleration accnY reaches the measurement limit of the acceleration sensor 701. When the most recent acceleration accnY does not reach the measurement limit, the CPU 30 advances the process to step 86. On the other hand, when the most recent acceleration accnY reaches the measurement limit, the CPU 30 advances the process to step 87.

In step 86, the CPU 30 calculates the acceleration change amount accvY in the Y-axis direction so as to update the Y-axis direction acceleration change amount data Dc2, and advances the process to step 89. For example, in step 86, the CPU 30 calculates the acceleration change amount accvY by subtracting, from the most recent acceleration accnY which is currently stored, the final acceleration acclY which is currently stored.

On the other hand, in step 87, the CPU 30 performs a calculation for estimating the acceleration change amount accvY so as to update the Y-axis direction acceleration change amount data Dc2, and advances the process to the next step. For example, in step 87, the CPU 30 multiplies, by the predetermined attenuation rate, the acceleration change amount accvY which is currently stored (that is, the acceleration change amount accvY immediately preceding the acceleration change amount accvY which is being currently calculated), so as to update the acceleration change amount accvY, so that the Y-axis direction acceleration change amount data Dc2 has its data updated.

Next, the CPU 30 changes the most recent acceleration accnY using the acceleration change amount accvY having been calculated in step 87 so as to update the Y-axis direction acceleration data Da2 in step 88, and advances the process to step 89. For example, the CPU 30 adds the acceleration change amount accvY having been calculated in step 87 to the most recent acceleration accnY which is currently stored so as to update the most recent acceleration accnY, thereby updating the Y-axis direction acceleration data Da2.

In step 89, the CPU 30 determines whether or not the most recent acceleration accnZ represented by the Z-axis direction acceleration data Da3 contained in the most recent acceleration data Da reaches a measurement limit of the acceleration sensor 701. For example, values close to the upper and lower limit values of the acceleration measurable range are used as threshold values (for example, −3.39 G and +3.39 G), as within in step 81. In this case, when the most recent acceleration accnZ≦−3.39 or the most recent acceleration accnZ≧+3.39 is satisfied, the CPU 30 determines that the most recent acceleration accnZ reaches the measurement limit of the acceleration sensor 701. When the most recent acceleration accnZ does not reach the measurement limit, the CPU 30 advances the process to step 90. On the other hand, when the most recent acceleration accnZ reaches the measurement limit, the CPU 30 advances the process to step 91.

In step 90, the CPU 30 calculate the acceleration change amount accvZ in the Z-axis direction so as to update the Z-axis direction acceleration change amount data Dc3, and ends the process according to the sub-routine. For example, in step 90, the CPU 30 calculates the acceleration change amount accvZ by subtracting, from the most recent acceleration accnZ which is currently stored, the final acceleration acclZ which is currently stored.

On the other hand, in step 91, the CPU 30 performs a calculation for estimating the acceleration change amount accvZ so as to update the Z-axis direction acceleration change amount data Dc3, and advances the process to the next step. For example, in step 91, the CPU 30 multiplies, by the predetermined attenuation rate, the acceleration change amount accvZ which is currently stored (that is, the acceleration change amount accvZ immediately preceding the acceleration change amount accvZ which is being currently calculated), so as to update the acceleration change amount accvZ, so that the Z-axis direction acceleration change amount data Dc3 has its data updated.

Next, the CPU 30 changes the most recent acceleration accnZ using the acceleration change amount accvZ having been calculated in step 91 so as to update the Z-axis direction acceleration data Da3 in step 92, and ends the process according to the sub-routine. For example, the CPU 30 adds the acceleration change amount accvZ having been calculated in step 91 to the most recent acceleration accnz which is currently stored so as to update the most recent acceleration accnZ, thereby updating the Z-axis direction acceleration data Da3.

As described above, the acceleration change amount accv calculated in step 46 includes the acceleration change amounts accvX, accvY, and accvZ which are calculated for each axis, and also represents a change amount vector.

Returning to FIG. 14, after the acceleration change amount accv is calculated in step 46, the CPU 30 updates the final acceleration accl so as to represent the most recent acceleration accn, so that the final acceleration data Db has its data updated to the most recent acceleration accn in step 47, and advances the process to the next step. For example, the CPU 30 updates the final accelerations acclX, acclY, and acclZ so as to represent the most recent accelerations accnX, accnY, and accnZ, respectively, which are currently represented by the most recent acceleration data Da, so that the final acceleration data Db has its data updated.

Next, the CPU 30 attenuates the speed vector vecs by a predetermined amount so as to update the speed vector data Dd in step 48, and advance the process to the next step. For example, the CPU 30 multiplies, by a predetermined attenuation rate (which is a positive value smaller than one, such as 0.9), the X-axis component vecsX of the speed vector vecs which is currently stored, so as to update the X-axis component vecsX, thereby updating the X-axis direction component data Dd1. Further, the CPU 30 multiplies, by the predetermined attenuation rate, the Y-axis component vecsY of the speed vector vecs which is currently stored, so as to update the Y-axis component vecsY, thereby updating the Y-axis direction component data Dd2. The CPU 30 multiplies, by the predetermined attenuation rate, the Z-axis component vecsZ of the speed vector vecs which is currently stored, so as to update the Z-axis component vecsZ, thereby updating the Z-axis direction component data Dd3.

In step 48, each of the components of the speed vector vecs is multiplied by the predetermined attenuation rate so as to attenuate the speed vector vecs. However, the speed vector vecs may be attenuated in another method. For example, a predetermined amount may be added to each of the components of the speed vector vecs or subtracted therefrom such that each of the components of the speed vector vecs approaches zero, thereby attenuating the speed vector vecs.

Next, the CPU 30 adds/subtracts the speed vector vecs by the acceleration change amount accv so as to update the speed vector data Dd in step 49, and advances the process to the next step. For example, the CPU 30 adds the acceleration change amount accvX to the X-axis component vecsX of the speed vector vecs which is currently stored, so as to update the X-axis component vecsX, thereby updating the X-axis direction component data Dd1. Further, the CPU 30 adds the acceleration change amount accvY to the Y-axis component vecsY of the speed vector vecs which is currently stored, so as to update the Y-axis component vecsY, thereby updating the Y-axis direction component data Dd2. The CPU 30 adds the acceleration change amount accvZ to the Z-axis component vecsZ of the speed vector vecs which is currently stored, so as to update the Z-axis component vecsZ, thereby updating the Z-axis direction component data Dd3. The order of step 48 and step 49 may be reversed.

Next, the CPU 30 calculates the magnitude sp of the speed vector vecs so as to update the speed vector magnitude data De in step 50, and advances the process to the next step. For example, the CPU 30 calculates the magnitude sp by using the speed vector data Dd according to the following equation.

$$sp=\sqrt{vecsX^2+vecsY^2+VecsZ^2}$$

Next, the CPU 30 attenuates the maximum speed spmax by a predetermined amount so as to update the maximum speed data Df in step 51, and advances the process to the next step. For example, the CPU 30 multiplies, by a predetermined attenuation rate (which is a positive value smaller than one, such as 0.98), the maximum speed spmax which is currently represented by the maximum speed data Df so as to update the maximum speed spmax, thereby updating the maximum speed data Df.

Next, the CPU 30 determines in step 52 whether or not a determination criterion for determining the waving direction is satisfied. For example, when the magnitude sp having been calculated in step 50 is greater than a predetermined value and the maximum speed spmax having been calculated in step 51, the CPU 30 determines that the determination criterion is satisfied. The predetermined value corresponds to a minimum magnitude of the speed vector vecs required for determining the waving direction, and is set to, for example, 1.9. When the determination criterion is satisfied, the CPU 30 advances the process to step 53. On the other hand, when the determination criterion is not satisfied, the CPU 30 advances the process to step 56.

In step 53, the CPU 30 sets the magnitude sp having been calculated in step 50 to the maximum speed spmax so as to update the maximum speed data Df. The waving direction data Dg is updated so as to represent the waving direction nrm corresponding to a direction of the current speed vector vecs in step 54, and the process is advanced to the next step. For example, the CPU 30 calculates a three-dimensional vector having a length of one which is obtained by normalizing the speed vector vecs currently represented by the speed vector data Dd, and updates the waving direction data Dg so as to represent, as the waving direction nrm, a direction of the three-dimensional vector.

Next, the CPU 30 initializes the determination elapsed time c as zero, so as to update the determination elapsed time data Dh in step 55, and advances the process to step 56. That is, the determination elapsed time c represents a parameter which is initialized as zero when the waving direction nrm is calculated, and the counting of the parameter is updated in step 43.

In step 56, the CPU 30 performs a game main process and advances the process to the next step. The CPU 30 may use, for the game main process, data representing the waving direction nrm, the determination elapsed time c, the attitude of the controller 7 in the static state represented by the attitude data Di, and the like, which have been calculated in steps 41 to 55. For example, the game main process includes a process of moving an object (waving a sword, moving an item and the like) in the virtual game space in accordance with the waving direction nrm or a process of outputting a sound from the speaker 2a and the speaker 706 of the controller 7 in accordance with the waving direction nrm.

Next, the CPU 30 determines whether or not the game is to be ended in step 57. For example, it is determined that the game is to be ended when a condition for game over is satisfied, or when a player performs an operation for ending the game. When the game is not to be ended, the CPU 30 returns the process to step 43 and repeats the aforementioned process. When the game is to be ended, the CPU 30 ends the process according to the flow chart.

Here, a basic principle of the acceleration data process as described above will be described. In the process described above, the speed vector vecs is used to obtain the waving direction nrm. The speed vector vecs is a hypothetical three-dimensional vector which continues to be attenuated (refer to step 48), and has its magnitude increased (that is, has its speed increased) by cumulatively adding the acceleration change amount accv (refer to step 49). When the magnitude sp of the speed vector vecs is greater than a predetermined value, the direction of the speed vector vecs is determined as the waving direction nrm. Since the speed vector vecs continues to be attenuated, it is necessary to continue to increase the acceleration in a constant direction in order to obtain the magnitude sp greater than the predetermined value. The value to be cumulatively added is acquired based on the acceleration data outputted by the acceleration sensor 701. Therefore, when each of the change amounts of the accelerations detected by the acceleration sensor 701 indicates a similar tendency, the waving direction mm is determined. Each of the change amounts of the accelerations is likely to indicate the similar tendency when a linear movement is applied to the acceleration sensor 701 (that is, to the controller 7). Specifically, when a linear movement is applied to the acceleration sensor 701, the acceleration detected by the acceleration sensor 701 linearly varies, and therefore each of the change amounts (change direction) of the accelerations indicates a similar tendency. That is, in the aforementioned process, when the player linearly waves the controller 7, the waving direction nrm is determined in accordance with the controller 7 being linearly waved. Thus, each of the change amounts of the accelerations obtained by the acceleration sensor 701 is cumulatively added so as to determine, based on the value obtained by the cumulative addition, the direction in which the controller 7 is linearly waved.

When the player waves the controller in a certain direction, the player unconsciously vigorously waves the controller in the certain direction at the start of the waving operation. According to the illustrative embodiments, the operation of vigorously waving the controller at the start of the waving operation is utilized to identify, through the process as described herein, an acceleration obtained when the controller is vigorously waved at the start of the waving operation, and detect for the waving operation in the certain direction without obtaining a variation in acceleration from the start to the end of the waving operation.

When it is unnecessary to determine the waving direction in which the controller 7 is linearly waved, the speed vector vecs may not be attenuated. In this case, it is unnecessary to continue to increase the acceleration in a constant direction, and therefore even when each of the change amounts of the accelerations detected by the acceleration sensor 701 indicate a different tendency, the waving direction nrm is determined. That is, even when a movement other than the linear movement is applied to the acceleration sensor 701, the waving direction nrm is sequentially calculated, and therefore various directions of complex movements, such as a moving direction of the controller 7, can be determined.

Further, when an acceleration has a value outside the measurable range of the acceleration sensor 701, the acceleration change amount accv to be updated is estimated using the acceleration change amount accv immediately preceding the acceleration change amount accv being currently calculated, so as to calculate the acceleration change amount accv in step 46. As a method for estimating the acceleration change amount accv, used is a method in which the acceleration change amount accv immediately preceding the acceleration change amount accv being currently calculated is simply multiplied by a predetermined attenuation rate, thereby enhancing a responsiveness. For example, as compared to a method for buffering all the acceleration data acquired by the acceleration sensor 701 so as to perform an interpolation using a spline curve and the like, the responsiveness can be substantially enhanced and a memory for buffering is unnecessary, thereby reducing calculation process load.

Further, in step 51 and step 52, the maximum speed spmax which continues to be attenuated by a predetermined amount is compared with the magnitude sp of the speed vector vecs having been most recently acquired so as to set the determination criterion. For example, when the maximum speed spmax is initialized as an extremely small value immediately after the waving direction nrm is determined, even a slight movement of the controller 7 occurring after the determination of the waving direction nrm is determined, whereby an erroneous determination may be made. For example, after the controller 7 is vigorously waved, even an operation of stopping a movement of the controller 7 or the like is determined, and therefore an unstable movement, such as a hand jiggling, in a direction other than the direction in which the player has waved the controller 7, may be erroneously determined. On the other hand, when the maximum speed spmax having been previously updated is maintained over a prolonged time as it is, it is necessary to obtain the speed vector vecs which has the magnitude sp greater than the maximum speed spmax which is maintained, in order to update the waving direction nrm. That is, it is necessary to wave the controller 7 at a speed higher than a waving speed having been previously determined, whereby a necessary determination cannot be made. In step 51, the maximum speed spmax is multiplied by the attenuation rate corresponding to a positive value (for example, 0.98) smaller than one but close to one, and therefore the necessary determinations can be sequentially made while preventing too frequent determinations as described above, thereby enabling a stable waving direction determination.

Further, in the game main process in step 56, the parameters obtained in the acceleration data process as described above can be used in various manners. A first example where the parameters are used is as follows. When the waving direction nrm is used, a direction in which the player is waving the controller 7 can be inferred relative to the coordinate axes (refer to FIGS. 3 and 4) defined for the controller 7. For example, when the waving direction nrm is used, a direction in which the controller 7 is being waved can be inferred relative to the body thereof (for example, the top surface direction or the front surface direction of the controller 7). Such a waving direction relative to the body of the controller 7 can be used for the game main process.

A second example will be described. When the waving direction nrm and the determination elapsed time c are used, the game main process can be performed based on a degree of reliability of the waving direction nrm having been determined. As apparent from the aforementioned process, the determination elapsed time c represents a parameter which is initialized as zero when the waving direction nrm is updated. That is, the determination elapsed time c is initialized each time a direction in which a player waves the controller 7 is changed. In general, when the player waves the controller 7 in a first direction, the player tends to move the controller 7 in the direction opposite to the first direction immediately before the player waves the controller 7 in the first direction (so-called taking-back action). When the taking-back action is applied to the controller 7, the waving direction nrm representing the opposite direction to the first direction is determined during the taking-back action, and thereafter the waving direction nrm representing the first direction is determined. In order to prevent the determination of the taking-back action or the like which is unconsciously performed by the player, a passage of a certain amount of time is required after the determination of the waving direction nrm. That is, in a game in which a quick response is important when the controller 7 is waved, the game main process can be performed using the waving direction nrm having been determined at the moment the determination elapsed time c is increased from zero, for example. On the other hand, in a game in which the waving direction nrm having been determined in accordance with the controller 7 being waved is required with enhanced accuracy, the game main process can be performed using the waving direction nrm determined when the determination elapsed time c increases to a certain amount.

A third example will be described. The waving direction nrm and the attitude of the controller 7 in the static state represented by the attitude data Di are used to infer a direction in which the player is waving the controller 7 in the real space in which the player is operating the controller 7. For example, as described above, the waving direction nrm can be used to infer the direction, relative to the body of the controller 7, in which the controller 7 is being waved. On the other hand, the attitude of the controller 7 in the static state, which is represented by the attitude data Di, represents a direction of the gravitational acceleration which is applied to the controller 7 prior to the player waving the controller 7, for example. The attitude of the controller 7 in the static state is used as data which represents the vertical direction in the real space relative to the body of the controller 7. Accordingly, the waving direction nrm and the attitude of the controller 7 in the static state represented by the attitude data Di, can be used to infer the direction in which the controller 7 is being waved in the real space (for example, in the horizontal direction or the up/down direction in the real space). Further, when a reference attitude or a reference direction in which the controller 7 is operated are set (for example, an attitude or a direction obtained when the front surface of the controller 7 is oriented to the monitor 2 so as to point to the monitor 2 or the controller 7 is held so as to orient the side surface thereof to the monitor 2, may be set as references), a direction (for example, up/down, left/right, or forward/backward) in which the player is waving the controller 7 can be inferred. Further, when the determination elapsed time c is used, the game main process can be performed based on a degree of the reliability of the waving direction nrm, having been determined as described above.

Figure 17:
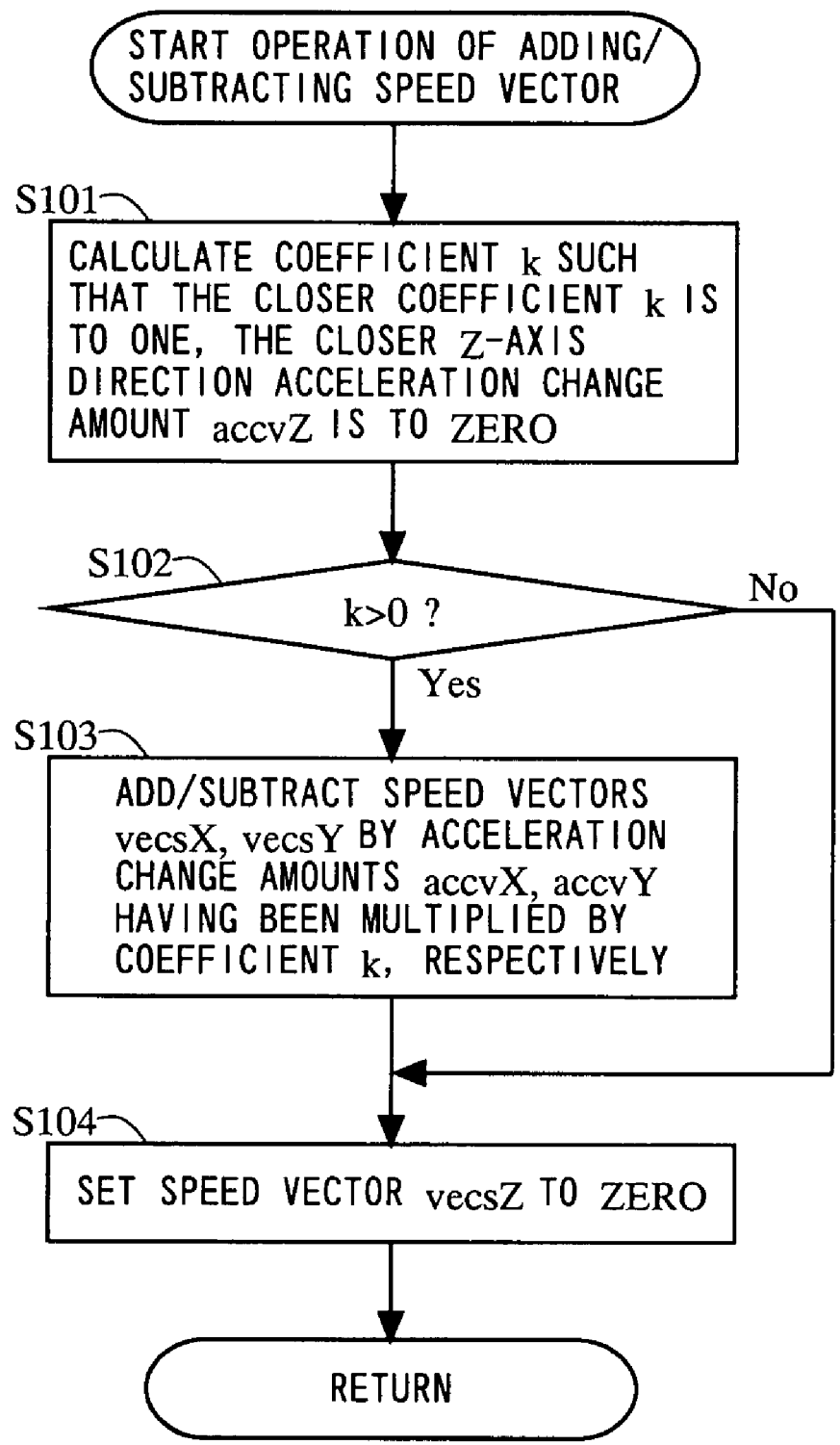
FIG. 17 shows a sub-routine showing a process of adding/subtracting a speed vector vecs when a direction in which the controller 7 is waved is two-dimensionally represented.

Further, although in the aforementioned acceleration data process the waving direction nrm of the controller 7 is represented as a three-dimensional vector, the direction in which the controller 7 is waved can be two-dimensionally represented. Hereinafter, with reference to FIG. 17, a process of two-dimensionally (for example, based on an XY plane) representing a direction in which the controller 7 is waved will be described. FIG. 17 shows a sub-routine showing a process of adding/subtracting the speed vector vecs when the direction in which the controller 7 is waved is two-dimensionally represented. A process for two-dimensionally representing the direction in which the controller 7 is waved is the same as the process for representing the direction as the three-dimensional vector except for steps corresponding to step 49 as described above. That is, the aforementioned step 49 is replaced with process steps according to the sub-routine shown in FIG. 17. Hereinafter, only steps which are not performed in the process for representing the direction as a three-dimensional vector but performed in the process for two-dimensionally representing the direction will be described, and a description of the same steps is not given.

In FIG. 17, the CPU 30 calculates a coefficient k in step 101, and determines whether or not the coefficient k is greater than zero in step 102. Here, the coefficient k is set such that the closer the coefficient k is to one, the closer the acceleration change amount accvZ in the Z-axis direction is to zero. The coefficient k is represented by, for example, the following equation.

$$k = 1 - accvZ$$

When k>0 is satisfied, the CPU 30 advance the process to step 103. On the other hand, when k≦0 is satisfied, the CPU 30 advances the process to step 104.

In step 103, each of the acceleration change amounts accvX and accvY is multiplied by the coefficient k. The acceleration change amounts accvX and accvY having been multiplied by the coefficient k are added to the X-axis component vecsX and Y-axis component vecsY of the speed vector vecs, respectively, so as to update the speed vector data Dd, and advances the process to step 104. For example, the CPU 30 adds the acceleration change amount accvX multiplied by the coefficient k to the X-axis component vecsX of the speed vector vecs which is currently stored, so as to update the X-axis component vecsX, thereby updating X-axis direction component data Dd1. Further, the CPU 30 adds the acceleration change amount accvY multiplied by the coefficient k to the Y-axis component vecsY of the speed vector vecs which is currently stored, so as to update the Y-axis component vecsY, thereby updating Y-axis direction component data Dd2.

In step 104, the CPU 30 sets, to zero, the Z-axis component vecsZ of the speed vector vecs so as to update the speed vector data Dd, and ends the process according to the sub-routine. Thereafter, step 50 and the following steps shown in FIG. 14 will be performed.

In steps 101 to 104, the Z-axis component vecsZ of the speed vector vecs is always set to zero, and therefore the waving direction nrm is represented as a two-dimensional vector based on an XY plane. Further, in the aforementioned process steps, the speed vector vecs is calculated such that the shorter distance the controller 7 moves over in the Z-axis direction, the greater the influence on the change amount of the acceleration along the XY plane is. Therefore, the required movement of the controller 7 along the XY plane can be preferentially determined.

As described above, the game apparatus 3 according to the present embodiment uses the speed vector obtained by cumulatively adding the change amount of the acceleration having been detected by the acceleration sensor 701 of the controller 7 so as to determine the waving direction of the controller 7 with enhanced responsiveness.

An acceleration sensor for detecting an acceleration in two-axial directions or one axial direction can be used to realize the illustrative embodiments. For example, when the controller 7 includes an acceleration sensor for detecting an acceleration in the X-axis direction and the Y-axis direction (refer to FIGS. 3 and 4), only an X-axis component and a Y-axis component are used to perform to the aforementioned process, thereby enabling the determination of the waving direction of the controller 7 along the XY plane. Further, when an acceleration sensor for detecting and outputting only the Y-axis component is used, only the Y-axis component is used to perform the aforementioned process, thereby enabling the determination of the waving of the controller 7 in the Y-axis direction.

Further, in the above description, the game apparatus body 5 for allowing the game to be played by waving the controller 7 is applied to the game system 1. However, the game apparatus body 5 is applicable to a typical information processing apparatus, such as a personal computer, operated by using an input device having an acceleration sensor. Various processes can be performed based on an acceleration generated in the input device. For example, a state and a position of an object or a window displayed by the information processing apparatus may be controlled based on acceleration data outputted by the acceleration sensor of the input device.

Further, although in the above description the controller 7 and the game apparatus body 5 are connected to each other by wireless communication, the controller 7 and the game apparatus body 5 may be electrically connected to each other via a cable. In this case, the cable connected to the controller 7 is connected to a connection terminal of the game apparatus body 5.

The aforementioned shape of the controller 7 is merely an example. Further, the shape, the number, the setting position and the like of the operation section 72 included in the controller 7 are merely examples. Even when the shape of the controller 7, and the shape, the number, the setting position and the like of the operation section 72 are different from those described in the illustrative embodiments, the results taught herein can be realized.

Moreover, the acceleration data processing program and the game program according to the illustrative embodiments may be supplied to the game apparatus body 5 via a wired or a wireless communication line in addition to through an external storage medium such as the optical disc 4. Further, the acceleration data processing program may be previously stored in a non-volatile storage unit in the game apparatus body 5. An information storage medium for storing the acceleration data processing program may be a non-volatile semiconductor memory in addition to a CD-ROM, a DVD or an optical disc type storage medium.

The storage medium having the acceleration data processing program stored thereon, the storage medium having a game program stored thereon, and an acceleration data processing apparatus according to the illustrative embodiments allows the determination of the waving direction of an input device with enhanced responsiveness, and are applicable as a program and an apparatus for performing game process, information processing and the like based on an operation applied to a game controller and the like.

While the illustrative embodiments have been described in detail, the foregoing description is in all aspects illustrative and not restrictive. It is understood that numerous other modifications and variations can be devised without departing from the scope of the invention.

What is claimed is:

1. A storage medium having stored thereon an acceleration data processing program to be executed by a computer of a game apparatus to perform a game process by using acceleration data output by an acceleration sensor capable of detecting, in at least one axial direction thereof, an acceleration applied to a game input device, the computer being caused to function as:
    data acquisition programmed logic circuitry for acquiring the acceleration data at predetermined time intervals;
    change amount calculation programmed logic circuitry for calculating a change amount value representing a change amount of the acceleration for each said axial direction with respect to time by using the acceleration data having been acquired by the data acquisition programmed logic circuitry;
    accumulation value calculation programmed logic circuitry for calculating an accumulation value by sequentially and cumulatively adding the change amount value having been calculated by the change amount calculation programmed logic circuitry; and
    direction determination programmed logic circuitry for determining, as a waving direction representing a moving direction of the game input device, a direction of the accumulation value, when the accumulation value having been calculated by the accumulation value calculation programmed logic circuitry satisfies a predetermined condition.

2. The storage medium according to claim 1, wherein the accumulation value calculation programmed logic circuitry includes an attenuation process programmed logic circuitry for sequentially attenuating the accumulation value before or after the change amount value is added to the accumulation value.

3. The storage medium according to claim 1, wherein:
    the acceleration sensor is capable of detecting, in at least two axial directions, the acceleration applied to the input device;
    the data acquisition programmed logic circuitry acquires the acceleration data output by the acceleration sensor in units of axial components of the at least two axial directions;
    the change amount calculation programmed logic circuitry calculates, as the change amount value, the change amount of the acceleration in units of the axial components by using the acceleration represented by the acceleration data in units of the axial components; and
    the direction determination programmed logic circuitry determines, as the waving direction representing the moving direction of the input device, a direction of a combined value of the accumulation values obtained in units of the axial components.

4. The storage medium according to claim 3, wherein the accumulation value calculation programmed logic circuitry includes an attenuation process programmed logic circuitry for sequentially attenuating the accumulation value before or after the change amount value is added to the accumulation value.

5. The storage medium according to claim 1, wherein the computer is caused to further function as gravity direction calculation programmed logic circuitry for calculating, by using the acceleration data having been acquired by the data acquisition programmed logic circuitry, a direction of a gravitational acceleration applied to the input device, and
    wherein the direction determination programmed logic circuitry determines the waving direction, representing the moving direction of the input device, relative to the gravitational acceleration by using the direction of the accumulation value, and the direction of the gravitational acceleration having been calculated by the gravity direction calculation programmed logic circuitry.

6. The storage medium according to claim 1, wherein the accumulation value calculation programmed logic circuitry calculates the accumulation value by sequentially and cumulatively adding the change amount value which has been calculated by the change amount calculation programmed logic circuitry and has been multiplied by a coefficient.

7. A storage medium having stored thereon an acceleration data processing program to be executed by a computer of an apparatus to perform a process by using acceleration data output by an acceleration sensor capable of detecting, in at least one axial direction thereof, an acceleration applied to an input device, the computer being caused to function as:
    data acquisition programmed logic circuitry for acquiring the acceleration data at predetermined time intervals;
    change amount calculation programmed logic circuitry for calculating a change amount value representing a change amount of the acceleration for each said axial direction with respect to time by using the acceleration data having been acquired by the data acquisition programmed logic circuitry;
    accumulation value calculation programmed logic circuitry for calculating an accumulation value by sequentially and cumulatively adding the change amount value for each said axial direction having been calculated by the change amount calculation programmed logic circuitry; and
    direction determination programmed logic circuitry for determining, as a waving direction representing a moving direction of the input device, a direction of the accumulation value, when the accumulation value having been calculated by the accumulation value calculation programmed logic circuitry satisfies a predetermined condition,
wherein the direction determination programmed logic circuitry determines, as the waving direction representing the moving direction of the input device, the direction of the accumulation value when a magnitude of the accumulation value having been calculated by the accumulation value calculation programmed logic circuitry is greater than a threshold value.

8. The storage medium according to claim 7, wherein the computer is caused to further function as threshold value updating programmed logic circuitry for updating the threshold value so as to represent the magnitude of the accumulation value when the magnitude of the accumulation value having been calculated by the accumulation value calculation programmed logic circuitry is greater than the threshold value.

9. The storage medium according to claim 8, wherein the threshold value updating programmed logic circuitry reduces the threshold value by a predetermined amount each time the accumulation value is calculated.

10. The storage medium according to claim 8, wherein
the threshold value updating programmed logic circuitry pre-sets a fixed value other than the threshold value, and
the direction determination programmed logic circuitry determines, as the waving direction representing the moving direction of the input device, the direction of the accumulation value when the magnitude of the accumulation value having been calculated by the accumulation value calculation programmed logic circuitry is greater than both the threshold value and the fixed value.

11. A storage medium having stored thereon an acceleration data processing program to be executed by a computer of an apparatus to perform a process by using acceleration data output by an acceleration sensor capable of detecting, in at least one axial direction thereof, an acceleration applied to an input device, the computer being caused to function as:
data acquisition programmed logic circuitry for acquiring the acceleration data at predetermined time intervals;
change amount calculation programmed logic circuitry for calculating a change amount value representing a change amount of the acceleration for each said axial direction with respect to time by using the acceleration data having been acquired by the data acquisition programmed logic circuitry;
accumulation value calculation programmed logic circuitry for calculating an accumulation value by sequentially and cumulatively adding the change amount value for each said axial direction having been calculated by the change amount calculation programmed logic circuitry; and
direction determination programmed logic circuitry for determining, as a waving direction representing a moving direction of the input device, a direction of the accumulation value, when the accumulation value having been calculated by the accumulation value calculation programmed logic circuitry satisfies a predetermined condition,
wherein the computer is caused to further function as:
elapsed time measurement programmed logic circuitry for measuring an elapsed time from when the direction determination programmed logic circuitry has determined the waving direction representing the moving direction of the input device, and
information processing programmed logic circuitry for performing, when the elapsed time increases to a predetermined amount, a predetermined information processing by using the waving direction representing the moving direction of the input device having been determined by the direction determination programmed logic circuitry.

12. A storage medium having stored thereon an acceleration data processing program to be executed by a computer of an apparatus to perform a process by using acceleration data output by an acceleration sensor capable of detecting, in at least one axial direction thereof, an acceleration applied to an input device, the computer being caused to function as:
data acquisition programmed logic circuitry for acquiring the acceleration data at predetermined time intervals;
change amount calculation programmed logic circuitry for calculating a change amount value representing a change amount of the acceleration for each said axial direction with respect to time by using the acceleration data having been acquired by the data acquisition programmed logic circuitry;
accumulation value calculation programmed logic circuitry for calculating an accumulation value by sequentially and cumulatively adding the change amount value for each said axial direction having been calculated by the change amount calculation programmed logic circuitry; and
direction determination programmed logic circuitry for determining, as a waving direction representing a moving direction of the input device, a direction of the accumulation value, when the accumulation value having been calculated by the accumulation value calculation programmed logic circuitry satisfies a predetermined condition,
wherein:
the acceleration sensor is capable of detecting the acceleration having a magnitude within a predetermined measurable range, and
the change amount calculation programmed logic circuitry updates, when the acceleration represented by the acceleration data having been acquired by the data acquisition programmed logic circuitry has a value outside the predetermined measurable range, the change amount value so as to represent the change amount value obtained by attenuating, by a predetermined amount, the change amount value immediately preceding the change amount value being currently calculated.

13. A storage medium having stored thereon an acceleration data processing program to be executed by a computer of an apparatus to perform a process by using acceleration data output by an acceleration sensor capable of detecting, in at least one axial direction thereof, an acceleration applied to an input device, the computer being caused to function as:
data acquisition programmed logic circuitry for acquiring the acceleration data at predetermined time intervals;
change amount calculation programmed logic circuitry for calculating a change amount value representing a change amount of the acceleration for each said axial direction with respect to time by using the acceleration data having been acquired by the data acquisition programmed logic circuitry;
accumulation value calculation programmed logic circuitry for calculating an accumulation value by sequentially and cumulatively adding the change amount value for each said axial direction having been calculated by the change amount calculation programmed logic circuitry; and
direction determination programmed logic circuitry for determining, as a waving direction representing a moving direction of the input device, a direction of the accumulation value, when the accumulation value having been calculated by the accumulation value calculation programmed logic circuitry satisfies a predetermined condition, wherein:

the accumulation value calculation programmed logic circuitry calculates the accumulation value by sequentially and cumulatively adding the change amount value which has been calculated by the change amount calculation programmed logic circuitry and has been multiplied by a coefficient, the acceleration sensor is capable of detecting, in three axial directions, the acceleration applied to the input device, the direction determination programmed logic circuitry determines, based on a two-dimensional plane including two axes selected from among three axes of the three axial directions, the waving direction representing the moving direction of the input device, and the accumulation value calculation programmed logic circuitry sets a value of the coefficient in accordance with a magnitude of the acceleration which is represented by the acceleration data having been acquired by the data acquisition programmed logic circuitry and is applied in one axial direction other than directions represented by the two axes selected from among the three axes.

14. The storage medium according to claim 13, wherein the accumulation value calculation programmed logic circuitry sets, when the magnitude of the acceleration applied in the one axial direction is zero, the value of the coefficient to one, and sets, when the magnitude of the acceleration applied in the one axial direction is greater than zero, the value of the coefficient to a value smaller than one such that the greater the magnitude of the acceleration applied in the one axial direction is, the smaller the value of the coefficient is.

15. A storage medium having stored thereon an acceleration data processing program to be executed by a computer of an apparatus to perform a process by using acceleration data output by an acceleration sensor capable of detecting, in at least one axial direction thereof, an acceleration applied to an input device, the computer being caused to function as:

data acquisition programmed logic circuitry for acquiring the acceleration data at predetermined time intervals;

change amount calculation programmed logic circuitry for calculating a change amount value representing a change amount of the acceleration for each said axial direction with respect to time by using the acceleration data having been acquired by the data acquisition programmed logic circuitry;

accumulation value calculation programmed logic circuitry for calculating an accumulation value by sequentially and cumulatively adding the change amount value for each said axial direction having been calculated by the change amount calculation programmed logic circuitry; and direction determination programmed logic circuitry for determining, as a waving direction representing a moving direction of the input device, a direction of the accumulation value, when the accumulation value having been calculated by the accumulation value calculation programmed logic circuitry satisfies a predetermined condition, wherein a game program stored on the storage medium includes the acceleration data progressing program and causes the computer to perform a game process by using the acceleration data, wherein the computer is caused to further function as game process programmed logic circuitry for performing the game process by using the waving direction representing the moving direction of the input device having been determined by the direction determination programmed logic circuitry.

16. The storage medium having stored thereon the game program according to claim 15, wherein the game process programmed logic circuitry includes:

object setting programmed logic circuitry for setting a game object in a virtual game world;

object moving programmed logic circuitry for moving the game object in the virtual game world in accordance with the waving direction representing the moving direction of the input device having been determined by the direction determination programmed logic circuitry; and display control programmed logic circuitry for displaying the game object in the virtual game world on a display device.

17. The storage medium having stored thereon the game program according to claim 15, wherein the game process programmed logic circuitry includes:

object setting programmed logic circuitry for setting a game object in a virtual game world;

object operating programmed logic circuitry for operating the game object in the virtual game world so as to be waved in accordance with the waving direction representing the moving direction of the input device having been determined by the direction determination programmed logic circuitry; and display control programmed logic circuitry for displaying the game object in the virtual game world on a display device.

18. The storage medium having stored thereon the game program according to claim 15, wherein the game process programmed logic circuitry includes:

sound generation setting programmed logic circuitry for setting, in accordance with the waving direction representing the moving direction of the input device having been determined by the direction determination programmed logic circuitry, a sound to be generated; and sound control programmed logic circuitry for generating, from a speaker, the sound having been set by the sound generation setting programmed logic circuitry.

19. An acceleration data processing game apparatus for performing a predetermined game process by using acceleration data outputted by an acceleration sensor capable of detecting, in at least one axial direction thereof, an acceleration applied to a game input device, the acceleration data processing game apparatus comprising:

data acquisition programmed logic circuitry for acquiring the acceleration data at predetermined time intervals;

change amount calculation programmed logic circuitry for calculating a change amount value representing a change amount of the acceleration for each said axial direction with respect to time by using the acceleration data having been acquired by the data acquisition programmed logic circuitry;

accumulation value calculation programmed logic circuitry for calculating an accumulation value by sequentially and cumulatively adding the change amount value for each said axial direction having been calculated by the change amount calculation programmed logic circuitry; and direction determination programmed logic circuitry for determining, as a waving direction representing a moving direction of the game input device, a direction of the accumulation value, when the accumulation value having been calculated by the accumulation value calculation programmed logic circuitry satisfies a predetermined condition.

20. The acceleration data processing apparatus according to claim 19, wherein the accumulation value calculation programmed logic circuitry includes an attenuation process programmed logic circuitry for sequentially attenuating the accumulation value before or after the change amount value is added to the accumulation value.

21. The acceleration data processing apparatus according to claim 19, wherein:

the acceleration sensor is capable of detecting, in at least two axial directions, the acceleration applied to the input device;

the data acquisition programmed logic circuitry acquires the acceleration data outputted by the acceleration sensor in units of axial components of the at least two axial directions;

the change amount calculation programmed logic circuitry calculates, as the change amount value, the change amount of the acceleration in units of the axial components by using the acceleration represented by the acceleration data in units of the axial components; and the direction determination programmed logic circuitry determines, as the waving direction representing the moving direction of the input device, a direction of a combined value of the accumulation values obtained in units of the axial components.

* * * * *